(12) United States Patent
Izhikevich et al.

(10) Patent No.: US 11,331,800 B2
(45) Date of Patent: May 17, 2022

(54) ADAPTIVE PREDICTOR APPARATUS AND METHODS

(71) Applicant: Brain Corporation, San Diego, CA (US)

(72) Inventors: Eugene Izhikevich, San Diego, CA (US); Oleg Sinyavskiy, San Diego, CA (US); Jean-Baptiste Passot, La Jolla, CA (US)

(73) Assignee: Brain Corporation, San Diego, CA (US)

( * ) Notice: Subject to any disclaimer, the term of this patent is extended or adjusted under 35 U.S.C. 154(b) by 137 days.

(21) Appl. No.: 16/908,038

(22) Filed: Jun. 22, 2020

(65) Prior Publication Data

US 2020/0316773 A1   Oct. 8, 2020

Related U.S. Application Data

(63) Continuation of application No. 16/171,635, filed on Oct. 26, 2018, now Pat. No. 10,688,657, which is a continuation of application No. 15/707,985, filed on Sep. 18, 2017, now Pat. No. 10,155,310, which is a continuation of application No. 13/842,530, filed on Mar. 15, 2013, now Pat. No. 9,764,468.

(51) Int. Cl.
| | |
|---|---|
| *B25J 9/00* | (2006.01) |
| *B25J 9/16* | (2006.01) |
| *G06N 3/00* | (2006.01) |
| *G06N 3/04* | (2006.01) |

(52) U.S. Cl.
CPC ............... *B25J 9/163* (2013.01); *B25J 9/161* (2013.01); *G06N 3/008* (2013.01); *G06N 3/049* (2013.01); *G05B 2219/39292* (2013.01); *G05B 2219/39298* (2013.01); *G05B 2219/40499* (2013.01)

(58) Field of Classification Search
CPC ...... B25J 9/1976; B25J 9/1617; B25J 9/1697; G05B 19/41815; G05B 18/4182
See application file for complete search history.

(56) References Cited

U.S. PATENT DOCUMENTS 8,069,046 B2 * 11/2011 Kennewick ............. G10L 15/08
704/257

OTHER PUBLICATIONS

Parent U.S. Appl. No. 16/171,635, filed Oct. 26, 2018.

* cited by examiner

*Primary Examiner* — Ian Jen
(74) *Attorney, Agent, or Firm* — Reed Smith LLP; Sidharth Kapoor

(57) ABSTRACT

Apparatus and methods for training and operating of robotic devices. Robotic controller may comprise a predictor apparatus configured to generate motor control output. The predictor may be operable in accordance with a learning process based on a teaching signal comprising the control output. An adaptive controller block may provide control output that may be combined with the predicted control output. The predictor learning process may be configured to learn the combined control signal. Predictor training may comprise a plurality of trials. During initial trial, the control output may be capable of causing a robot to perform a task. During intermediate trials, individual contributions from the controller block and the predictor may be inadequate for the task. Upon learning, the control knowledge may be transferred to the predictor so as to enable task execution in absence of subsequent inputs from the controller. Control output and/or predictor output may comprise multi-channel signals.

23 Claims, 35 Drawing Sheets

ADAPTIVE PREDICTOR APPARATUS AND METHODS

CROSS-REFERENCE TO RELATED APPLICATIONS

This application is a continuation of U.S. patent application Ser. No. 16/171,635, filed Oct. 26, 2018, now U.S. Pat. No. 10,688,657, which is a continuation of U.S. patent application Ser. No. 15/707,985, filed Sep. 18, 2017, now U.S. Pat. No. 10,155,310, which is a continuation of U.S. patent application Ser. No. 13/842,530, filed Mar. 15, 2013, now U.S. Pat. No. 9,764,468, each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Technological Field

The present disclosure relates to adaptive control and training of robotic devices.

Background

Robotic devices are used in a variety of applications, such as manufacturing, medical, safety, military, exploration, and/or other applications. Some existing robotic devices (e.g., manufacturing assembly and/or packaging) may be programmed in order to perform desired functionality. Some robotic devices (e.g., surgical robots) may be remotely controlled by humans, while some robots (e.g., iRobot Roomba®) may learn to operate via exploration.

Programming robots may be costly and remote control may require a human operator. Furthermore, changes in the robot model and/or environment may require changes in the programming code. Remote control typically relies on user experience and/or agility that may be inadequate when dynamics of the control system and/or environment (e.g., an unexpected obstacle appears in path of a remotely controlled vehicle) change rapidly.

SUMMARY

One aspect of the disclosure relates to a method of predicting a plant control output by an adaptive computerized predictor apparatus. The method may comprise: configuring the predictor apparatus, using one or more processors, to operate in accordance with a learning process based on a teaching input; at a first time instance, based on a sensory context, causing the predictor apparatus to generate the plant control output; configuring the predictor apparatus, using one or more processors, to provide the predicted plant control output as the teaching input into the learning process; and at a second time instance subsequent to the first time instance, causing the predictor apparatus to generate the predicted plant control output based on the sensory context and the teaching input. The predicted plant control output may be configured to cause the plant to perform an action consistent with the sensory context.

In some implementations, the plant may comprise a robotic platform. Responsive to the sensory context comprising a representation of an obstacle, the action may comprise an avoidance maneuver executed by the robotic platform. Responsive to the sensory context comprising a representation of a target, the action may comprise an approach maneuver executed by the robotic platform.

In some implementations, the sensory context may be based on sensory input into the learning process. A portion of the sensory input comprising a video sensor data and another portion of the sensory input may comprise the predicted plant control output.

In some implementations, the learning process may be configured based on a network of computerized neurons configured to be adapted in accordance with the sensory context and the teaching input.

In some implementations, multiple ones of the computerized neurons may be interconnected by connections characterized by connection efficacy. The adaptation may comprise adapting the connection efficacy of individual connections based on the sensory context and the teaching input.

In some implementations, the adaptation may be based on an error measure between the predicted plant control output and the teaching input.

In some implementations, individual ones of the computerized neurons may be communicatively coupled to connections characterized by connection efficacy. Individual ones of the computerized neurons may be configured to be operable in accordance with a dynamic process characterized by an excitability parameter. The sensory context may be based on input spikes delivered to into the predictor apparatus via a portion of the connections. Individual ones of the input spikes may be capable of increasing the excitability parameter associated with individual ones of the computerized neurons. The teaching input may comprise one or more teaching spikes configured to adjust an efficacy of a portion of the connections. The efficacy adjustment for a given connection may provide a portion of the input spikes into a given computerized neuron being configured based on one or more events occurring within a plasticity window. The one or more event may include one or more of: (i) a presence of one or more input spikes on the given connection, (ii) an output being generated by the given neuron, or (iii) an occurrence of at least one of the one or more teaching spikes.

In some implementations, responsive to the sensory context being updated at 40 ms intervals, the plasticity window duration may be selected between 5 ms and 200 ms, inclusive.

In some implementations, a portion of the computerized neurons may comprise spiking neurons. Individual ones of the spiking neurons may be characterized by a neuron excitability parameter configured to determine an output spike generation by a corresponding spiking neuron. Multiple ones of the spiking neurons may be interconnected by second connections characterized by second connection efficacy. Individual ones of the second connections may be configured to communicate one or more spikes from a pre-synaptic spiking neuron to a post-synaptic spiking neuron. A portion of the sensory context may be based on sensory input into the learning process comprising one or more spikes.

In some implementations, the predicted plant control output may comprise one or more spikes generated based on spike outputs by individual ones of the spiking neurons.

In some implementations, the sensory input may comprise one or more spikes configured to be communicated by a portion of the connections.

In some implementations, the predicted plant control output may comprise a continuous signal configured based on one or more spike outputs by individual ones of spiking neurons. The continuous signal may include one or more of an analog signal, a polyadic signal with arity greater than one, an n-bit long discrete signal with n-bits greater than one, a real-valued signal, or a digital representation of a real-valued signal.

In some implementations, the sensory input may comprise a continuous signal. The continuous signal may include one or more of an analog signal, a polyadic signal with arity greater than 1, an n-bit long discrete signal with n-bits greater than 1, or a real-valued signal, or a digital representation of an analog signal.

In some implementations, the sensory input may comprise a binary signal characterized by a single bit.

In some implementations, the learning process may be configured to be updated at regular time intervals. The adaptation may be based on an error measure between (i) the predicted plant control output generated at a given time instance and (ii) the teaching signal determined at another given time instance prior to the given time instance. The given time instance and the other time instance may be separated by a duration equal to one of the regular time intervals.

In some implementations, the plant may comprise at least one motor comprising a motor interface. The predicted plant control output may comprise one or more instructions to the motor interface configured to actuate the at least one motor.

In some implementations, the learning process may comprise supervised learning process.

In some implementations, the predicted plant control output may comprise a vector of outputs comprising two or more output components.

In some implementations, the learning process may be configured based one or more a look up table, a hash-table, and a data base table. The data base table may be configured to store a relationship between a given sensory context, a teaching input, associated with the given sensory context, and the predicted plant control output generated for the given sensory context during learning.

Another aspect of the disclosure relates to a computerized predictor apparatus comprising a plurality of computer-readable instructions configured to, when executed, generate a predicted control output by: configuring the predictor apparatus to operate in accordance with a learning process based on a teaching input; and based on a sensory context, causing the predictor apparatus to generate the predicted control output. The teaching input may comprise the predicted control output.

Yet another aspect of the disclosure relates to a computerized robotic neuron network control apparatus. The apparatus may comprise one or more processors configured to execute computer program modules. The computer program modules may comprise a first logic module and a second logic module. The first logic module may be configured to receive a sensory input signal and a teaching signal. The second logic module may be configured to generate a predicted output based on the sensory input signal and a teaching signal. The teaching signal may comprise another predicted output generated prior to the predicted control output based on the sensory input signal.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

Figure 1A:
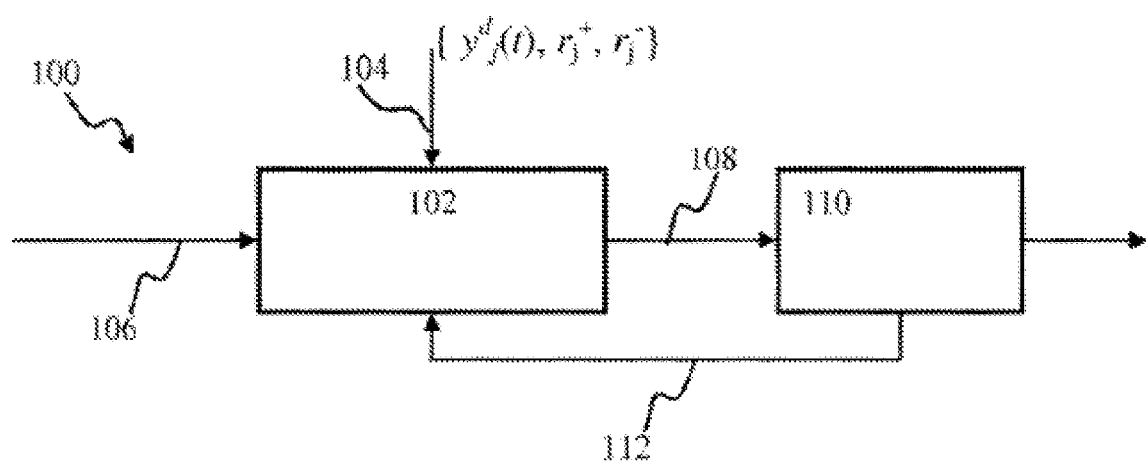
FIG. 1A is a block diagram illustrating a robotic apparatus, according to one or more implementations.

All Figures disclosed herein are © Copyright 2013 Brain Corporation. All rights reserved.

DETAILED DESCRIPTION

Implementations of the present technology will now be described in detail with reference to the drawings, which are provided as illustrative examples so as to enable those skilled in the art to practice the technology. Notably, the figures and examples below are not meant to limit the scope of the present disclosure to a single implementation, but other implementations are possible by way of interchange of or combination with some or all of the described or illustrated elements. Wherever convenient, the same reference numbers will be used throughout the drawings to refer to same or like parts.

Where certain elements of these implementations can be partially or fully implemented using known components, only those portions of such known components that are necessary for an understanding of the present invention will be described, and detailed descriptions of other portions of such known components will be omitted so as not to obscure the disclosure.

In the present specification, an implementation showing a singular component should not be considered limiting; rather, the invention is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote all types of interconnection or communication architecture that is used to access the synaptic and neuron memory. The "bus" may be optical, wireless, infrared, and/or another type of communication medium. The exact topology of the bus could be for example standard "bus", hierarchical bus, network-on-chip, address-event-representation (AER) connection, and/or other type of communication topology used for accessing, e.g., different memories in pulse-based system.

As used herein, the terms "computer", "computing device", and "computerized device "may include one or more of personal computers (PCs) and/or minicomputers (e.g., desktop, laptop, and/or other PCs), mainframe computers, workstations, servers, personal digital assistants (PDAs), handheld computers, embedded computers, programmable logic devices, personal communicators, tablet computers, portable navigation aids, J2ME equipped devices, cellular telephones, smart phones, personal integrated communication and/or entertainment devices, and/or any other device capable of executing a set of instructions and processing an incoming data signal.

As used herein, the term "computer program" or "software" may include any sequence of human and/or machine cognizable steps which perform a function. Such program may be rendered in a programming language and/or environment including one or more of C/C++, C#, Fortran, COBOL, MATLAB™, PASCAL, Python, assembly language, markup languages (e.g., HTML, SGML, XML, VoXML), object-oriented environments (e.g., Common Object Request Broker Architecture (CORBA)), Java™ (e.g., J2ME, Java Beans), Binary Runtime Environment (e.g., BREW), and/or other programming languages and/or environments.

As used herein, the terms "connection", "link", "transmission channel", "delay line", "wireless" may include a causal link between any two or more entities (whether physical or logical/virtual), which may enable information exchange between the entities.

As used herein, the term "memory" may include an integrated circuit and/or other storage device adapted for storing digital data. By way of non-limiting example, memory may include one or more of ROM, PROM, EEPROM, DRAM, Mobile DRAM, SDRAM, DDR/2 SDRAM, EDO/FPMS, RLDRAM, SRAM, "flash" memory (e.g., NAND/NOR), memristor memory, PSRAM, and/or other types of memory.

As used herein, the terms "integrated circuit", "chip", and "IC" are meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), application-specific integrated circuits (ASICs), and/or other types of integrated circuits.

As used herein, the terms "microprocessor" and "digital processor" are meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), cellular (e.g., 3G, LTE/LTE-A/TD-LTE, GSM, etc.), IrDA families, and/or other network interfaces.

As used herein, the terms "node", "neuron", and "neuronal node" are meant to refer, without limitation, to a network unit (e.g., a spiking neuron and a set of synapses configured to provide input signals to the neuron) having parameters that are subject to adaptation in accordance with a model.

As used herein, the terms "state" and "node state" is meant generally to denote a full (or partial) set of dynamic variables (e.g., a membrane potential, firing threshold and/or other) used to describe state of a network node.

As used herein, the term "synaptic channel", "connection", "link", "transmission channel", "delay line", and "communications channel" include a link between any two or more entities (whether physical (wired or wireless), or logical/virtual) which enables information exchange between the entities, and may be characterized by a one or more variables affecting the information exchange.

As used herein, the term "Wi-Fi" includes one or more of IEEE-Std. 802.11, variants of IEEE-Std. 802.11, standards related to IEEE-Std. 802.11 (e.g., 802.11 a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, infrared (i.e., IrDA), and/or other wireless interfaces.

FIG. 1A illustrates one implementation of an adaptive robotic apparatus for use with the adaptive predictor methodology described hereinafter. The apparatus 100 of FIG. 1A may comprise an adaptive controller 102 and a plant (e.g., robotic platform) 110. The controller 102 may be configured to generate control output 108 for the plant 110. The output 108 may comprise one or more motor commands (e.g., pan camera to the right), sensor acquisition parameters (e.g., use high resolution camera mode), commands to the wheels, arms, and/or other actuators on the robot, and/or other parameters. The output 108 may be configured by the controller 102 based on one or more sensory inputs 106. The input 106 may comprise data used for solving a particular control task. In one or more implementations, such as those involving a robotic arm or autonomous robot, the signal 106 may comprise a stream of raw sensor data and/or preprocessed data. Raw sensor data may include data conveying information associated with one or more of proximity, inertial, terrain imaging, and/or other information. Preprocessed data may include data conveying information associated with one or more of velocity, information extracted from accelerometers, distance to obstacle, positions, and/or other information. In some implementations, such as those involving object recognition, the signal 106 may comprise an array of pixel values in the input image, or preprocessed data. Pixel data may include data conveying information associated with one or more of RGB, CMYK, HSV, HSL, grayscale, and/or other information. Preprocessed data may include data conveying information associated with one or more of levels of activations of Gabor filters for face recognition, contours, and/or other information. In one or more implementations, the input signal 106 may comprise a target motion trajectory. The motion trajectory may be used to predict a future state of the robot on the basis of a current state and the target state. In one or more implementations, the signals in FIG. 1A may be encoded as spikes.

The controller 102 may be operable in accordance with a learning process (e.g., reinforcement learning and/or supervised learning). In one or more implementations, the controller 102 may optimize performance (e.g., performance of the system 100 of FIG. 1A) by minimizing average value of a performance function as described in detail in U.S. patent application Ser. No. 13/487,533, entitled "STOCHASTIC SPIKING NETWORK LEARNING APPARATUS AND METHODS", incorporated herein by reference in its entirety.

Figure 1B:
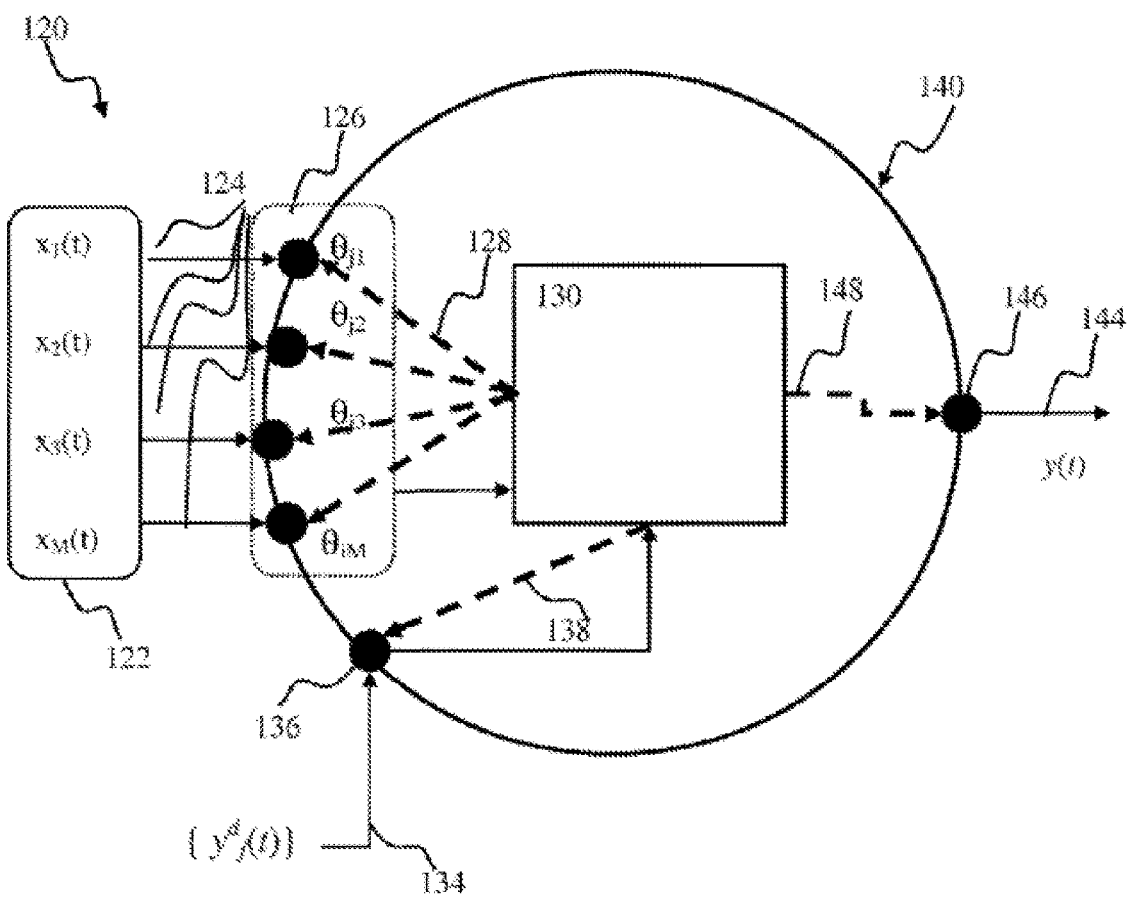
FIG. 1B is a block diagram illustrating spiking neural network for use with adaptive controller of FIG. 1A, in accordance with one or more implementations.

FIG. 1B illustrates an artificial neuron configured to implement the learning process of adaptive controller (e.g., 102 of FIG. 1A). The network 120 may comprise at least one spiking neuron 140, operable according to, for example, a Spike Response Process (SRP) denoted by block 130 in FIG. 1B. The neuron 140 may receive M-dimensional input stream X(t) 122 via connections 124. In some implementations, the M-dimensional stream may correspond to M-input synaptic connections 124 into the neuron 140. As shown in FIG. 1B, individual input connections 124 may be characterized by a connection 126 eij. The parameter hat 6 may be referred to as the learning parameter and configured to be adjusted during learning. In one or more implementation, the learning parameter may comprise connection efficacy (e.g., weight). In some implementations, the learning parameter may comprise transmission (e.g., synaptic) delay. In some implementations, the parameter 126 may comprise probability of spike transmission via the respective connection.

In some implementations, the neuron 140 may be configured to receive external input via the connection 134. In one or more implementations, the input 134 may comprise training input. In some implementations of supervised learning, the training input 134 may comprise a supervisory spike that may be used to trigger neuron post-synaptic response.

The neuron 140 may be configured to generate output y(t) (e.g., a post-synaptic spike) that may be delivered to the desired targets (e.g., other neurons of the network, not shown) via one or more output connections (e.g., 144 in FIG. 1B). As shown in FIG. 1B, individual output connections 144 may be characterized by a connection parameter 146 that may be adjusted during learning. In one or more implementation, the connection parameter 146 may comprise connection efficacy (e.g., weight). In some implementations, the parameter 146 may comprise synaptic delay. In some implementations, the parameter 146 may comprise spike transmission probability.

The neuron 140 may be configured to implement controller functionality, such as described for example in U.S. patent application Ser. No. 13/487,533, entitled "STOCHASTIC SPIKING NETWORK LEARNING APPARATUS AND METHODS", filed Jun. 4, 2012, incorporated supra, in order to control, for example, a robotic arm. The output signal y(t) may include motor control commands configured to move a robotic arm along a target trajectory. The process 130 may be characterized by internal state q. The internal state q may, for example, comprise a membrane voltage of the neuron, conductance of the membrane, and/or other parameters. The process 130 may be characterized by one or more learning parameter which may comprise input connection efficacy, 126, output connection efficacy 146, training input connection efficacy 136, response generating (firing) threshold, resting potential of the neuron, and/or other parameters. In one or more implementations, some learning parameters may comprise probabilities of signal transmission between the units (e.g., neurons) of the network.

In some implementations, the training input (e.g., 134 in FIG. 1B) may be differentiated from sensory inputs (e.g., provided via the connections 124) to the neuron 140 as follows. During learning: data (e.g., spike events) arriving to the neuron 140 via the connections 124 may cause changes in the neuron state (e.g., increase neuron membrane potential and/or other parameters). Changes in the neuron state may cause the neuron to generate a response (e.g., output a spike). Teaching data arriving to the neuron 140 via the connection 134 may cause (i) changes in the neuron dynamic model (e.g., modify parameters a,b,c,d of Izhikevich neuron model, described for example in U.S. patent application Ser. No. 13/623,842, entitled "SPIKING NEURON NETWORK ADAPTIVE CONTROL APPARATUS AND METHODS", filed Sep. 20, 2012, incorporated herein by reference in its entirety); and/or (ii) modification of connection efficacy, based, for example, on timing of input spikes, teacher spikes, and/or output spikes. In some implementations, teaching data may trigger neuron output in order to facilitate learning. In some implementations, teaching signal may be communicated to other components of the control system.

During operation (e.g., subsequent to learning): data (e.g., spike events) arriving to the neuron 140 via the connections 124 may cause changes in the neuron state (e.g., increase neuron membrane potential and/or other parameters). Changes in the neuron state may cause the neuron to generate a response (e.g., output a spike). Teaching data may be absent during operation, while input data are required for the neuron to generate output.

Connections 124 in FIG. 1B may communicate one or more spiking and/or analog inputs. As used herein the term 'spiking' signal may be used to describe signals comprising one or more discrete events. In some implementations, a spiking signal may comprise a stream of bits where value of '1' may be used to indicate individual events. In some implementations, spiking signal may comprise one or more messages (having for example a time stamp associated therewith) corresponding to individual events.

As used herein the term 'non-spiking' and/or 'analog' signal may be used to describe real world continuous signals. In some implementations, the non-spiking signal may comprise an analog signal (e.g., a voltage and/or a current produced by a source). In one or more implementations, the non-spiking signal may comprise a digitized signal (e.g., sampled at regular intervals (sampling rate) with a given resolution). In some implementations, the continuous signal may include one or more of an analog signal, a polyadic signal with arity greater than 2, an n-bit long discrete signal with n-bits greater than 2, a real-valued signal, and/or other continuous signal.

In one or more implementations, such as object recognition, and/or obstacle avoidance, the input 122 may comprise a stream of pixel values associated with one or more digital images (e.g., video, radar, sonography, x-ray, magnetic resonance imaging, and/or other types). Pixel data may include data conveying information associated with one or more of RGB, CMYK, HSV, HSL, grayscale, and/or other information. Pixels and/or groups of pixels associated with objects and/or features in the input frames may be encoded using, for example, latency encoding described in U.S. patent application Ser. No. 12/869,583, filed Aug. 26, 2010 and entitled "INVARIANT PULSE LATENCY CODING SYSTEMS AND METHODS"; U.S. Pat. No. 8,315,305, issued Nov. 20, 2012, entitled "SYSTEMS AND METHODS FOR INVARIANT PULSE LATENCY CODING"; U.S. patent application Ser. No. 13/152,084, filed Jun. 2, 2011, entitled "APPARATUS AND METHODS FOR PULSE-CODE INVARIANT OBJECT RECOGNITION"; and/or latency encoding comprising a temporal winner take all mechanism described U.S. patent application Ser. No. 13/757,607, filed Feb. 1, 2013 and entitled "TEMPORAL WINNER TAKES ALL SPIKING NEURON NETWORK SENSORY PROCESSING APPARATUS AND METHODS", each of the foregoing being incorporated herein by reference in its entirety.

In one or more implementations, object recognition and/or classification may be implemented using spiking neuron classifier comprising conditionally independent subsets as described in U.S. patent application Ser. No. 13/756,372 filed Jan. 31, 2013, and entitled "SPIKING NEURON CLASSIFIER APPARATUS AND METHODS" and/or U.S. patent application Ser. No. 13/756,382 filed Jan. 31, 2013, and entitled "REDUCED LATENCY SPIKING NEURON CLASSIFIER APPARATUS AND METHODS", each of the foregoing being incorporated herein by reference in its entirety.

In one or more implementations, encoding may comprise adaptive adjustment of neuron parameters, such neuron excitability described in U.S. patent application Ser. No. 13/623,820 entitled "APPARATUS AND METHODS FOR ENCODING OF SENSORY DATA USING ARTIFICIAL SPIKING NEURONS", filed Sep. 20, 2012, the foregoing being incorporated herein by reference in its entirety.

In some implementations, analog inputs may be converted into spikes using, for example, kernel expansion techniques described in U.S. patent application Ser. No. 13/623,842 filed Sep. 20, 2012, and entitled "SPIKING NEURON NETWORK ADAPTIVE CONTROL APPARATUS AND METHODS", the foregoing being incorporated herein by reference in its entirety. In one or more implementations, analog and/or spiking inputs may be processed by mixed signal spiking neurons, such as U.S. patent application Ser. No. 13/313,826 entitled "APPARATUS AND METHODS FOR IMPLEMENTING LEARNING FOR ANALOG AND SPIKING SIGNALS IN ARTIFICIAL NEURAL NETWORKS", filed Dec. 7, 2011, and/or U.S. patent application Ser. No. 13/761,090 entitled "APPARATUS AND METHODS FOR IMPLEMENTING LEARNING FOR ANALOG AND SPIKING SIGNALS IN ARTIFICIAL NEURAL NETWORKS", filed Feb. 6, 2013, each of the foregoing being incorporated herein by reference in its entirety.

The learning parameters associated with the input/output connections (e.g., the parameters 126, 136, 146) may be adjusted in accordance with one or more rules, denoted in FIG. 1B by broken arrows 128, 138, 148, respectively.

The rules may be configured to implement synaptic plasticity in the network. In some implementations, the plastic rules may comprise one or more spike-timing dependent plasticity, such as rule comprising feedback described in U.S. patent application Ser. No. 14/465,903 entitled "SENSORY INPUT PROCESSING APPARATUS IN A SPIKING NEURAL NETWORK", filed May 7, 2012; rules configured to modify of feed forward plasticity due to activity of neighboring neurons, described in U.S. patent application Ser. No. 14/488,106, entitled "SPIKING NEURON NETWORK APPARATUS AND METHODS", filed Jun. 4, 2012; conditional plasticity rules described in U.S. patent application Ser. No. 13/541,531, entitled "CONDITIONAL PLASTICITY SPIKING NEURON NETWORK APPARATUS AND METHODS", filed Jul. 3, 2012; plasticity configured to stabilize neuron response rate as described in U.S. patent application Ser. No. 13/691,554, entitled "RATE STABILIZATION THROUGH PLASTICITY IN SPIKING NEURON NETWORK", filed Nov. 30, 2012; activity-based plasticity rules described in U.S. patent application Ser. No. 13/660,967, entitled "APPARATUS AND METHODS FOR ACTIVITY-BASED PLASTICITY IN A SPIKING NEURON NETWORK", filed Oct. 25, 2012, U.S. patent application Ser. No. 13/660,945, entitled "MODULATED PLASTICITY APPARATUS AND METHODS FOR SPIKING NEURON NETWORKS", filed Oct. 25, 2012; and U.S. patent application Ser. No. 13/774,934, entitled "APPARATUS AND METHODS FOR RATE-MODULATED PLASTICITY IN A SPIKING NEURON NETWORK", filed Feb. 22, 2013; multi-modal rules described in U.S. patent application Ser. No. 13/763,005, entitled "SPIKING NETWORK APPARATUS AND METHOD WITH BIMODAL SPIKE-TIMING DEPENDENT PLASTICITY", filed Feb. 8, 2013, each of the foregoing being incorporated herein by reference in its entirety.

In one or more implementations, neuron operation may be configured based on one or more inhibitory connections providing input configured to delay and/or depress response generation by the neuron, as described in U.S. patent application Ser. No. 13/660,923, entitled "ADAPTIVE PLASTICITY APPARATUS AND METHODS FOR SPIKING NEURON NETWORK", filed Oct. 25, 2012, the foregoing being incorporated herein by reference in its entirety Connection efficacy updated may be effectuated using a variety of applicable methodologies such as, for example, event based updates described in detail in U.S. patent application Ser. No. 13/239, filed Sep. 21, 2011, entitled "APPARATUS AND METHODS FOR SYNAPTIC UPDATE IN A PULSE-CODED NETWORK"; 201220, U.S. patent application Ser. No. 13/588,774, entitled "APPARATUS AND METHODS FOR IMPLEMENTING EVENT-BASED UPDATES IN SPIKING NEURON NETWORK", filed Aug. 17, 2012; and U.S. patent application Ser. No. 13/560,891 entitled "APPARATUS AND METHODS FOR EFFICIENT UPDATES IN SPIKING NEURON NETWORKS", each of the foregoing being incorporated herein by reference in its entirety.

Neuron process 130 may comprise one or more learning rules configured to adjust neuron state and/or generate neuron output in accordance with neuron inputs (e.g., 122, 124 in FIG. 1B).

In some implementations, the one or more leaning rules may comprise state dependent learning rules described, for example, in U.S. patent application Ser. No. 13/560,902, entitled "APPARATUS AND METHODS FOR STATE-DEPENDENT LEARNING IN SPIKING NEURON NETWORKS", filed Jul. 27, 2012 and/or U.S. patent application Ser. No. 13/722,769 filed Dec. 20, 2012, and entitled "APPARATUS AND METHODS FOR STATE-DEPENDENT LEARNING IN SPIKING NEURON NETWORKS", each of the foregoing being incorporated herein by reference in its entirety.

In one or more implementations, the one or more leaning rules may be configured to comprise one or more reinforcement learning, unsupervised learning, and/or supervised learning as described in U.S. patent application Ser. No. 13/487,499 entitled "STOCHASTIC APPARATUS AND METHODS FOR IMPLEMENTING GENERALIZED LEARNING RULES, incorporated supra.

In one or more implementations, the one or more leaning rules may be configured in accordance with focused exploration rules such as described, for example, in U.S. patent application Ser. No. 13/489,280 entitled "APPARATUS AND METHODS FOR REINFORCEMENT LEARNING IN ARTIFICIAL NEURAL NETWORKS", filed Jun. 5, 2012, the foregoing being incorporated herein by reference in its entirety.

Adaptive controller (e.g., the controller apparatus 102 of FIG. 1A) may comprise an adaptable predictor block configured to, inter alia, predict controller output (e.g., 108) based on the sensory input (e.g., 106 in FIG. 1A) and teaching input (e.g., 104 in FIG. 1A). FIGS. 2-3 illustrate exemplary adaptive predictor configurations in accordance with one or more implementations.

Figure 2A:
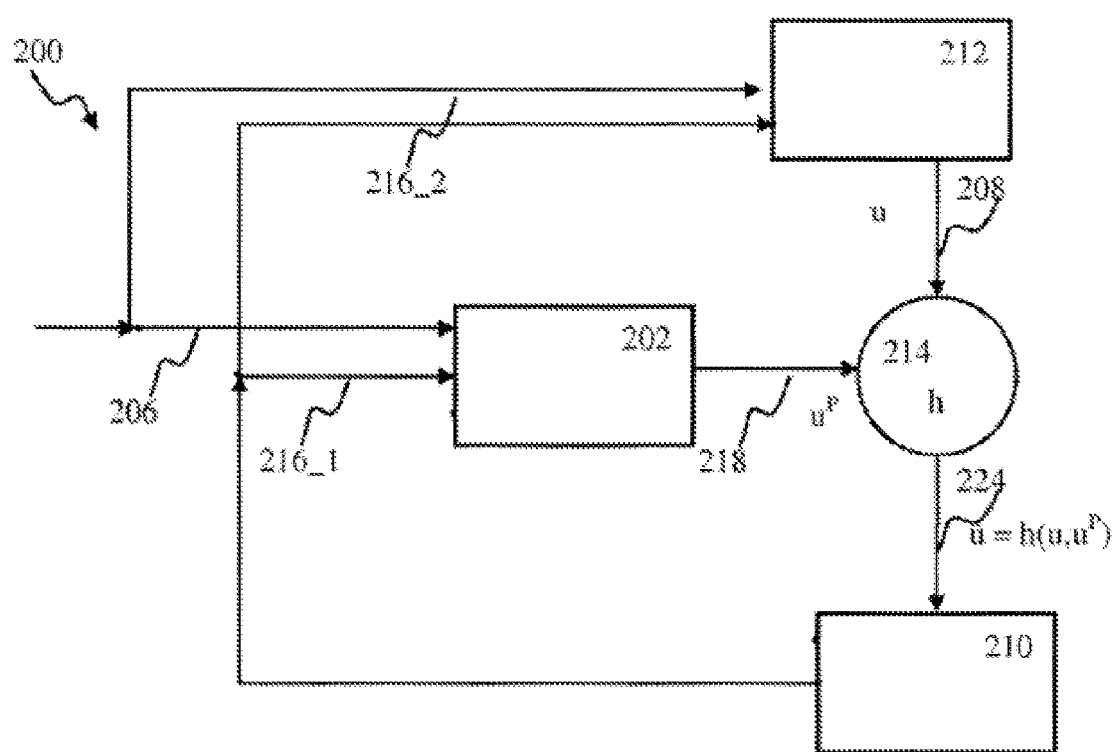
FIG. 2A is a block diagram illustrating an apparatus comprising an adaptable predictor block, according to one or more implementations.
Figure 2B:
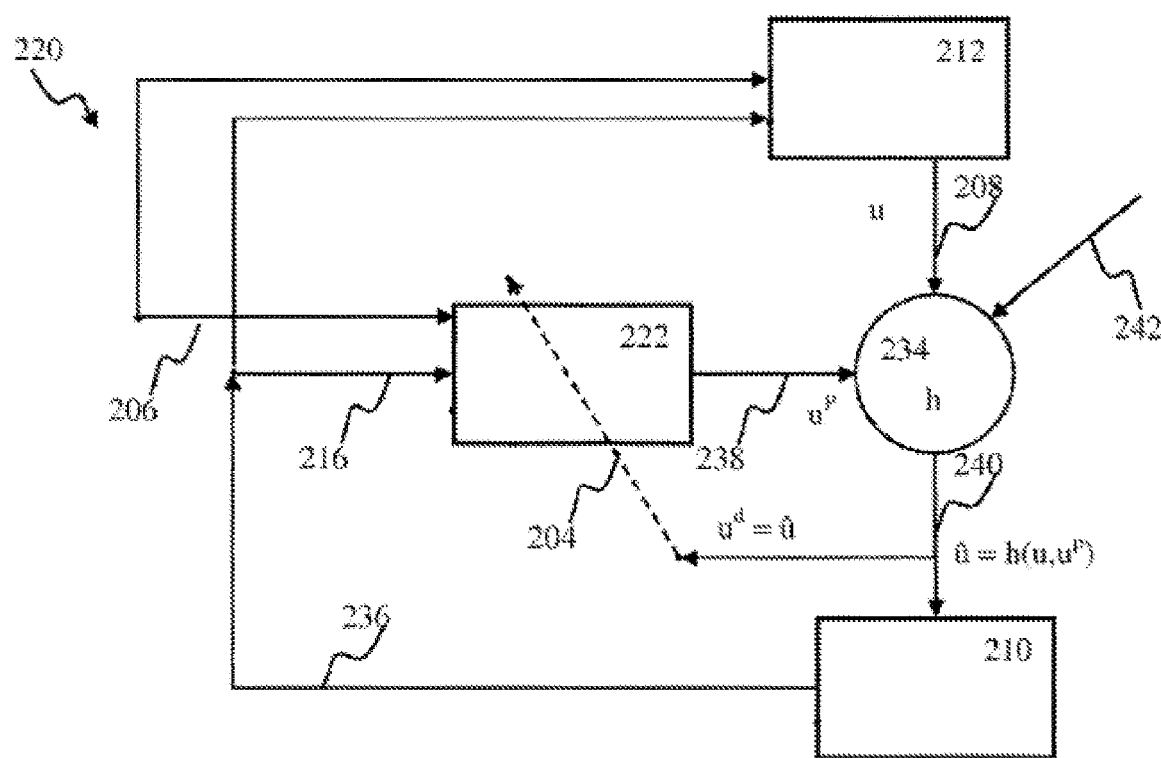
FIG. 2B is a block diagram illustrating an apparatus comprising an adaptable predictor block operable in accordance with a teaching signal, according to one or more implementations.

FIGS. 2A-2B illustrate exemplary adaptive controllers comprising a learning predictor in accordance with one or more implementations. The adaptive apparatus 200 of FIG. 2A may comprise a control block 212, an adaptive predictor 202, and a combiner 214. The control block 212, the predictor 202 and the combiner 214 may cooperate to produce a control signal 224 for the plant 210. In one or more implementations, the control signal 224 may comprise one or more motor commands (e.g., pan camera to the right, turn wheel to the left), sensor acquisition parameters (e.g., use high resolution camera mode), and/or other parameters.

The control block 212 may be configured to generate controller output u 208 based on one or more of (i) sensory input (denoted 206 in FIG. 2A) and plant feedback 216_2. In some implementations, plant feedback may comprise proprioceptive signals, such as the readings from servo motors, joint position, and/or torque. In some implementations, the sensory input 206 may correspond to the controller sensory input 106, described with respect to FIG. 1A, supra.

The adaptive predictor 202 may be configured to generate predicted controller output uP 218 based on one or more of (i) the sensory input 206 and the plant feedback 216_1. The predictor 202 may be configured to adapt its internal parameters, e.g., according to a supervised learning rule, and/or other machine learning rules.

The sensory input and/or the plant feedback may collectively be referred to as sensory context. The context may be utilized by the predictor 202 in order to produce the predicted output 218. By way of a non-limiting illustration of obstacle avoidance by an autonomous rover, an image of an obstacle (e.g., wall representation in the sensory input 206) may be combined with rover motion (e.g., speed and/or direction) to generate Context A. When the Context A is encountered, the control output 224 may comprise one or more commands configured to avoid a collision between the rover and the obstacle. Based on one or more prior encounters of the Context A—avoidance control output, the predictor may build an association between these events as described below.

The combiner 214 may implement a transfer function hO configured to combine the raw controller output 208 and the predicted controller output 218. In some implementations, the combiner 214 operation may be expressed as follows:

$$\hat{u}=h(u,u^P).\qquad\text{(Eqn. 1)}$$

Various realization of the transfer function of Eqn. 1 may be utilized. In some implementations, the transfer function may comprise addition operation, union, a logical 'AND' operation, and/or other operations.

In one or more implementations, the transfer function may comprise a convolution operation. In spiking network realizations of the combiner function, the convolution operation may be supplemented by use of a finite support kernel such as Gaussian, rectangular, exponential, and/or other finite support kernel. Such a kernel may implement a low pass filtering operation of input spike train(s). In some implementations, the transfer function may be characterized by a commutative property configured such that:

$$\hat{u}=h(u,u^P)=h(u^P,u)\qquad\text{(Eqn. 2)}$$

In one or more implementations, the transfer function of the combiner 214 may be configured as follows:

$$h(0,u^P)=u^P.\qquad\text{(Eqn. 3)}$$

In one or more implementations, the transfer function h may be configured as:

$$h(u,0)=u.\qquad\text{(Eqn. 4)}$$

In some implementations, the transfer function h may be configured as a combination of realizations of Eqn. 3-Eqn. 4 as:

$$h(0,u^P)=u^P, \text{ and } h(u,0)=u,\qquad\text{(Eqn. 5)}$$

In one exemplary implementation, the transfer function satisfying Eqn. 5 may be expressed as:

$$h(u,u^P)=(1-u)\times(1-u^P)-1.\qquad\text{(Eqn. 6)}$$

In some implementations, the combiner transfer function may be characterized by a delay expressed as:

$$\hat{u}(t_{i+1})=h(u(t_i),u^P(t_i))\qquad\text{(Eqn. 7)}$$

In Eqn. 7, û($t_{i+1}$) denotes combined output (e.g., 220 in FIG. 2A) at time t+4t. As used herein, symbol $t_N$ may be used to refer to a time instance associated with individual controller update events (e.g., as expressed by Eqn. 7), for example $t_i$ denoting time of the first control output, e.g., a simulation time step and/or a sensory input frame step. In some implementations of training autonomous robotic devices (e.g., rovers, bi-pedaling robots, wheeled vehicles, aerial drones, robotic limbs, and/or other robotic devices), the update periodicity At may be configured to be between 1 ms and 1000 ms.

It will be appreciated by those skilled in the arts that various other realizations of the transfer function of the combiner 214 (e.g., comprising a Heaviside step function, a sigmoidal function, such as the hyperbolic tangent, Gauss error function, or logistic function, and/or a stochastic operation) may be applicable.

FIG. 2B illustrates a control apparatus 220 comprising an adaptable predictor block 222 operable in accordance with a learning process that is based on a teaching signal, according to one or more implementations.

The learning process of the adaptive predictor 222 may comprise supervised learning process, reinforcement learning process, and/or a combination thereof. The learning process of the predictor 222 may be configured to generate predictor output 238. The control block 212, the predictor 222, and the combiner 234 may cooperate to produce a control signal 240 for the plant 210. In one or more implementations, the control signal 240 may comprise one or more motor commands (e.g., pan camera to the right, turn wheel to the left), sensor acquisition parameters (e.g., use high resolution camera mode), and/or other parameters.

The adaptive predictor 222 may be configured to generate predicted controller output $u^P$ 238 based on one or more of (i) the sensory input 206 and the plant feedback 236. Predictor realizations, comprising plant feedback (e.g., 216_1, 236 in FIGS. 2A-2B, respectively), may be employed in applications such as, for example, wherein (i) the control action may comprise a sequence of purposefully timed commands (e.g., associated with approaching a stationary target (e.g., a cup) by a robotic manipulator arm); and (ii) the plant may be characterized by a plant state time parameter (e.g., arm inertia, and/or motor response time) that may be greater than the rate of action updates. Parameters of a subsequent command within the sequence may depend on the plant state (e.g., the exact location and/or position of the arm joints) that may become available to the predictor via the plant feedback.

Operation of the predictor 222 learning process may be aided by a teaching signal 204. As shown in FIG. 2B, the teaching signal 204 may comprise the output 240 of the combiner:

$$u^d = \hat{u}. \qquad \text{(Eqn. 8)}$$

In some implementations wherein the combiner transfer function may be characterized by a delay ti (e.g., Eqn. 7), the teaching signal at time t; may be configured based on values of u, $u^P$ at a prior time t,_i, for example as:

$$u^d(t_i) = h(u(t_{i-1}), u^P(t_{i-1})). \qquad \text{(Eqn. 9)}$$

The training signal $u^d$ at time t, may be utilized by the predictor in order to determine the predicted output $u^P$ at a subsequent time ti+i, corresponding to the context (e.g., the sensory input x) at time t:

$$u^P(t_{i+1}) = F[x_i, W(u^d(t_i))]. \qquad \text{(Eqn. 10)}$$

In Eqn. 10, the function W may refer to a learning process implemented by the predictor.

In one or more implementations wherein the predictor may comprise a spiking neuron network (e.g., the network 120 of FIG. 1B) operable in accordance with a learning process, the training signal $u^d = S^d$ may be used to adjust one or more operational parameters 0 of the learning process, as described for example in U.S. patent application Ser. No. 13/761,090, entitled "APPARATUS AND METHODS FOR IMPLEMENTING LEARNING FOR ANALOG AND SPIKING SIGNALS IN ARTIFICIAL NEURAL NETWORKS", filed Feb. 6, 2013, incorporated supra:

$$\frac{d\theta_{jk}(t)}{dt} = \eta(t)(\overline{S^d_j}(t) - \overline{S_j}(t))\overline{S_k}(t), \qquad \text{(Eqn. 11)}$$

where:
63k(t) is the efficacy of the synaptic connection from the pre-synaptic neuron i to neuron j;/(t) is the learning rate; $S_j d(t)$ is low-pass filtered version of the target spike train for neuron j, with a filter time constant $i^d$;
(t) is the low-pass filtered version of the output spike train from neuron j, with a filter time constant T; and
S (t) is the low-pass filtered version of the i-th input spike train to neuron j, with a filter time constant In some implementations (including the implementation of Eqn. 11), the low-pass filtered version of the spike train may be expressed as:

$$\overline{S_k}(t) = \int_0^\infty a_k(s) S_k(t-s) ds, \qquad \text{(Eqn. 12)}$$

with a(s) being a smoothing kernel. In one or more variants, the smoothing kernel may comprise an exponential, Gaussian, and/or another function of time, configured using one or more parameters. Further, the parameters may comprise a filter time constant T. An example of an exponential smoothing kernel is:

$$a_k(s) = \exp(-s/\tau), \qquad \text{(Eqn. 13)}$$

where z is the kernel time constant.

In one or more implementations, the learning rate $_i$ of Eqn. 11 may be configured to vary with time, as described in detail in U.S. patent application Ser. No. 13/722,769 filed Dec. 20, 2012, and entitled "APPARATUS AND METHODS FOR STATE-DEPENDENT LEARNING IN SPIKING NEURON NETWORKS", the foregoing being incorporated herein in its entirety.

Returning now to FIG. 2B, the combiner 234 may implement a transfer function hO configured to combine the raw controller output 208 and the predicted controller output 238. In various implementations, operation of the combiner 234 may be configured in accordance with Eqn. 1-Eqn. 7, described above and/or other relations. In one such realization, the combiner 234 transfer function may be configured according to Eqn. 14, thereby implementing an additive feedback. In other words, output of the predictor (e.g., 238) may be additively combined with the output of the controller (208) and the combined signal 240 may be used as the teaching input (204) for the predictor. In some implementations, e.g., signal 366 shown in FIGS. 3C-3D, the combined signal 240 may be utilized as an input (context) signal into the predictor.

In one or more implementations, such as illustrated in FIGS. 2A-2B, the sensory input 206, the controller output 208, the predicted output 218, 238, the combined output 224, 240 and/or plant feedback 216, 236 may comprise spiking signal, analog signal, and/or a combination thereof. Analog to spiking and/or spiking to analog signal conversion may be effectuated using, mixed signal spiking neuron networks, such as, for example, described in U.S. patent application Ser. No. 13/313,826 entitled "APPARATUS AND METHODS FOR IMPLEMENTING LEARNING FOR ANALOG AND SPIKING SIGNALS IN ARTIFICIAL NEURAL NETWORKS", filed Dec. 7, 2011, and/or U.S. patent application Ser. No. 13/761,090 entitled "APPARATUS AND METHODS FOR IMPLEMENTING LEARNING FOR ANALOG AND SPIKING SIGNALS IN ARTIFICIAL NEURAL NETWORKS", filed Feb. 6, 2013, incorporated supra.

Exemplary operation of the adaptive control system (e.g., 200, 220 of FIGS. 2A-2B) is not described in detail. The predictor and/or the controller of the adaptive system 200, 220 may be operated in accordance with an update process configured to be effectuated continuously and/or at discrete time intervals At, described above with respect to Eqn. 7.

The control output (e.g., 224 in FIG. 2A) may be provided at a rate between 1 Hz and 1000 Hz. A time scales $T_{ptit}$ describing dynamics of the respective plant (e.g., response time of a rover and/or an aerial drone platform, also referred to as the behavioral time scale) may vary with the plant type and comprise scales on the order of a second (e.g., between 0.1 s to 2 s).

The transfer function of the combiner of the exemplary implementation of the adaptive system 200, 220, described below, may be configured as follows:

$$\hat{u} = h(u, u^P) = u + u^P. \qquad \text{(Eqn. 14)}$$

Training of the adaptive predictor (e.g., 202 of the control system 200 of FIG. 2A) may be effectuated via a plurality of trials. In some implementations, training of a mechanized robot and/or an autonomous rover may comprise between 5 and 50 trials. Individual trials may be configured with duration that may be sufficient to observe behavior of the plant (e.g., execute a turn and/or another maneuver), e.g., between 1 and 10 s.

In some implementations the trial duration may last longer (up to tens of second) and be determined based on a difference measure between current performance of the plant (e.g., current distance to an object) and a target performance (e.g., a target distance to the object). The performance may be characterized by a performance function as described in detail in and U.S. patent application Ser. No. 13/487,499 entitled "STOCHASTIC APPARATUS AND METHODS FOR IMPLEMENTING GENERALIZED LEARNING RULES, incorporated supra. Individual trials may be separated in time (and in space) by practically any duration commensurate with operational cycle of the plant. By way of illustration, individual trial when training a robot to approach objects and/or avoid obstacles may be separated by a time period and/or space that may be commensurate with the robot traversing from one object/obstacle to the next. In one or more implementations, the robot may comprise a rover platform, and/or a robotic manipulator arm comprising one or more joints.

Figure 6:
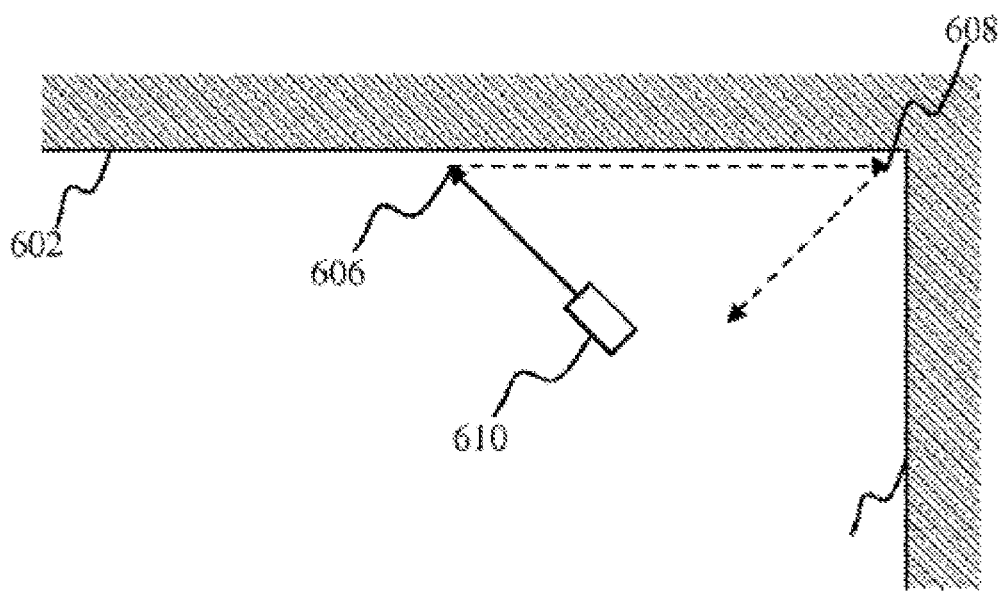
FIG. 6 is a graphical illustration depicting obstacle avoidance training of a robotic device comprising an adaptive predictor apparatus of, for example, FIG. 2B, according to one or more implementations.

FIG. 6 illustrates an exemplary trajectory of a rover configured to learn obstacle avoidance. The rover 610 may be configured to avoid walls 602, 604. In some implementations, the avoidance policy may comprise execution of a 45° turn, e.g., 606, 608 in FIG. 6. As used hereinafter symbol 77V may be used to refer to a time of a given trial (e.g., T1 denoting time of first trial). During first trial, at time T1:

the predictor (e.g., 202 of FIGS. 2A-2B) may receive control output u1 (e.g., turn right) 45° from the controller 212. The control signal may correspond to sensory input x1 (e.g., 206, 216 in FIG. 2A) that may be received by the controller and/or the predictor; such signal may comprise a representation of an obstacle (e.g., a wall), and/or a target (e.g., a charging dock);

the predictor may be configured to generate predicted control signal (e.g., $u1^P=0°$);

the combiner may produce the combined output u1'=45°; and the plant 210 may begin to turn right in accordance with the control signal (e.g., 224).

During another trial at time T2>T1:

the predictor 202 may receive control output u2 (e.g., still turn right 45°) from the controller 212;

the plant feedback may indicate to the predictor that the plant is executing a turn (in accordance with the prior combined output u1'); accordingly, the predictor may be configured to 'mimic' the prior combined output u1' and to generate predicted control signal (e.g., $u2^P=10°$);

the combiner may produce new combined output u2'=55°; and the plant 210 may increase the turn rate in accordance with the updated control signal u2'.

During another trial at time T3>T2:

the input x3 may indicate to the controller 212 that the plant turn rate is in excess of the target turn rate for the 40° turn; the controller 212 may reduce control output to u3=35°;

based on the input x3, indicative of e.g., the plant turn rate for u2'=55°, the predictor may be configured to increase its prediction to e.g., $u3^P=20°$; and the combiner (e.g., 210 of FIG. 2A) may receive control output u3 (e.g., turn right 35°) from the controller 212; the combiner may produce the combined output u3'=55°.

During other trials at times Ti>T3 the predictor output may be increased to the target plant turn of 45° and the controller output 208 may be reduced to zero. In some implementations, the outcome of the above operational sequence may be referred to as (gradual) transfer of the controller output to the predictor output. A summary of one implementation of the training process described above may be summarized using data shown in Table 1:

TABLE 1

| Trial # | Control signal u[deg] | Predicted signal $u^P$ [deg] | Combined signal ũ[deg] | Error (ũ-u) [deg] |
|---|---|---|---|---|
| 1 | 45 | 0 | 45 | 0 |
| 2 | 45 | 10 | 55 | 10 |
| 3 | 35 | 20 | 55 | 10 |
| 4 | 25 | 35 | 60 | 15 |
| 5 | 25 | 50 | 60 | 15 |
| 6 | 0 | 55 | 55 | 10 |
| 7 | 0 | 55 | 55 | 10 |
| 8 | −10 | 55 | 45 | 0 |
| 9 | −10 | 50 | 40 | −5 |
| 10 | 0 | 45 | 45 | 0 |

As seen from Table 1, when the predictor is capable to producing the target output (e.g., trial #10), the controller output (e.g., 208 in FIG. 2A) may be withdrawn (removed). The output of the combiner (e.g., 214) in such realizations may comprise the predictor output in accordance with, for example, Eqn. 14.

The controller (e.g., 212 in FIGS. 2A-2B and/or 2042 in FIG. 20B) may comprise an adaptive system operable in accordance with a learning process. In one or more implementations, the learning process of the controller may comprise one or more reinforcement learning, unsupervised learning, supervised learning, and/or a combination thereof, as described in U.S. patent application Ser. No. 13/487,499 entitled "STOCHASTIC APPARATUS AND METHODS FOR IMPLEMENTING GENERALIZED LEARNING RULES, incorporated supra.

In one or more implementations, the training steps outlined above (e.g., trials summarized in Table 1) may occur over two or more trials wherein individual trial extend over behavioral time scales (e.g., one second to tens of seconds).

In some implementations, the training steps may occur over two or more trials wherein individual trials may be characterized by control update scales (e.g., 1 ms to 1000 ms).

In some implementations, the operation of an adaptive predictor (e.g., 202 in FIG. 2A) may be characterized by predictor learning within a given trial as illustrated and described with respect to Table 2.

Figure 14:
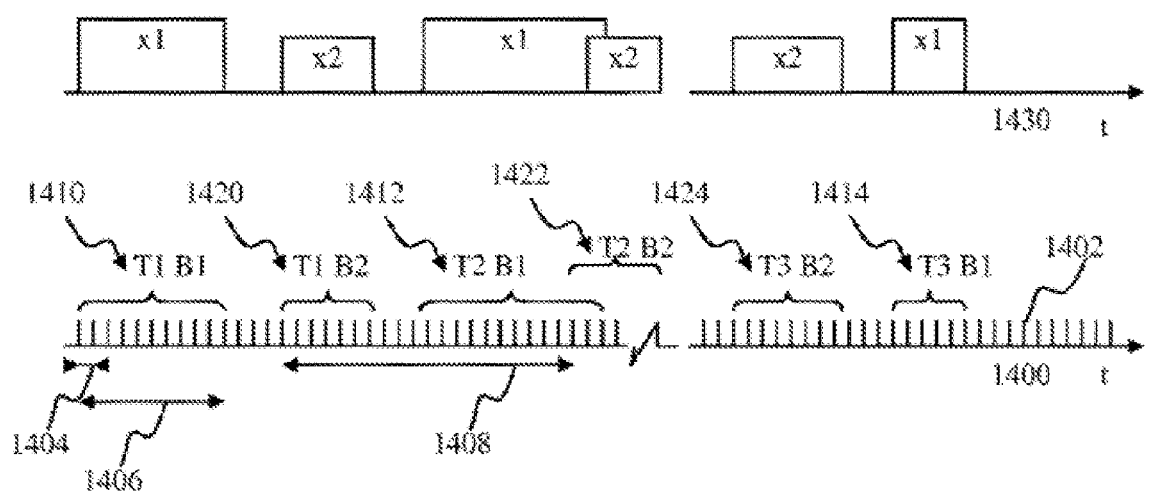
FIG. 14 is a graphical illustration of learning a plurality of behaviors over multiple trials behavior by an adaptive controller, e.g., of FIG. 2A, in accordance with one or more implementations.

FIG. 14 presents one exemplary configuration of training trials and control update time scales. The plurality of vertical marks 1402 on trace 1400 denotes control update events (e.g., time grid where control commands may be issued to motor controller). In some implementations (not shown) the control events (e.g., 1402 in FIG. 14) may be spaced at non-regular intervals. The arrow denoted 1404 may refer to the control time scale.

The time intervals denoted by brackets 1410, 1412, 1414 may refer to individual training trials (e.g., trials Ti, T2, T3 described above with respect to Table 1). The arrow denoted 1406 may refer to a trial duration being associated with, for example, a behavioral time scale.

The arrow denoted 1408 may refer to inter-trial intervals and describe training time scale.

In some implementations, shown and described with respect to FIG. 14, a robotic device may be configured to learn two or more behaviors within a given time span. By way of illustration, a mechanized robotic arm may be trained to grasp an object (e.g., cup). The cup grasping may be characterized by two or more behaviors, e.g., B1 approach and B2 grasp. Training for individual behaviors B1, B2 is illustrated in FIG. 14 by trials denoted as (1410, 1412, 1414), and (1420, 1422, 1424) respectively.

Sensory input associated with the training configuration of trace 1400 is depicted by rectangles on trace 1430 in FIG. 14. Individual sensory states (e.g., a particular object and or a feature present in the sensory input) are denoted as x1, x2 in FIG. 14. The cup may be present in the sensory input associated with the trial Ti, denoted 1410 in FIG. 14. Such predictor sensory input state may be denoted as x1. The robotic device may attempt to learn to approach (behavior B1) the cup at trial 1410. The cup may be absent in the sensory input subsequent to trial 1410. The robotic device may be engaged in learning other behaviors triggered by other sensory stimuli. A different object (e.g., a bottle) denoted as x2 in FIG. 14 may be visible in the sensory input. The robotic device may attempt to learn to grasp (behavior B2) the bottle at trial 1412. At a subsequent time, the cup may again be present in the sensory input. The robotic device may attempt to continue learning to approach (behavior B1) the cup at trials 1412, 1414.

Whenever the bottle may be visible in the sensory input, the robotic device may continue learning grasping behavior (B2) trials 1422, 1424. In some realizations, learning trials of two or more behaviors may overlap in time (e.g., 1412, 1422 in FIG. 14). The robotic device may be configured to execute given actions (e.g., learn a behavior) in response to a particular input stimuli rather than based on a particular time.

Operation of the controller (e.g., 212 in FIG. 2A) and/or the predictor (e.g., 202 in FIG. 2A) may be based on the input 206 (e.g., sensory context). As applied to the above illustration of training a rover to turn in response to, e.g., detecting an obstacle, as the rover executes the turn the sensory input (e.g., the obstacle representation) may change. Predictor training when the sensory input changes is described below with respect to data summarized in Table 2, in accordance with one or more implementations.

Responsive to the robotic controller detecting an obstacle (sensory input state x1), the controller output (e.g., 208 in FIG. 2A) may comprise commands to execute a 45° turn. In some implementations, (e.g., described with respect to Table 1 supra) the turn maneuver may comprise a sudden turn (e.g., executed in a single command, e.g., Turn=45°). In some implementations, (e.g., described with respect to Table 2) the turn maneuver may comprise a gradual turn effectuated by two or more turn increments (e.g., executed in five commands, Turn=9°).

As shown in Table 2 during Trial 1, the controller output is configured at 9° throughout the training. The sensory, associated with the turning rover, is considered as changing for individual turn steps. Individual turn steps (e.g., 1 through 5 in Table 2) are characterized by different sensory input (state and/or context x1 through x5).

At presented in Table 2, during Trial 1, the predictor may be unable to adequately predict controller actions due to, at least in part, different input being associated with individual turn steps. The rover operation during Trial 1 may be referred to as the controller controlled with the controller performing 100% of the control.

TABLE 2

| | | Trial 1 | | | Trial 2 | | | Trial 3 | | |
|---|---|---|---|---|---|---|---|---|---|---|
| Step # | State | u° | $u^{P\circ}$ | ü° | u° | $u^{P\circ}$ | ü° | u° | $u^{P\circ}$ | ü° |
| 1 | x1 | 9 | 0 | 9 | 9 | 3 | 12 | 5 | 6 | 11 |
| 2 | x2 | 9 | 0 | 9 | 8 | 3 | 11 | 2 | 6 | 8 |
| 3 | x3 | 9 | 0 | 9 | 7 | 3 | 10 | 3 | 5 | 8 |
| 4 | x4 | 9 | 0 | 9 | 9 | 3 | 12 | 9 | 6 | 15 |
| 5 | x5 | 9 | 0 | 9 | 3 | 3 | 6 | 1 | 5 | 6 |
| Total | | 45 | 0 | 45 | 36 | 15 | 51 | 20 | 28 | 48 |

The Trial 2, summarized in Table 2, may correspond to another occurrence of the object previously present in the sensory input processes at Trial 1. At step 1 of Trial 2, the controller output may comprise a command to turn 9° based on appearance of the obstacle (e.g., x1) in the sensory input. Based on prior experience (e.g., associated with sensory states x1 through x5 of Trial 1), the predictor may generate predicted output=3° at steps 1 through 5 of Trial 2, as shown in Table 2. In accordance with sensory input and/or plant feedback, the controller may vary control output u at steps 2 through 5. Overall, during Trial 2, the predictor is able to contribute about 29% (e.g., 15° out of 51°) to the overall control output u. The rover operation during Trial 2 may be referred to as jointly controlled by the controller and the predictor. It is noteworthy, neither the predictor nor the controller are capable of individually providing target control output of 45° during Trial 2.

The Trial 3, summarized in Table 2, may correspond to another occurrence of the object previously present in the sensory input processes at Trials 1 and 2. At step 1 of Trial 3, the controller output may reduce control output 3° turn based on the appearance of the obstacle (e.g., x1) in the sensory input and/or prior experience during Trial 2, wherein the combined output u1' was in excess of the target 9°. Based on the prior experience (e.g., associated with sensory states x1 through x5 of Trials 1 and 2), the predictor may generate predicted output $u^P$=5°, 6° at steps 1 through 5 of Trial 3, as shown in Table 2. Variations in the predictor output $u^P$ during Trial 3 may be based on the respective variations of the controller output. In accordance with sensory input and/or plant feedback, the controller may vary control output u at steps 2 through 5. Overall, during Trial 3, the predictor is able to contribute about 58% (e.g., 28° out of 48°) to the overall control output ü. The combined control output during Trial 3 is closer to the target output of 48°, compared to the combined output (51°) achieved at Trial 2. The rover operation during Trial 2 may be referred to as jointly controlled by the controller and the predictor. It is noteworthy, the neither the predictor nor the controller are capable of individually providing target control output of 45° during Trial 3.

At a subsequent trial (not shown) the controller output may be reduced to zero while the predictor output may be increased to provide the target cumulative turn (e.g., 45°).

Training results shown and described with respect to Table 1-Table 2 are characterized by different sensory context (e.g., states x1 through x5) corresponding to individual training steps. Step-to-step sensory novelty may prevent the predictor from learning controller output during the duration of the trial, as illustrated by constant predictor output $u^P$ in the data of Table 1-Table 2.

Table 3 presents training results for an adaptive predictor apparatus (e.g., 202 of FIG. 2A) wherein a given state of the sensory may persist for two or more steps during a trial, in accordance with one or more implementations. Persistence of the sensory input may enable the predictor to learn controller output during the duration of the trial.

TABLE 3

| Step # | State | u° | u^P° | û° |
|---|---|---|---|---|
| 1 | x1 | 9 | 0 | 9 |
| 2 | x1 | 9 | 3 | 12 |
| 3 | x1 | 7 | 6 | 13 |
| 4 | x2 | 9 | 0 | 9 |
| 5 | x2 | 2 | 3 | 5 |
| Total |  | 36 | 12 | 48 |

As shown in Table 3, sensory state x1 may persist throughout the training steps 1 through 3 corresponding, for example, a view of a large object being present within field of view of sensor. The sensory state x2 may persist throughout the training steps 4 through 5 corresponding, for example, another view the large object being present sensed.

At steps 1,2 of Trial of Table 3, the controller may provide control output comprising a 9° turn control command. At step 3, the predictor may increase its output to 3°, based on a learned association between the controller output u and the sensory state x1.

At step 3 of Trial of Table 3, the controller may reduce its output u to 7° based on the combined output u2'=12° of the prior step exceeding the target output of 9°. The predictor may increase its output based on determining a discrepancy between the sensory state x1 and its prior output (3°).

At step 4 of Trial of Table 3, the sensory state (context) may change, due to for example a different portion of the object becoming visible. The predictor output may be reduced to zero as the new context x2 may not have been previously observed.

At step 5 of Trial of Table 3, the controller may reduce its output u to 2° based on determining amount of cumulative control output (e.g., cumulative turn) achieved at steps 1 through 4. The predictor may increase its output from zero to 3° based on determining a discrepancy between the sensory state x2 and its prior output $u4^P=0°$. Overall, during the Trial illustrated in Table 3, the predictor is able to contribute about 25% (e.g., 12° out of 48°) to the overall control output ü.

Figure 15:
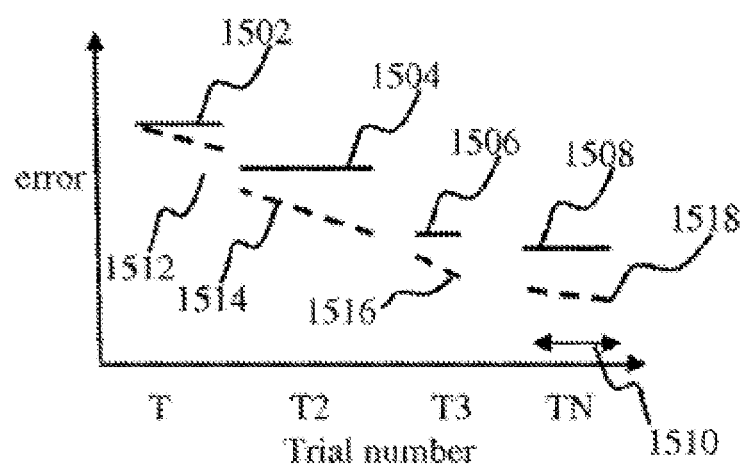
FIG. 15 is a plot illustrating performance of an adaptive predictor apparatus of, e.g., FIG. 3A, during training, in accordance with one or more implementations.

FIG. 15 illustrates performance of training of a robotic apparatus, comprising an adaptive predictor of the disclosure. Solid line segments 1502, 1504, 1506, 1508 denote predictor error obtained with training configuration wherein individual steps within a duration of a trial (denoted by arrow 1510) may be characterized by varying sensory state (e.g., states x1 through x5 described with respect to Table 2). Broken line segments 1512, 1514, 1516, 1518 denote predictor error obtained with training configuration wherein individual steps within the trial duration may be characterized by consistent sensory input state (e.g., states x1 through x5 described with respect to Table 2). In some implementations, the predictor error may be described as follows:

$$\varepsilon(t_i)=|u^P(t_{i-1})-u^d(t_i)|. \quad \text{(Eqn. 15)}$$

In other words, prediction error is determined based on (how well) the prior predictor output matches the current teaching (e.g., target) input. In one or more implementations, predictor error may comprise a root-mean-square deviation (RMSD), coefficient of variation, and/or other parameters.

As shown in FIG. 15, predictor error diminishes as training progresses (e.g., with increasing trial number). It is noteworthy that: (i) predictor error corresponding to segments 1502, 1504, 1506, 1508 (e.g., constant sensory state during trials) may be constant (and/or varying insignificantly) through individual trials; and (ii) predictor error corresponding to segments 1512, 1514, 1516, 1518 (e.g., constant sensory state during trials) may diminish through individual trials. The latter behavior may be related to a greater degree of sustained sensory experience by the predictor during learning responsive to consistent sensory input.

Referring now to FIG. 2B, predictor operation (e.g., 222 in FIG. 2B) based on a training signal is discussed, in accordance with one or more implementations. The predictor 222 of the adaptive control system 220 of FIG. 2B may comprise a spiking neuron network (comprising for example the neuron 140 of FIG. 1B above) configured to implement reinforcement and/or supervised learning described with respect to FIG. 1B above.

The training signal (e.g., 204 in FIG. 2B) may be configured to inform the predictor about the combined output to the plant. This configuration may enable the predictor 222 to adjust the predicted output 238 to match the target output 240 more rapidly, compared to the predictor output in the absence of the training signal (e.g., output 218 of FIG. 2A).

Some existing adaptive controllers avoid using controller output as the teaching input into the same system, as any output drift and/or an erroneous output may be reinforced via learning, resulting in a drift, e.g., growing errors with time, in the outputs of the learning system.

Control configuration (e.g., such as illustrated in FIG. 2B) wherein output of the predictor may be fed back to the predictor as a teaching signal, may advantageously reduce susceptibility of the control system (e.g., 220 in FIG. 2B) to drift and/or DC bias. For example, responsive to absence of controller output 208, the teaching signal may comprise a copy of the predictor output. In some implementations, (e.g., of Eqn. 15) responsive to the predictor output matching the target signal, predictor state may remain unchanged (e.g., no adaptation) due to zero error. In one or more implementations characterized by the predicted signal 238 drift, the controller may generate a correction signal. The controller output (e.g., 208) may be combined with the predictor output 238 to generate the teaching signal 204 thereby removing the drift.

The combiner 234 may be operated in accordance with the transfer function expressed, for example via Eqn. 7.

An exemplary training sequence of adaptive system 220 operation, comprising the predictor training input 204 of FIG. 2B may be expressed as follows:

During first trial at time T1:
 the controller may receive a sensory input (e.g., 206, 226 in FIG. 2B) containing x1 and may generate output u1;
 the predictor may receive the sensory input x1 (or a portion of thereof), and may be configured to generate predicted control signal (e.g., $u1^P=0°$);
 the combiner may produce the combined output 1.11=45°; this output may be provided to the predictor as the teaching (target) signal at a subsequent time instance; and
 the plant 210 may begin to turn right in accordance with the combined control signal (e.g., 240)/11=45°.

During another trial at time T2>T1:
 the controller may receive a sensory input (e.g., 206, 226 in FIG. 2B) containing x1 and may generate output u2=45°;
 the predictor may receive the sensory input x1 (or a portion of thereof), and the teaching (target) signal ü1=45° produced by the combiner at a prior trial (e.g., T1); the predictor may be configured to 'mimic' the combined output ü; the predictor may be configured to generate predicted control signal (e.g., $u2^P=30°$) based on the sensory input, plant feedback and/or the teaching signal;

the combiner may produce the combined output U2=75° (e.g., in accordance with, for example, Eqn. 7); and the plant 210 may increase the turn rate with the control signal U2.

During another trial at time T3>T2:

the controller may determine that the rate of turn is in excess of the target turn of 45°, and may generate control output u3=0°;

the predictor may receive the sensory input x (or a portion of thereof), and the teaching (target) signal ũ2=75° produced by the combiner at a prior trial (e.g., T2); the predictor may be configured to generate predicted control signal (e.g., u3P=50°) based on the sensory input, plant feedback and/or the teaching signal;

the combiner may produce the combined output/13=50° (e.g., in accordance with, for example, Eqn. 7); and the plant 210 may execute the turn in accordance with the control signal U3.

Subsequently, at times T4, T5, TM>T2 the predictor output to the combiner 234 may result in the control signal 240 to turn the plant by 45° and the controller output 208 may be reduced to zero. In some implementations, the outcome of the above operational sequence may be referred to as (gradual) transfer of the controller output to the predictor output. When the predictor is capable to producing the target output, the controller output (e.g., 208 in FIGS. 2A-2B) may be withdrawn (removed). The output of the combiner (e.g., 214, 234) may comprise the predictor output in accordance with, for example, Eqn. 3.

In one or more implementations comprising spiking control and/or predictor signals (e.g., 208, 218, 238, 224, 240 in FIG. 2A-2B), the withdrawal of the controller output may correspond to the controller 208 generating spike output at a base (background) rate. By way of illustration, spike output at a (background) rate of 2 Hz may correspond to 'maintain course' control output; output above 2 Hz may indicate a turn command. The turn rate may be encoded as spike rate, number of spikes, and/or spike latency in various implementations. In some implementations, zero output (e.g., controller 208, predictor 218, and/or combiner 240) may comprise a 'zero signal', such as a pre-defined signal, a constant (e.g., a dc offset or a bias), spiking activity at a mean-firing rate, and/or other zero signal.

Output 224, 240 of the combiner e.g., 214, 234, respectively, may be gated. In some implementations, the gating information may be provided to the combiner by the controller 212. In one such realization of spiking controller output, the controller signal 208 may comprise positive spikes indicative of a control command and configured to be combined with the predictor output (e.g., 218); the controller signal 208 may comprise negative spikes, where the timing of the negative spikes is configured to communicate the control command, and the (negative) amplitude sign is configured to communicate the combination inhibition information to the combiner 214 so as to enable the combiner to 'ignore' the predictor output 218 for constructing the combined output 224.

In some implementations of spiking controller output, the combiner 214, 234 may comprise a spiking neuron (e.g., the neuron 140 described in FIG. 1B supra); and the controller signal 208 may be communicated via two or more connections. One such connection may be configured to communicate spikes indicative of a control command to the combiner neuron (e.g., via connection 124 in FIG. 1B); the other connection may be used to communicate an inhibitory signal to the combiner neuron (e.g., via connection 134 in FIG. 1B). The inhibitory signal may cause the combiner 214, 234 to 'ignore' the predictor output 218 when constructing the combined output 224.

The gating information may be provided to the combiner via a connection 242 from another entity (e.g., a human operator controlling the system with a remote control, and/or external controller) and/or from another output from the controller 212 (e.g. an adapting block, or an optimal controller). In one or more implementations, the gating information delivered via the connection 242 may comprise any of a command, a memory address of a register storing a flag, a message, an inhibitory efficacy, a value (e.g., a weight of zero to be applied to the predictor output 218 by the combiner), and/or other information capable of conveying gating instructions to the combiner.

The gating information may be used by the combiner e.g., 214, 234 to inhibit and/or suppress the transfer function operation. The suppression 'veto' may cause the combiner output (e.g., 224, 240) to be comprised of the controller portion 208, e.g., in accordance with Eqn. 4. In some implementations, the combiner (e.g., 234 in FIG. 2B) may comprise a network of a spiking neurons. One or more neurons of the combiner network may be configured to receive the predicted input (e.g., 238 in FIG. 2B), referred to as the combiner input neurons. The gating signal may comprise an inhibitory indication (delivered to the combiner network by, e.g., the connection 242) that may be configured to inhibit individual ones of the one or more combiner input neurons of the combiner network thereby effectively removing the predictor input from the combined output (e.g., 240 in FIG. 2B).

In one or more implementations, another one or more neurons of the combiner network may be configured to generate the combined output (e.g., 240 in FIG. 2B), referred to as the combiner output neurons. The gating signal may comprise an inhibitory indication (delivered to the combiner network by, e.g., the connection 242) that may be configured to inhibit the output from the combiner. Zero combiner output may, in some realizations, cause zero teaching signal (e.g., 204 in FIG. 2B) to be provided to the predictor so as to signal to the predictor a discrepancy between the target action (e.g., controller output 208) and the predicted action (e.g., output 238).

The gating signal may be used to veto predictor output 218, 238 based on the predicted output being away from the target output by more than a given margin. The margin may be configured based on an application and/or state of the trajectory. For example, a smaller margin may be applicable in navigation applications wherein the platform is proximate to a hazard (e.g., a cliff) and/or an obstacle. A larger error may be tolerated when approaching one (of many) targets.

By way of a non-limiting illustration, if the turn is to be completed and/or aborted (due to, for example, a trajectory change and/or sensory input change), and the predictor output may still be producing turn instruction to the plant, the gating signal may cause the combiner to veto (ignore) the predictor contribution and to pass through the controller contribution.

Predictor and controller outputs (218/228, 208, respectively in FIGS. 2A-2B) may be of opposite signs. In one or more implementations, positive predictor output (e.g., 228) may exceed the target output that may be appropriate for performance of as task (e.g., as illustrated by data of trials 8-9 in Table 1). Controller output may be configured to comprise negative signal (e.g., −10) in order to compensate for overprediction by the predictor.

Gating and/or sign reversal of controller output, may be useful, for example, responsive to the predictor output being incompatible with the sensory input (e.g., navigating towards a wrong target). Rapid (compared to the predictor learning time scale) changes in the environment (e.g., appearance of a new obstacle, target disappearance), may require a capability by the controller (and/or supervisor) to 'overwrite' predictor output. In one or more implementations compensation for overprediction may be controlled by a graded form of the gating signal delivered via the connection 242.

Figure 3A:
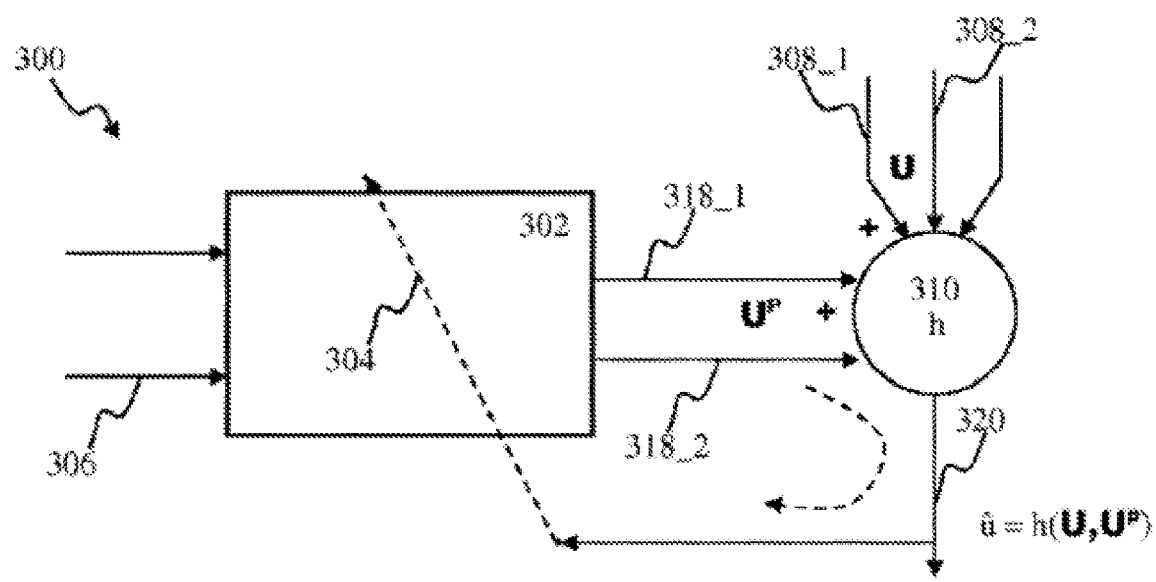
FIG. 3A is a block diagram illustrating a multichannel adaptive predictor apparatus, according to one or more implementations.
Figure 3B:
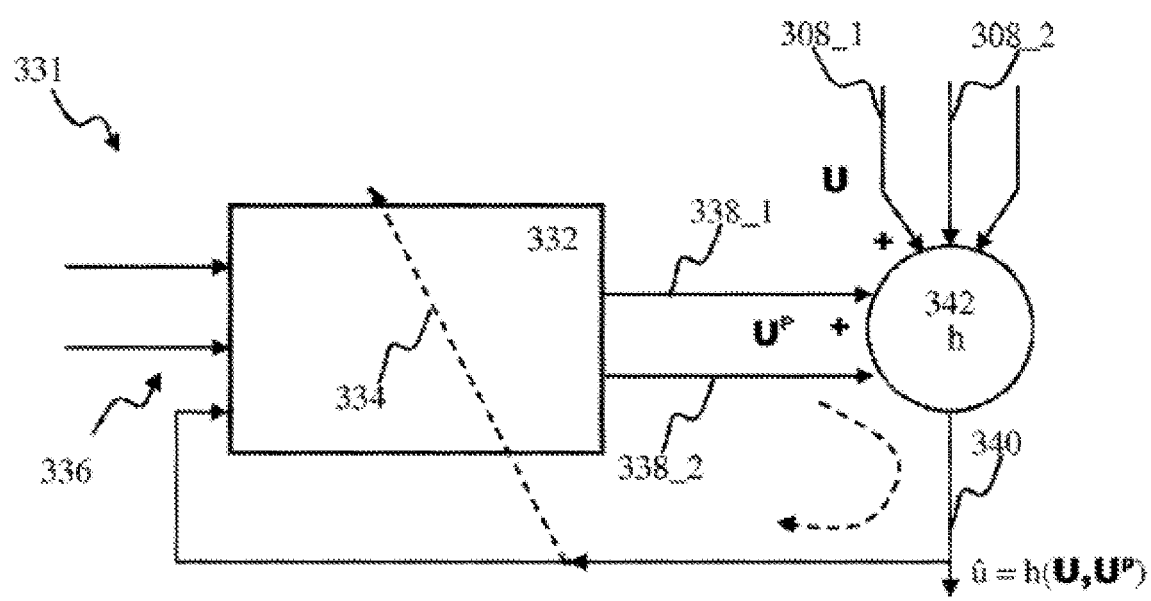
FIG. 3B is a block diagram illustrating an adaptive predictor apparatus configured to generate a multichannel output, according to one or more implementations.

FIGS. 3A-3B illustrate combiner apparatus configured to operate with multichannel controller and/or predictor signals (e.g., 208, 218/238 in FIGS. 2A-2B, respectively). The combiner apparatus may be utilized with an adaptive controller (e.g., the controller 102 in FIG. 1A and/or the controller 200, 220, of FIGS. 2A-2B) configured to operate a plant (e.g., the plant 110, in FIG. 1A and/or the plant 210 in FIGS. 2A-2B).

The combiner 310 of FIG. 3A may receive an M-dimensional (M>1) control signal 308. The control signal U may comprise a vector corresponding to a plurality of input channels (e.g., 3081, 3082 in FIG. 3A). Individual channels, may be configured to communicate individual dimensions (e.g., vectors) of the input U, as described in detail for example with respect to FIG. 13B, below.

The predictor may be configured to generate N-dimensional (N>1) predicted control output 318. In some implementations, individual teaching signal may be de-multiplexed into multiple teaching components. Predictor learning process may be configured to adapt predictor state based on an individual teaching component. In one or more implementations, predictor may comprise two or more learning processes (effectuated, for example, by a respective neuron network) wherein adaptation of individual learning process may be based on a respective teaching input component (or components). In one or more implementations, multichannel predictor may be comprises of an array of individual predictors as in 222

The predicted signal $U^P$ may comprise a vector corresponding to a plurality of output channels (e.g., 3181, 3182 in FIG. 3A). Individual channels 3181, 3182 may be configured to communicate individual dimensions (e.g., vectors) of the signal 318, as described in detail for example with respect to FIG. 13B, below. Predictor 302 operation may be based on one or more sensory inputs 306. In some implementations, the sensory input 306 may comprise the sensory input 106 and/or 206, described with respect to FIGS. 1A, 2B above.

The combiner may be operable in accordance with a transfer function h configured to combine signals 308, 318 and to produce single-dimensional control output 320:

$$\hat{u} = h(U, U^P).\qquad\text{(Eqn. 16)}$$

In one or more implementations, the combined control output 320 may be provided to the predictor as the training signal. The training signal may be utilized by the predictor learning process in order to generate the predicted output 318 (e.g., as described with respect to FIG. 2B, supra).

The use of multiple input channels (3081, 3082 in FIG. 3B) and/or multiple predictor output channels (e.g., 3381, 338_2 in FIG. 3B) to communicate a single signal (e.g., control signal U and/or predicted control signal $U^P$) may enable more robust data transmission when compared to a single channel per signal data transmission schemes. Multichannel data transmission may be advantageous in the presence of background noise and/or interference on one or more channels. In some implementations, wherein individual channels are characterized by bandwidth that may be lower than the data rate requirements for the transmitted signal (e.g., control signal U and/or predicted control signal $U^P$) multichannel data transmission may be utilized to de-multiplex the higher data rate signal onto two or more lower capacity communications channels (e.g., 3381, 338_2 in FIG. 3B).

FIG. 3B illustrates an adaptive system 331 wherein the predictor 332 is configured to receive the combined control output (e.g., 340 in FIG. 3B) as a part of the sensory input 336 (e.g., 306 in FIG. 3A). The N-dimensional output 338 of the predictor 332 may be combined by the combiner 342 with the M-dimensional control input 308 to produce control signal 340. In one or more implementations the combined control signal 340 may serve as input to another predictor configured to receive this input (as e.g., 216, 306 in FIGS. 2B-3A).

The N-dimensional predictor output 338 may comprise a plurality of vectors corresponding to a plurality of channels (e.g., 3381, 338_2 in FIG. 3B). Individual channels 3381, 338_2 may be configured to communicate individual dimensions (e.g., vectors) of the predicted signal $U^P$, as described in detail for example with respect to FIG. 13B, below.

The predictor 332 learning process may be operable based on a teaching signal 334. Mapping between the controller input 308, the predictor output 338, the combiner output 340, and the teaching signal 334 may comprise various signal mapping schemes. In some implementations, mapping schemes may include one to many, many to one, some to some, many to some, and/or other schemes.

In spiking neuron networks implementations, inputs (e.g., 308, 318 and 308 337 of FIGS. 3A-3B, respectively) into a combiner (e.g., 310, 342 in FIGS. 3A-3B) may comprise signals encoded using spike latency and/or spike rate. In some implementations, inputs into the combiner may be encoded using one encoding mechanism (e.g., rate). In one or more implementations, inputs into the combiner may be encoded using single two (or more) encoding mechanisms (e.g., rate, latency, and/or other).

In some implementations, connections delivering inputs into one or more spiking neurons of the combiner (e.g., connections 124 in FIG. 1B) may be configured to directly modify one or more parameters of the, inputs into the combiner may be encoded using one encoding mechanism (e.g., rate). In one or more implementations, inputs into the combiner may be encoded using single two (or more) encoding mechanisms (e.g., rate, latency, and/or other encoding mechanisms).

Combiner output (320, 340) may be encoded using spike latency and/or spike rate. In some implementations, the output encoding type may match the input encoding type (e.g., latency in—latency out). In some implementations, the output encoding type may differ from the input encoding type (e.g., latency in—rate out).

Combiner operation, comprising input decoding-output encoding methodology, may be based on an implicit output determination. In some implementations, the implicit output determination may comprise, determining one or more input values using latency and/or rate input conversion into e.g., floating point and/or integer; updating neuron dynamic process based on the one or more input values; and encoding neuron output into rate or latency. In one or more implementations, the neuron process may comprise a deterministic realization (e.g., Izhikevich neuron model, described for example in U.S. patent application Ser. No. 13/623,842, entitled "SPIKING NEURON NETWORK ADAPTIVE CONTROL APPARATUS AND METHODS", filed Sep. 20, 2012, incorporated supra; and/or a stochastic process such as described, for example, in U.S. patent application Ser. No. 13/487,533, entitled "STOCHASTIC SPIKING NETWORK LEARNING APPARATUS AND METHODS", incorporated supra.

Figure 3C:
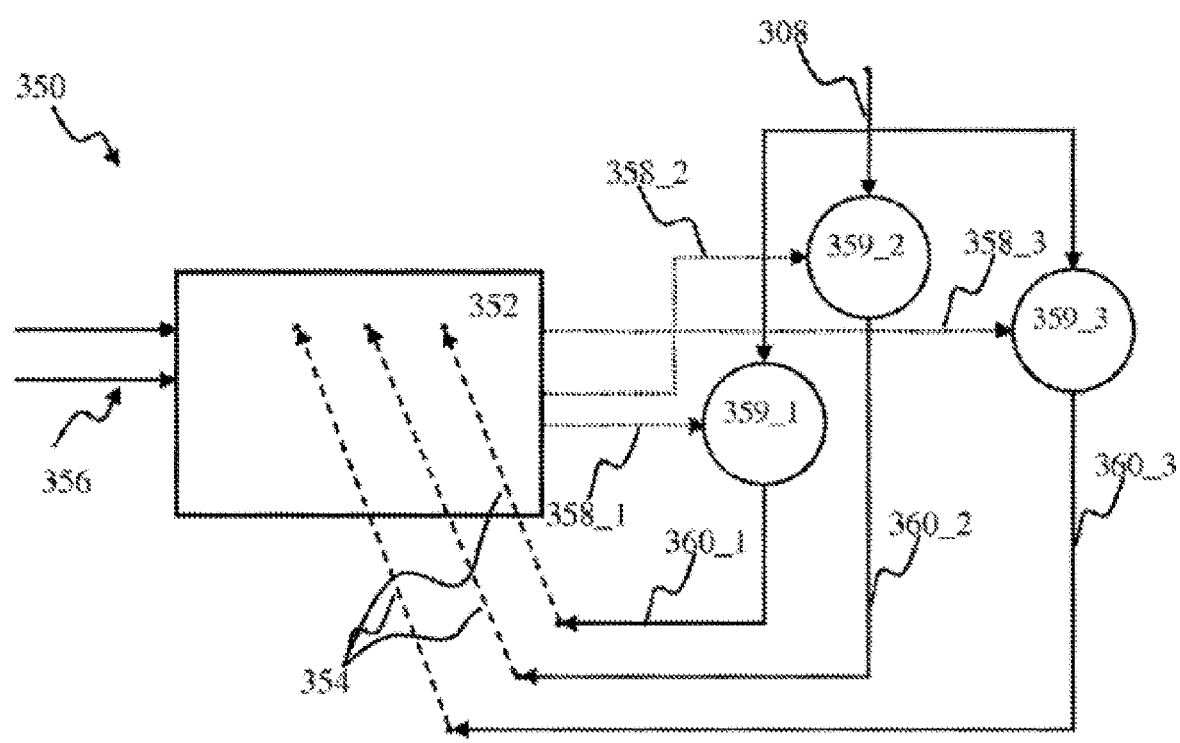
FIG. 3C is a block diagram illustrating a multichannel adaptive predictor configured to interface to a plurality of combiner apparatus, according to one or more implementations.

In some implementations, combiner operation, comprising input decoding-output encoding methodology, may be based on an explicit output determination, such as, for example, expressed by Eqn. 4-Eqn. 9, Eqn. 14, Eqn. 20-Eqn. 21. FIG. 3C illustrates an adaptive system 350 comprising a predictor 352 and two or more combiner apparatus 359. Individual combiner apparatus (e.g., 3591), of system 530 may be operable in accordance with any of the applicable methodologies, such as described above with respect to FIG. 3B.

The predictor 352 may be configured to generate predicted output 358 based on the sensory input 356 (e.g., 306 in FIG. 3A), and two or more teaching signals 354 that may comprise outputs 360 of the respective combiners 359. Combiner output (e.g., 360_1) may be determined based on the controller input (e.g., 308) and the respective predictor output using, for example, Eqn. 7. In some implementations, input into the combiners 359 may comprise multichannel input, as described, for example, with respect to FIG. 3B, above.

Figure 3D:
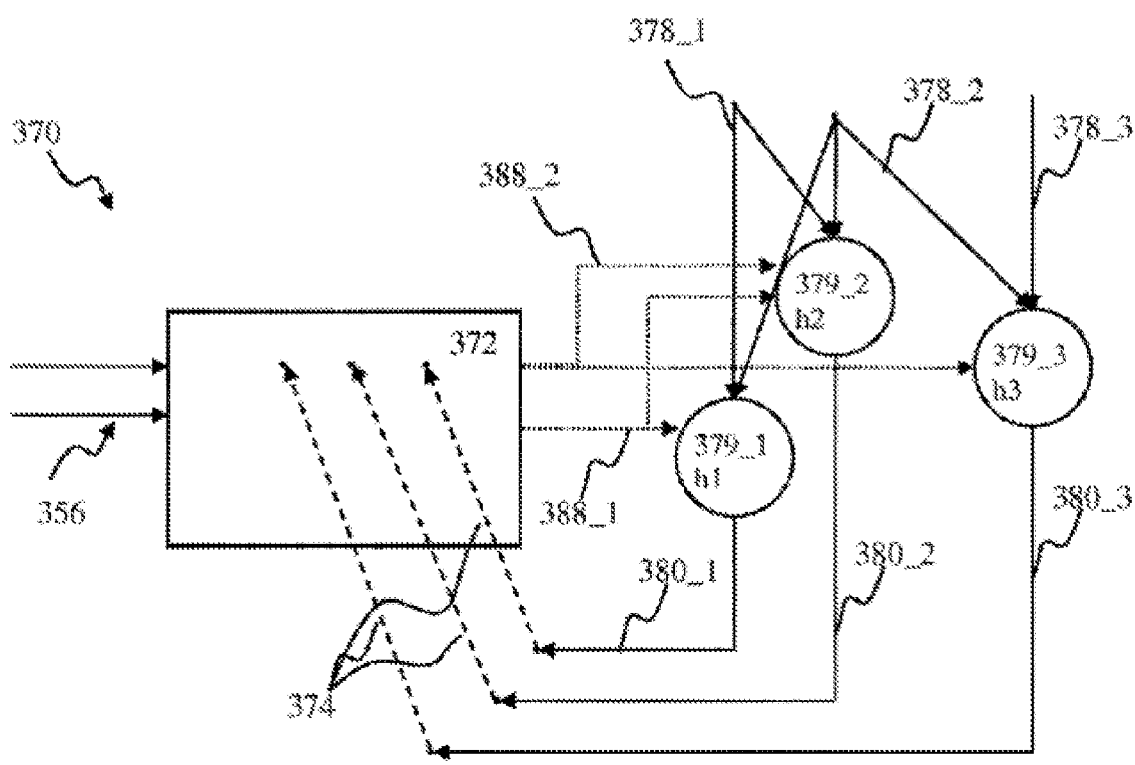
FIG. 3D is a block diagram illustrating a multiplexing adaptive predictor configured to interface to a plurality of combiner apparatus, according to one or more implementations.

In some implementations, a complex teaching signal may be decomposed into multiple components that may drive adaptation of multiple predictor blocks (associated with individual output channels, e.g., 388 in FIG. 3D). Prediction of a (given) teaching signal 354 may be spread over multiple predictor output channels 358. Once adapted, outputs of multiple predictor blocks may be combined thereby providing prediction of the teaching signal (e.g., 354 in FIG. 3C). Such an implementation may increase the number of teaching signals that can be mediated using a finite set of control signal channels.

In one or more implementations, a single output predictor channel 358 may contain prediction of multiple teaching signals (e.g., 374 in FIG. 3D). That approach may be utilized responsive to information capacity of the predictor output channel (e.g., how much information may be encoded onto a single channel) is higher than information capacity of teaching signal.

In some implementations, a combination of the above approaches (e.g., comprising two or more teaching signals and two or more predictor output channels) may be employed.

FIG. 3D illustrates an adaptive system 370 comprising a multiplexing predictor 372 and two or more combiner apparatus 379. Controller input U may be de-multiplexed into two (e.g., input 378_1 into combiners 3791, 379_2) and/or more (input 378_2 into combiners 3791, 3792, 3793). Individual combiner apparatus 379 may be configured to multiplex one (or more) controller inputs 378 and two or more predictor outputs $U^P$ 388 to form a combined signal 380. In some implementations, the predictor output for a given combiner may be spread (de-multiplexed) over multiple prediction channels (e.g., 3881, 388_2 for combiner 379_2). In one or more implementations, teaching input to a predictor may be delivered via multiple teaching signal 374 associated with two or more combiners.

The predictor 372 may operate in accordance with a learning process configured to determine an input-output transformation such that the output of the predictor $U^P$ after learning is configured to match the output of the combiner h(U, $U^P$) prior to learning (e.g., when $U^P$ comprises a null signal).

Predictor transformation F may be expressed as follows:

$$U^P = F(\hat{U}), \hat{U} = h(U^P). \quad \text{(Eqn. 17)}$$

In some implementations, wherein dimensionality of control signal U matches dimensionality of predictor output $U^P$, the transformation of Eqn. 17 may be expressed in matrix form as:

$$U^P = F\hat{U}, \hat{U} = HU^P, F = inv(H), \quad \text{(Eqn. 18)}$$

where H may denote the combiner transfer matrix composed of transfer vectors for individual combiners 379 H=[h1, h2, . . . hn], Ü=[ü1, ü2, . . . ün] may denote output matrix composed of output vectors 380 of individual combiners; and F may denote the predictor transform matrix. The combiner output 380 may be provided to the predictor 372 and/or another predictor apparatus as teaching signal 374 in FIG. 3D. In some implementations, (e.g., shown in FIG. 3B), the combiner output 380 may be provided to the predictor 372 as sensory input signal (not shown in FIG. 3D).

In some implementations of multi-channel predictor (e.g., 352, 372) and/or combiner (e.g., 35, 379) various signal mapping relationships may be utilized such as, for example, one to many, many to one, some to some, many to some, and/or other relationships (e.g., one to one).

In some implementations, prediction of an individual teaching signal (e.g., 304 in FIG. 3A) may be spread over multiple prediction channels (e.g., 318 in FIG. 3A). In one or more implementations, an individual predictor output channel (e.g., 388_2 in FIG. 3D) may contain prediction of multiple teaching signals (e.g., two or more channels 374 in FIG. 3D).

Transfer function h (and or transfer matrix H) of the combiner (e.g., 359, 379 in FIGS. 3C-3D) may be configured to perform a state space transformation of the control input (e.g., 308, 378 in FIGS. 3C-3D) and/or predicted signal (e.g., 358, 388 in FIGS. 3C-3D). In one or more implementations, the transformation may comprise one or more of a time-domain to frequency domain transformations (e.g., Fourier transform, discrete Fourier transform, discrete cosine transform, wavelet and/or other transformations), frequency domain to time domain transformations (e.g., inverse Fourier transform, inverse discrete Fourier transform, inverse discrete cosine transform, and/or other transformations), wavenumber transform, and/or other transformations. The state space transformation may comprise an application of a function to one (or both) input parameters (e.g., u, $u^P$) into the combiner. In some implementations, the function may be selected from an exponential function, logarithm function, a Heaviside step function, and/or other functions.

In implementations where the combiner is configured to perform the state—space transform (e.g., time-space to frequency space), the predictor may be configured to learn an inverse of that transform (e.g., frequency-space to time-space). Such predictor may be capable of learning to transform, for example, frequency-space input u into time-space output $u^P$.

In some implementations, predictor learning process may be configured based on one or more look-up tables (LUT). Table 4 and Table 5 illustrate use of look up tables for learning obstacle avoidance behavior (e.g., as described with respect to Table 1-Table 3 and/or FIG. 7, below).

Table 4-Table 5 present exemplary LUT realizations characterizing the relationship between sensory input (e.g., distance to obstacle d) and control output (e.g., turn angle a relative to current course) obtained by the predictor during training. Columns labeled N in Table 4-Table 5, present use occurrence N (i.e., how many times a given control action has been selected for a given input, e.g., distance). Responsive to a selection of a given control action (e.g., turn of 15°) based on the sensory input (e.g., distance from an obstacle of 0.7 m), the counter N for that action may be incremented. In some implementations of learning comprising opposing control actions (e.g., right and left turns shown by rows 3-4 in Table 5), responsive to a selection of one action (e.g., turn of +15°) during learning, the counter N for that action may be incremented while the counter for the opposing action may be decremented.

As seen from the example shown in Table 4, as a function of the distance to obstacle falling to a given level (e.g., 0.7 m), the controller may produce a turn command. A 15° turn is most frequently selected during training for distance to obstacle of 0.7 m. In some implementations, predictor may be configured to store the LUT (e.g., Table 4) data for use during subsequent operation. During operation, the most frequently used response (e.g., turn of 15°) may be output for a given sensory input, in one or more implementations, In some implementations, the predictor may output an average of stored responses (e.g., an average of rows 3-5 in Table 4).

TABLE 4

| d | a° | N |
|---|----|---|
| 0.9 | 0 | 10 |
| 0.8 | 0 | 10 |
| 0.7 | 15 | 12 |
| 0.7 | 10 | 4 |
| 0.7 | 5 | 1 |
| 0.5 | 45 | 3 |

TABLE 5

| d | a° | N |
|---|----|---|
| 0.9 | 0 | 10 |
| 0.8 | 0 | 10 |
| 0.7 | 15 | 12 |
| 0.7 | −15 | 4 |
| 0.5 | 45 | 3 |

In one or more implementations (e.g., the predictor 400 of FIG. 4) wherein the predictor comprises a spiking neuron (e.g., 140 of FIG. 1B) network, learning a given behavior (e.g., obstacle avoidance and/or target approach) may be effectuated by storing an array of efficacies (e.g., 126 in FIG. 1B) of connections within the predictor network. In some implementations, the efficacies may comprise connection weights, adjusted during learning using, for example, methodology of Eqn. 11, described above. In some implementations, connection plasticity (e.g., efficacy adjustment of Eqn. 11) may be implemented based on the teaching input as follows:

based on a teaching input (e.g., spike) and absence of neuron output spike connections delivering input spikes into the neuron (active connection) that precede the teaching spike (within a plasticity window), may be potentiated; and/or based on neuron output spike in absence of teaching input, active connections delivering input spikes into the neuron (active connection)) that precede the output spike (within a duration specified by plasticity window), may be depressed.

In some implementations wherein the sensory input may be updated at 40 ms intervals and/or control signal may be updated at a rate of 1-1000 Hz, the duration of the plasticity window may be selected between 1 ms and 1000 ms. Upon learning a behavior, network configuration (e.g., an array of weights) may be stored for future use by the predictor.

Figure 20A:
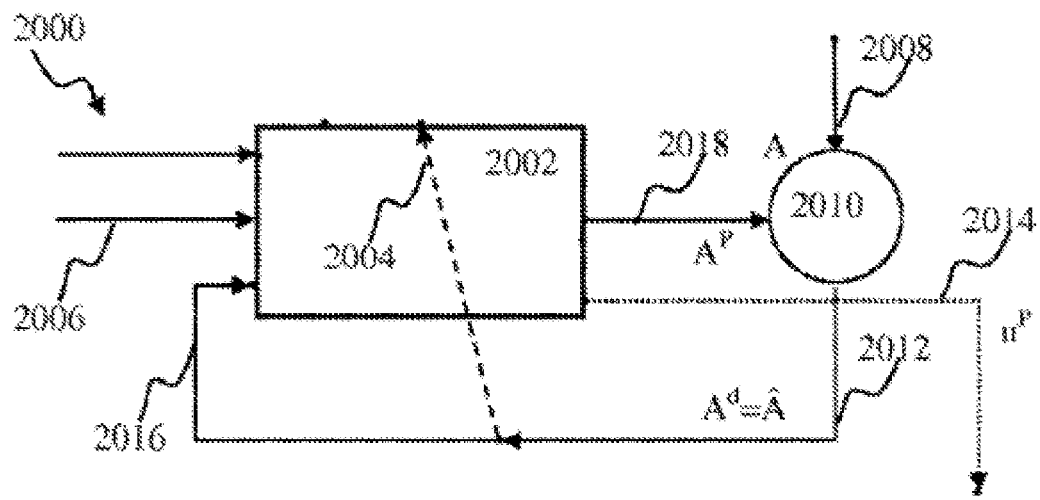
FIG. 20A is a block diagram illustrating an adaptive predictor configured to develop an association between control action and sensory context, according to one or more implementations.

FIG. 20A illustrates an adaptive predictor configured to develop an association between a control action and sensory context, according to one or more implementations. The control system 2000 of FIG. 20A may comprise an adaptive predictor 2002 and a combiner 2012. The combiner 2012 may receive an action indication 2008 from a controller apparatus (e.g., the apparatus 2042 of FIG. 20B and/or 212 of FIG. 2B).

Figure 20B:
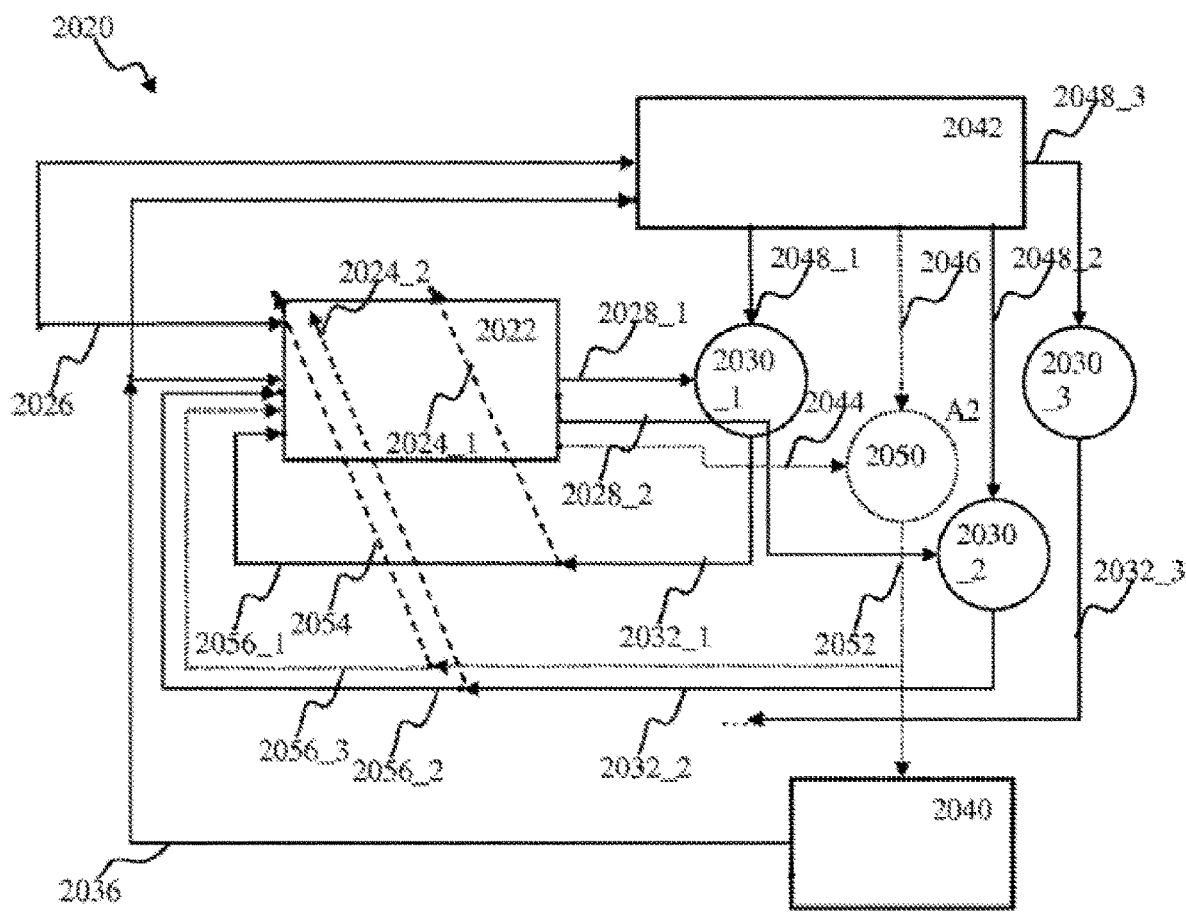
FIG. 20B is a block diagram illustrating a control system comprising an adaptive predictor configured to generate control signal based on an association between control action and sensory context, according to one or more implementations.

In some implementations of a control system, such as described with respect to FIGS. 20A-20B, the controller (e.g., 2042 in FIG. 20B) may be configured to issue a higher level control directive, e.g., the action indication 2008, 2048, in FIGS. 20A-20B that are not directly communicated to the plant (2040) but rather are directed to the predictor (e.g., 2002, 2022 in FIGS. 20A-20B). As used herein the term "action indication" may be used to refer to a higher level instruction by the controller that is not directly communicated to the plant. In one or more implementations, the action indication may comprise, for example, a directive 'turn', 'move ahead'. In some implementations, the control system may utilize a hierarchy of action indications, ranging from less complex/more specific (e.g., turn, move) to more abstract: approach, avoid, fetch, park, grab, and/or other instructions.

Figure 12:
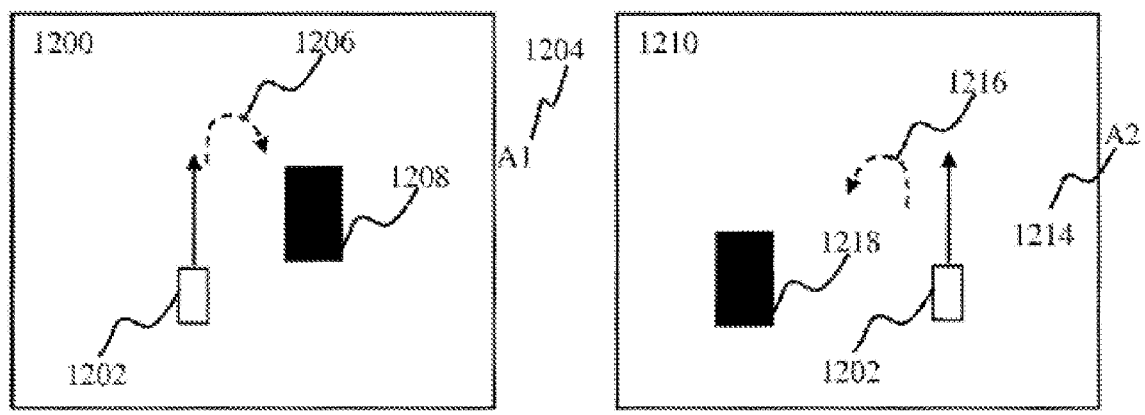
FIG. 12 is a graphical illustration operation of a robotic controller, comprising an adaptive predictor of, e.g., FIGS. 3D-3E configured to develop an association between control action and sensory context, according to one or more implementations.

Action indications (e.g., 2008, 2048 in FIGS. 20A-20B) may be configured based on sensory context (e.g., the sensory input 2006, 2026 in FIGS. 20A-20B). In one or more implementations, the context may correspond to presence of an object (e.g., a target and/or an obstacle), and/or object parameters (e.g., location), as illustrated in FIG. 12. Panels 1200, 1210 in FIG. 12 illustrate position of a robotic device 1202, comprising for example, a control system (e.g., 2000, 2020 of FIGS. 20A-20B). The control system may comprise a controller (2042) and a predictor (2002, 2022). The device 2012 may be configured to approach a target 1208, 1218. The controller of the device 2012 may provide an action indication A1 1204, A2 1214 that may be configured in accordance with the sensory context, e.g., the location of the object 1208, 1218 with respect to the device 1202. By way of a non-limiting example, responsive to the object 1208 being to the right of the device 1202 trajectory (as shown in the panel 1200), the action indication A1 1204 may indicate an instruction "turn right". Responsive to the object 1208 being to the left of the device 1202 trajectory (as shown in the panel 1210), the action indication A2 1214 may indicate an instruction "turn left". Responsive to the sensory context and the instruction 1204, the predictor of the device control system may generate low level motor commands (e.g., depicted by broken arrows 1206, 1216 in FIG. 12) to execute the respective 90° turns to right/left.

Returning now to FIG. 20A, the control system 2000 may comprise the combiner 2012 configured to receive the controller action indication A 2008 and predicted action indication 2018. In some implementations, the combiner 2012 may be operable in accordance with any applicable methodologies, e.g., described with respect to FIGS. 2A-3C, above.

The predictor 2002 may be configured to generate the predicted action indication $A^P$ 2018 based on the sensory context 2006 and/or training signal 2004. In some implementations, the training signal 2004 may comprise the combined output A.

In one or more implementations, generation of the predicted action indication 2018 may be based on the combined signal A being provided as a part of the sensory input (2016) to the predictor. In some implementations comprising the feedback loop 2018, 2012, 2016 in FIG. 20A, the predictor output 2018 may be combined with the controller action indication 2008. The combiner 2010 output signal 2012 may be used as an input 2016 to the predictor. Predictor realizations, comprising action indication feedback connectivity, may be employed in applications, wherein (i) the action indication may comprise a sequence of timed actions (e.g., hitting a stationary target (e.g., a nail) with a hammer by a robotic arm); (ii) the predictor learning process may be sensory driven (e.g., by the sensory input 2006) in absence of plant feedback (e.g., 2036 in FIG. 20B); and (iii) the plant may be characterized by a plant state time parameter that may be greater than the rate of action updates (e.g., the sequence of timed actions 2008). It may be advantageous for the predictor 2002 to account for a prior action within the sequence (e.g., via the feedback input 2016) so as to take into account the effect of its previous state and/or previous predictions in order to make a new prediction. Such methodology may be of use in predicting a sequence of actions/behaviors at time scales where the previous actions and/or behavior may affect the next actions/behavior, e.g., when a robotic manipulator arm may be tasked to fill with coffee three cups one a tray: completion of the first action (filling one cup) may leave the plant (arm) closes to another cup rather than the starting location (e.g., coffee machine). The use of feedback may reduce coffee serving time by enabling the arm to move from one cup to another without returning to the coffee machine in between. In some implementations (not shown), action feedback (e.g., 2016 in FIG. 20A) may be provided to other predictors configured to predict control input for other tasks (e.g., filling the coffee pot with water, and/or placing the pot into the coffee maker).

In some implementations, generation of the predicted action indication $A^P$ by the predictor 2002 may be effectuated using any of the applicable methodologies described above (e.g., with respect to FIGS. 2A-3C). The predictor may utilize a learning process based on the teaching signal 2004 in order to associate action indication A with the sensory input 2006 and/or 2016.

The predictor 2002 may be further configured to generate the plant control signal 2014 low level control commands/instructions based on the sensory context 2006. The predicted control output 2014 may be interfaced to a plant. In some control implementations, such low-level commands may comprise instructions to rotate a right wheel motor by 30°, apply motor current of 100 mA, set motor torque to 10%, reduce lens diaphragm setting by 2, and/or other commands. The low-level commands may be configured in accordance with a specific implementation of the plant, e.g., number of wheels, motor current draw settings, diaphragm setting range, gear ration range, and/or other parameters.

In some implementations of target approach, such as illustrated in FIG. 12, a predictor may be configured to learn different behaviors (e.g., generate different motor output commands) based on the received sensory context. Responsive to: (i) a target appearing on right/left (with respect to the robotic plant); and (ii) 'turn' action indication the predictor may learn to associate a turn towards the target (e.g., right/left turn 1206, 1216 in FIG. 12). The actual configuration of the turn commands, e.g., rate of turn, timing, turn angle, may be configured by the predictor based on the plant state (platform speed, wheel position, motor torque) and/or sensory input (e.g., distance to target, target size) independent of the controller.

Responsive to the 'turn' command arriving to the predictor proximate in time to the sensory context indicative of a target, the predictor may generate right/left turn control signal in the presence of the sensory context. Time proximity may be configured based on a particular application parameters (e.g., robot speed, terrain, object/obstacle size, location distance, and/or other parameters). In some applications to garbage collecting robot, the turn command may be time locked (to within +10 ms) from the sensory context indicative of a need to turn (for example toward a target). In some realizations, a target appearing to the right of the robot in absence of obstacles may trigger the action 'turn right'.

During learning predictor may associate movement towards the target (behavior) with the action indication. Subsequently during operation, the predictor may execute the behavior (e.g., turn toward the target) based on a receipt of the action indication (e.g., the 'turn' instruction). In one or more implementations, the predictor may be configured to not generate control output (e.g., 2014 in FIG. 20A) in absence of the action tag (e.g., 2008 and/or 2004). In other words, the predictor may learn to execute the expected (learned) behavior responsive to the presence of the action indication (informing what action to perform, e.g., turn) and the sensory input (informing the predictor where to turn).

Such associations between the sensory input and the action indicator may form a plurality of composite motor primitive comprising an action indication (e.g., A=turn) and actual control instructions to the plant that may be configured in accordance with the plant state and sensory input.

In some implementations, the predictor may be configured to learn the action indication (e.g., the signal 2008 in FIG. 20B) based on the prior associations between the sensory input and the action tag. The predictor may utilize learning history corresponding to a sensory state (e.g., sensory state x1 described with respect to Table 3) and the occurrence of the action tag contemporaneous to the sensory context x1. By way of illustration, based on two or more occurrences (prior to time t1) of the tag A='turn' temporally proximate to a target object (e.g., 1208, 1218 in FIG. 12) being present to one side from the robotic device 1202, the predictor may (at time t1) generate the tag (e.g., signal 2018) in absence of the tag input 2008.

Based on learning of associations between action tag-control command; and/or learning to generate action tags, the predictor may be able to learn higher-order control composites, such as, for example, 'approach', 'fetch', 'avoid', and/or other actions, that may be associated with the sensory input.

FIG. 20B is a block diagram illustrating an control system comprising an adaptive predictor configured to generate control signal based on an association between control action and sensory context, according to one or more implementations.

The control system 2020 may comprise controller 2042, predictor 2022, plant 2040, and one or more combiners 2030, 2050. The controller 2042 may be configured to generate action indication A 2048 based on sensory input 2026 and/or plant feedback 2036. The controller 2042 may be further configured to generate one or more low-level plant control commands (e.g., 2046) based on sensory input 2026 and/or plant feedback 2036. In some control implementations, the low-level commands 2046 may comprise instructions to rotate a right wheel motor by 30°, apply motor current of 100 mA, set motor torque to 10%, reduce lens diaphragm setting by 2, and/or other commands. The low-level commands may be configured in accordance with a specific implementation of the plant, e.g., number of wheels, motor current draw settings, diaphragm setting range, gear ration range, and/or other parameters.

One or more of the combiners of the control system of FIG. 20B (e.g., 2030_1) may be configured to combine an action indication (e.g., tag A) 2048_1, provided by the controller, and the predicted action tag $A^P$ from the predictor to produce a target action tag A 20321.

One or more of the combiners (e.g., 2050) may be configured to combine a control command 2046, provided by the controller, and the predicted control instructions $u^P$ 2044, provided by the predictor, to produce plant control instructions ü=h(u,u') (e.g., 2052).

The predictor 2022 may be configured to perform prediction of (i) one or more action indications 2048; and/or plant control output $u^P$ 2052 that may be associated with the sensory input 2026 and/or plant feedback 2036. The predictor 2022 operation may be configured based on two or more training signals 2024, 2054 that may be associated with the action indication prediction and control command prediction, respectively. In one or more implementations, the training signals 2024, 2054 at time t2 may comprise outputs of the respective combiners 2030, 2050 at a prior time (e.g., t1=t2−dt), as described above with respect to Eqn. 7.

The predictor 2022 may be operable in accordance with a learning process configured to enable the predictor to develop associations between the action indication input (e.g., 2048_1) and the lower-level control signal (e.g., 2052). In some implementations, during learning, this association development may be aided by plant control instructions (e.g., 2046) that may be issued by the controller 2042. One (or both) of the combined action indication signal (e.g., 2032_1) and/or the combined control signal (e.g., 2052) may be utilized as a training input (denoted in FIG. 20B by the arrows 20241, 2054, respectively) by the predictor learning process. Subsequent to learning, once the predictor has associated the action indicator with the sensory context, the low-level control output (e.g., 2046) may be withdrawn by the controller. Accordingly, the control system 2020 of FIG. 20B may take configuration of the control system 2000 shown in FIG. 20A.

In some implementations, the combined action indication signal (e.g., 2032) and/or the combined control signal (e.g., 2052) may be provided to the predictor as a portion of the sensory input, denoted by the arrows 2056 in FIG. 20B.

In one or more implementations, two or more action indications (e.g., 2048_1, 2048_2 may be associated with the control signal 2052. By way of a non-limiting example, illustrated for example in FIG. 21, the controller apparatus 2020 may be configured to operate a robotic platform. Action indication 2048_1 may comprise a higher level control tag 'turn right'; the action indication 20482 may comprise a higher level control tag 'turn left'. Responsive to receipt of sensory input 2056, 2026 and/or teaching input 2024, 2054 the predictor 2022 may learn to associate, for example, 'turn right' action tag with a series of motor instructions (e.g., left wheel rotate forward right, right wheel rotate backwards) with one (or more) features (e.g., object type and location) that may be present within the sensory input. Such association s may be referred to as a composite task (e.g., comprising tag and a motor output).

Upon learning these composite tasks, the predictor 2022 may be provided with a higher level action indication (e.g., 20483). The term 'higher level' may be used to describe an action (e.g., 'approach'/'avoid') that may comprise one or more lower level actions (e.g., 20481, 20482, 'turn right'/ 'turn left'). In some implementations, the higher level action indication (e.g., 20483) may be combined (by, e.g., the combiner 20303 in FIG. 20B) with a predicted higher level action indication (not shown in FIG. 20B). The combined higher level action indication may be provided to the predictor as a teaching signal and/or sensory input (not shown in FIG. 20B. One or more levels of action indications may form a hierarchy of actions, also referred to as primitives or sub-tasks.

Figure 21:
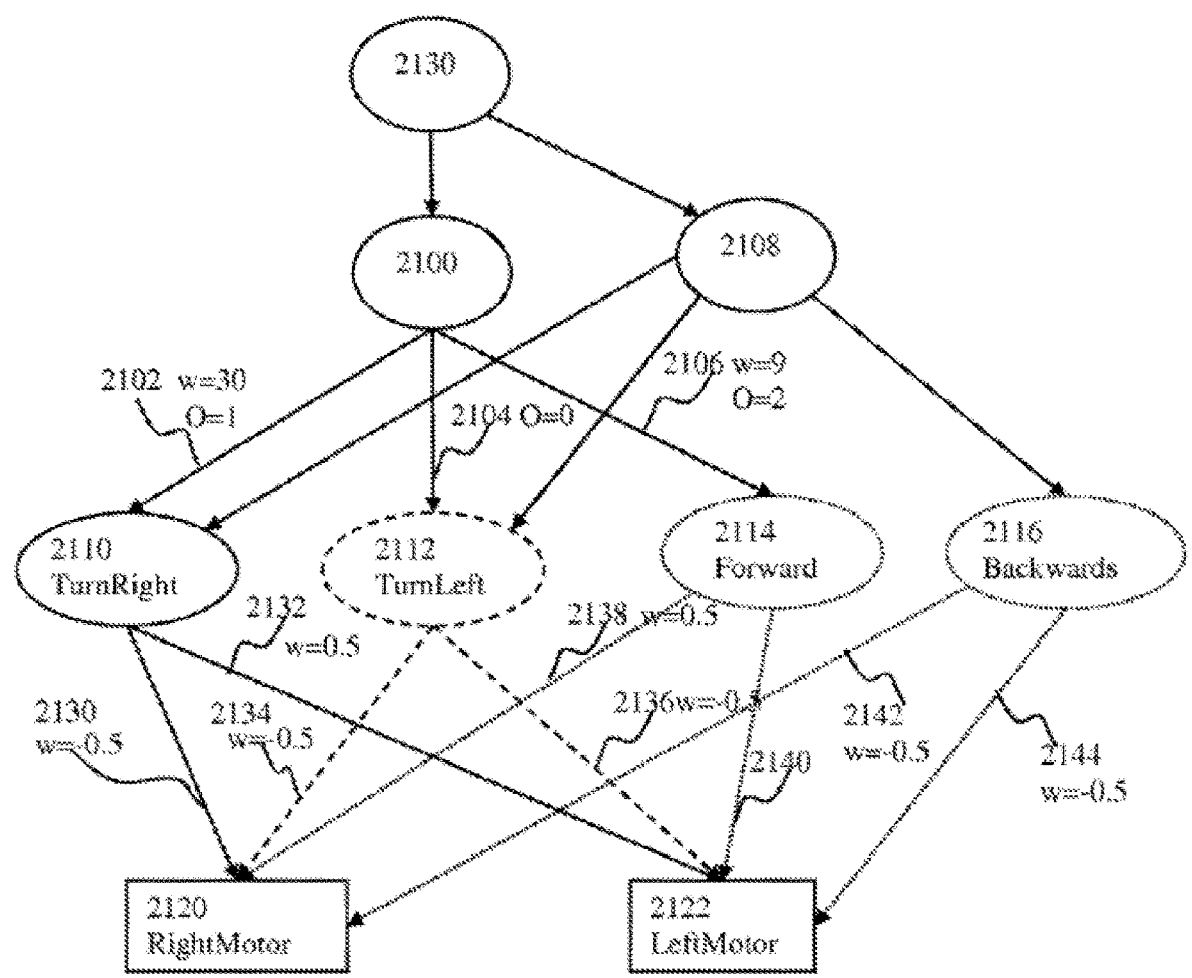
FIG. 21 illustrates an exemplary embodiment of a hierarchy of actions for use with a controller illustrated in FIG. 20B.

FIG. 21 illustrates one example of a hierarchy of actions for use with, for example, controller of FIG. 20B. An action indication 2100 may correspond to a higher level composite action, e.g., 'approach', 'avoid', 'fetch', and/or other. The composite action indication 2100 may be configured to trigger execution of or more actions 2110, 2112, 2114 (also referred to as sub-tasks). The sub-tasks 2110, 2112, 2114 may correspond to lower level (in the hierarchy of FIG. 21) actions, such as 'turn right', 'turn left', 'go forward', respectively.

The sub-tasks (e.g., 2110, 2112, 2114 in FIG. 21) may be associated with one (or more) control output instructions, e.g., signal 2052 described with respect to FIG. 20B, supra. individual second level sub-tasks (e.g., 2110, 2112, 2114 in FIG. 21) may be configured to invoke one or more lower (e.g., third in FIG. 21) level sub-tasks. 2120, 2122 may correspond to instructions configured to activate right/left motors of the robotic platform. In some implementations, subtasks that may be invoked by one or more higher level tasks and that may be configured to generate motor control instructions may be referred to as the motor-primitives (e.g., 2120, 2122 in FIG. 21).

Subtasks of a given level (e.g., 2100, 2108 and/or 2110, 2112, 2114 in FIG. 21) may comprise one or more activation parameters associated with lower level subtasks (e.g., 2110, 2112, 2114, and/or 2120, 2122 respectively in FIG. 21). The parameters (e.g., 2102, 2104, 2106) may comprise one or more of, execution order, weight, turn angle, motion duration, rate of change, torque setting, drive current, shutter speed, aperture setting, and/or other parameters consistent with the plant hardware and/or software configuration.

As illustrated in in FIG. 21, the task 2100 (e.g., approach target) may comprise a 30° right turn followed by a 9 second forward motion. The parameters 2102, 2104, 2106 may be configured as follows:

0=1, w=30;

0=0; and

0=2, w=9; respectively.

The task 2108 may correspond to avoid target and may invoke right/left turn and/or backwards motion tasks 2110, 2112, 2116, respectively.

Individual tasks of the second level (e.g., 2110, 2112, 2114, 2116 in FIG. 21) may cause execution of one or more third level tasks (2120, 2122). The parameters 2130, 2132, 2134, 2136, 2138, 2140 may be configured as follows:

to execute right turn: rotate forward left motor with torque of 0.5; (w=0.5), rotate right motor backwards with torque of 0.5; (w=−0.5);

to execute left turn: rotate right motor backwards with torque of 0.5; (w=−0.5), rotate forward right motor with torque of 0.5; (w=0.5);

to move forward: rotate forward left motor with torque of 0.5; (w=0.5), rotate forward right motor with torque of 0.5; (w=0.5); and to move backwards: rotate left motor backwards with torque of 0.5; (w=–0.5), rotate right motor backwards with torque of 0.5; (w=–0.5).

The hierarchy illustrated in FIG. 21, may comprise another level (e.g., 2130) that may be configured to implement pursue functionality. In one or more implementations, the pursue functionality mat trigger target approach task 2100 and/or obstacle avoidance task 2108.

Control action separation between the predictor 2002, 2022 (configured to produce the plant control output 2014, 2052) and the controller 2042 (configured to provide the action indication 2048) described above, may enable the controller (e.g., 2042 in FIG. 20B) to execute multiple control actions (e.g., follow a target while avoiding obstacles) contemporaneously with one another.

Control action separation between the predictor 2002, 2022 (configured to produce the plant control output 2014, 2052) and the controller 2042 (configured to provide the action indication 2048) described above, may enable the controller (e.g., 2042 in FIG. 20B) to execute multiple control actions (e.g., follow a target while avoiding obstacles) contemporaneously with one another.

The controller 2042 may be operable in accordance with a reinforcement learning (RL) process. In some implementations, the RL process may comprise a focused exploration methodology, described for example, in U.S. patent application Ser. No. 13/489,280 entitled "APPARATUS AND METHODS FOR REINFORCEMENT LEARNING IN ARTIFICIAL NEURAL NETWORKS", filed Jun. 5, 2012, incorporated supra.

Operation of the exemplary RL process comprising focused exploration reinforcement learning methodology may be configured as follows:

$$\frac{d\theta_{i,j}(t, \alpha)}{dt} \propto R(t, \alpha)\sum_{k} \eta_k(t, \alpha)e_k(t, \alpha) \quad \text{(Eqn. 19)}$$

where:
- e, (t) is an adapted parameter (e.g., efficacy) of a synaptic connection between the pre-synaptic neuron i and the post-synaptic neuron j;
- ri(t, a) is a parameter referred to as the learning rate that scales the 0-changes enforced by learning, II can be a constant parameter or it can be a function of some other system parameters;
- R(t) is a function describing the reward signal;
- , (t) is eligibility trace, configured to characterize correlation between pre-synaptic and post-synaptic activity; and
- a is a set of parameters that R, $_{17k}$ and $e_k$ may dependent upon.

Eqn. 19 generally describes that synaptic parameter $0_{11}(t)$ characterizing an interaction of a neuron i and a neuron j, may be adjusted based on a linear combination of individual adjustments characterized by individual learning rates 17k. Learning combination of Eqn. 19 may be further gated by the reinforcement signal R(t). In some implementations, the reinforcement signal may be used as a logical (and/or an algebraic switch) for controlling learning.

The predictor 2022 may be operable in accordance with a supervised learning (SL) process. In some implementations, the supervised learning process may be configured to cause output (e.g., neuron output 144 in FIG. 1B) that is consistent with the teaching signal (e.g., 134 in FIG. 1B). Output consistency may be determined based on one or more similarity measures, such as correlation, in one or more implementations.

Reinforcement learning process of the controller may rely on one or more exploration techniques. In some implementations, such exploration may cause control output corresponding one or more local minima of the controller dynamic state. Accordingly, small changes in the controller input (e.g., sensory input 2026 in FIG. 20B) may cause substantial changes in the controller output responsive to a convergence of the controller state to another local minimum. Exploration of reinforcement learning may require coverage of a full state space associated with the controller learning process (e.g., full range of heading, tilt, elevation for a drone searching for a landing strip). State exploration by reinforcement learning may be time consuming and/or may require more substantial computational and/or memory resources when compared to supervised learning (for the same spatial and temporal resolution). Training signal used by supervised learning may limit exploration by pointing to a region within the state space where the target solution may reside (e.g., a laser pointer used for illuminating a potential target). In some implementations, the supervised learning may be faster (e.g., converge to target solution with a target precision in shorter amount of time) compared to reinforcement learning. The use of target signal during training may enable the SL process to produce a more robust (less varying) control output for a given set of sensory input, compared to the RL control output. For a given size/capability of a software/hardware controller platform, reinforcement learning may perform fewer tasks (a single task in some implementations) compared to supervised learning that may enable the controller platform to execute several (e.g., 2-10 in some implementations).

In one or more implementations, reinforcement learning signal may be provided by human operator.

Figure 13A:
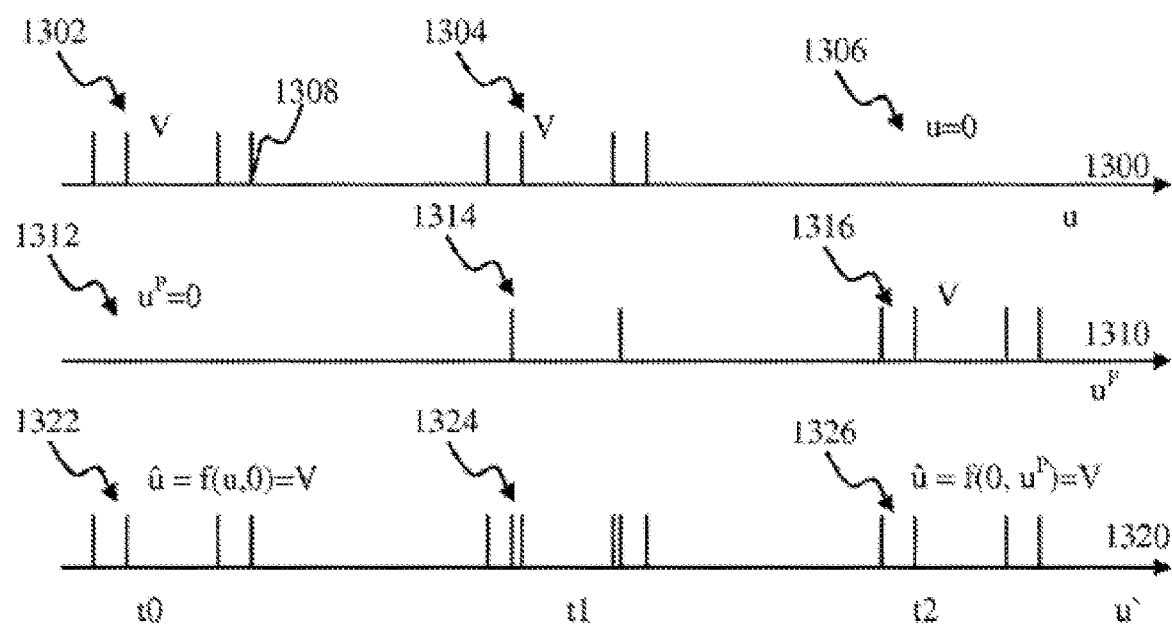
FIG. 13A is a timing diagram illustrating operation of a combiner apparatus in an adaptive controller apparatus, in accordance with one or more implementations.

FIG. 13A presents timing diagrams illustrating operation of a combiner apparatus (e.g., 310, 342) of an adaptive controller apparatus (e.g., 200, 220 of FIGS. 2A-2B) configured to generate plant control output. Traces 1300, 1310, 1320 depict activity of controller input into the combiner (e.g., 308 in FIG. 3A), predicted signal (e.g., 318 in FIG. 3A), and the combined output (e.g., 320), respectively. The output of the trace 1320 may be obtained in accordance with a union transfer function, expressed as:

$$u'=h(u,u^P)=u \cap u^P. \quad \text{(Eqn. 20)}$$

At time t0, the controller input may comprise a control signal V 1302 configured to cause the plant to perform a given action (e.g., execute a turn, change speed, and/or other action). In some implementations, such as illustrated in FIG. 13A, the signal 1302 may comprise spiking signal comprised of one or more spikes 1308.

The predictor output at time t0, may be absent (e.g., $u^P=0$), as illustrated by absence of spikes on trace 1310 proximate arrow 1312 corresponding to time t0. In one or more implementations (not shown), the absence of activity on one or more traces 1300, 1310, 1320 may be characterized by a base spike rate.

In accordance with the transfer function of Eqn. 20 the combined output at time t0, may comprise the control input V, as shown by the spike group 1322 in FIG. 13A. The combined output (e.g., the spike train 1322) may cause changes in the plant (e.g., 210 in FIG. 2A) state (e.g., wheel angle and/or rotation speed) in accordance with the control signal V (e.g., 40° right turn).

At time t1>t0: the controller input may comprise the control signal V (shown by the spike group 1304 FIG. 13A; the predictor output may comprise one or more spikes 1314; and the combined output may be comprise a combination of the controller input and predictor output, shown by the spike group 1324 in FIG. 13A. The combined output (e.g., the spike train 1324) may cause changes in the plant in excess (e.g., the wheel turn angle greater than 40°) of the state associated with the control signal V.

At time t2>t1: the controller (e.g., 212 in FIG. 2A) may determine that the plant state is outside target state (e.g., wheel turn angle greater than 40°). The controller may withdraw the control signal as illustrated by absence of spikes proximate arrow 1306 on the trace 1300 in FIG. 13A. The predictor, based on the prior input and/or prior predictor state may produce output 1316 at time t2 that may correspond to the initial combiner output V at time t0 (e.g., the spike train 1322).

Figure 13B:
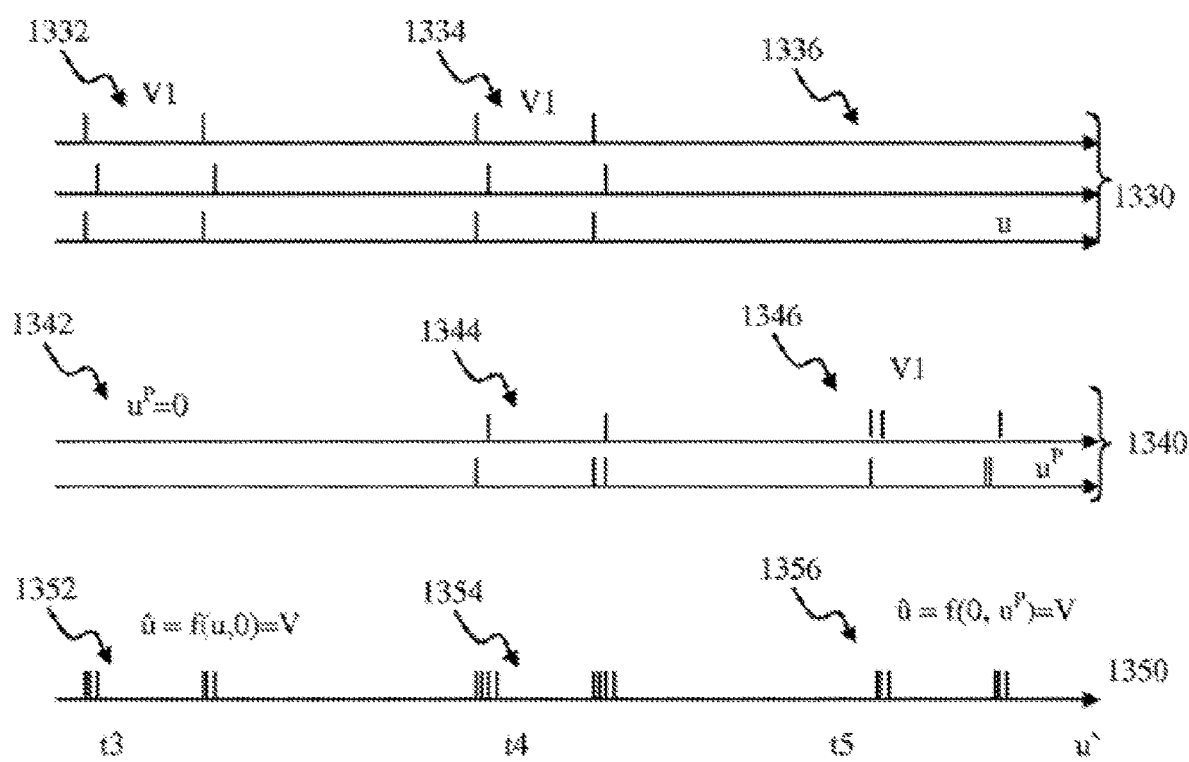
FIG. 13B is a timing diagram illustrating operation of a combiner apparatus adapted to multiplex multichannel inputs, in accordance with one or more implementations.

FIG. 13B presents timing diagrams illustrating operation of a combiner apparatus (e.g., 302 of FIG. 3A) of an adaptive controller apparatus (e.g., 200, 220 of FIGS. 2A-2B) configured to combine multichannel inputs and generate a single-channel plant control output. Traces 1330, 1340, 1350 depict activity of controller input into the combiner (e.g., 308 in FIG. 3A), predicted signal (e.g., 318 in FIG. 3A), and the combined output (e.g., 320), respectively. The output of the trace 1350 may be obtained operable in accordance with an 'AND' transfer function, expressed as:

$$\hat{u}=h(u,u^P)=u\&u^P. \quad \text{(Eqn. 21)}$$

In some implementations, combiner operation of Eqn. 21 may be expressed as follows: responsive to a single spike on an input channel (e.g., u and/or U), the output may comprise a spike that may be generated contemporaneously or with a delay; responsive to multiple spikes on an input channel (e.g., u and/or U), the output may comprise two or more spikes that may be generated contemporaneously or with a delay relative input spikes.

Returning now to FIG. 13B: at time t3, the controller input may comprise control signal V1 1332 configured to cause the plant to perform a given action (e.g., execute a turn, change speed, and/or other action). In some implementations, such as illustrated in FIG. 13B, the control signal 1332 may comprise one or more spikes communicated via two or more connections 1330.

The predictor output at time t3, may be absent (e.g., $u^P=0$), as illustrated by absence of spikes on trace 1340 proximate arrow 1342 corresponding to time t3. In one or more implementations (not shown), the absence of activity on one or more traces 1300, 1310, 1320 may be characterized by a base spike rate (e.g., 2 Hz).

In accordance with the transfer function of Eqn. 21, the combined output 1350 at time t3, may comprise the control input V1, as shown by the spike group 1352 in FIG. 13B. The combined output (e.g., the spike train 1352) may cause changes in the plant (e.g., 210 in FIG. 2A) state (e.g., wheel angle and/or rotation speed) in accordance with the control signal input V1 (e.g., 45° right turn).

At time t4>t3: the controller input may comprise the control signal V1 (shown by the spike group 1334 FIG. 13B; the predictor output may comprise one or more spikes 1344; and the combined output may be comprise a combination of the controller input and predictor output, shown by the spike group 1354 in FIG. 13B. The combined output (e.g., the spike train 1354) may cause changes in the plant in excess (e.g., the turn angle greater than 45°) of the control input associated with the control signal V 1.

At time t5>t4: the controller (e.g., 212 in FIG. 2A) may determine that the plant state is outside target state (e.g., turn angle greater than 45°). The controller may withdraw the control signal as illustrated by absence of spikes proximate arrow 1336 on the trace 1330 in FIG. 13B. The predictor, based on the prior input and/or prior predictor state may produce output 1346 at time t5 that may predict the initial combiner output V1 at time t3 (e.g., the spike train 1352).

In some implementations, the predictor output (e.g., shown by the traces 1340 in FIG. 13B) may comprise fewer connections compared to number of connections associated with the controller input (e.g., 1330 in FIG. 13B). A variety of data compression and/or multiple access techniques may be utilized in order to transmit predicted data (e.g., spikes 1340 in FIG. 13B). In one or more implementations, multiple access techniques may include, time division, frequency division, code division multiple access. In one or more implementations, predictor output (e.g., 1346 in FIG. 13B) and/or combiner output (e.g., 1356 in FIG. 13B) may be encoded using sparse coding wherein individual information packets may be encoded by the strong activation of a relatively small set of neurons. Individual items may be encoded using a different subset of available neurons.

As shown and described with respect to FIGS. 13A-13B, learning by the adaptive controller apparatus (e.g., 200, 220, 300, 330 of FIGS. 2A-3B, respectively) may enable transfer of information (knowledge') from the controller output (e.g., 208 in FIG. 2A) to the predictor output (e.g., 218 in FIG. 2A). As used herein the term 'knowledge' may refers to changes to predictor state needed to reproduce, in its predictions (e.g., 238 in FIG. 2B), the signals previously produced by the controller output (e.g., 208 in FIG. 2B), but in the absence of continued controller output.

It is noteworthy, that in accordance with the principles of the present disclosure, the information transfer (such as described with respect to FIGS. 13A-13B) may occur not instantaneously but gradually on time scales that are in excess of the plant/predictor update intervals. Initially (e.g., at time t0 in FIG. 13A), the controller is capable of controlling the plant in accordance with a target trajectory (e.g., execute 40° turn). Subsequently (e.g., at time t2 in FIG. 13A), the predictor may be capable of controlling the plant in accordance with the target trajectory. There may exist an intermediate trial state between t0 and t2 (e.g., t1 in FIG. 13A) wherein: (i) both the predictor and the controller are attempting to operate the plant in accordance with the target trajectory (e.g., the controller generates the output 1304 and the predictor generates the output 1314); and (ii) the combined output (e.g., 1324) is inadequate (either too large or too small) to achieve the target trajectory.

In one or more implementations, the predictor may be configured to generate the predicted signal $u^P$ such that it closely reproduces the initial the control signal u. This is shown in Table 1, where predicted signal at trial 10 matches the initial control signal at trial 1.

Figure 16:
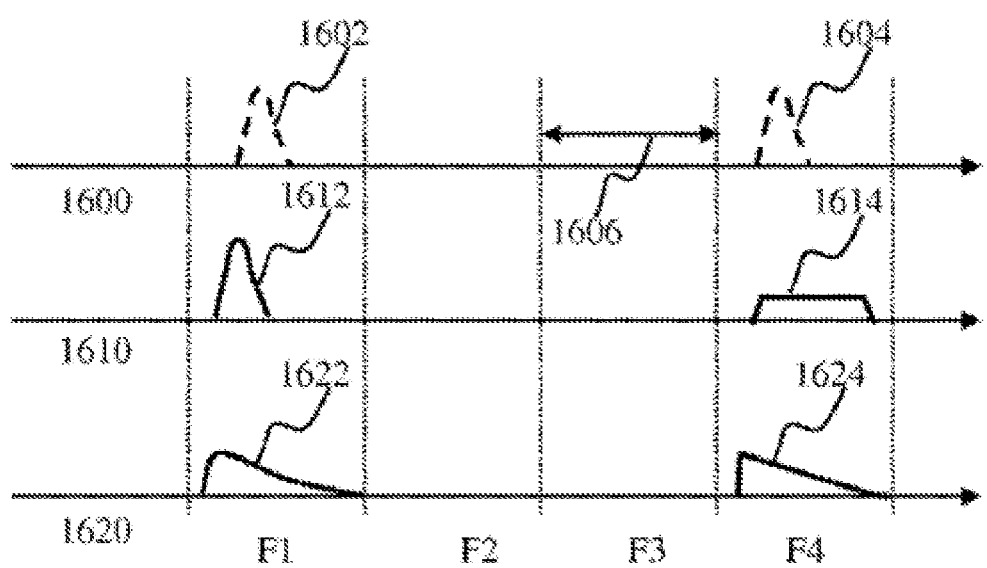
FIG. 16 is a plot illustrating output of an adaptive predictor apparatus, e.g., of FIG. 3B, characterized by a cumulative performance function of an adaptive predictor apparatus of, e.g., FIG. 3A, during training, in accordance with one or more implementations.

In one or more implementations, such as illustrated in FIG. 16, the predictor may be configured to predict cumulative (integrated) outcome of the control action (e.g., the combined output 240 in FIG. 2B).

FIG. 16 presents realizations wherein the predicted signal is characterized by temporal distribution having a non-zero time duration associated therewith. The trace 1600 depicts the target control signal $u^d$ (e.g., the output 240 of FIG. 2B). The traces 1610, 1620, 1630 depicts the predicted output $u^P$ (e.g., the output 238 of FIG. 2B), in accordance with one or more implementations. Based on the target signal being characterized by a temporal distribution (e.g., 5 steps of 9° as shown in Table 2), the predictor may be configured to match the individual steps (e.g., the shape) of the target output. This is illustrated by the predictor output shape 1612 matching the target signal shape 1602 in FIG. 16.

It may be desirable to generate predicted signal configured such that the cumulative control effect of the predicted signal matches the cumulative control effect of the target output. In some implementations, such configuration may be expressed as follows: an integral of the predicted signal over a time span T1 may be configured to match an integral of the target output $U^d$ over a time span T2:

$$\int_{t1}^{t1+T1} u^P(s)ds = \int_{t2}^{t2+T2} u^d(s)ds \qquad \text{(Eqn. 22)}$$

In some implementations, the time intervals Ti, T2 and/or time instances t1, 2 in Eqn. 22 may be configured equal to one another, T1=t2, and/or t1=t2. In one or more implementations, the onset of the predicted signal may precede the onset of the target signal t1<t2, as illustrated by the curves 1602, 1612 in FIG. 16.

In some implementations, the predicted signal may be characterized by a temporal distribution that may differ from the target signal temporal distribution while conforming to the condition of Eqn. 22. Various temporal distribution may be utilized with the predictor signal, such as, for example uniform (curve 1614 in FIG. 16), power law decay (curve 1622 in FIG. 16), linear, (curve 1624 in FIG. 16) and/or other realizations.

In some implementations comprising processing of visual sensory input frames refreshed at periodic intervals (e.g., 40 ms), also referred to as the perceptual time scale, predictor generate predicted output that may be configured to match the target output when integrated over the perceptual time scale (e.g., the frame duration 1606 in FIG. 16).

Figure 4:
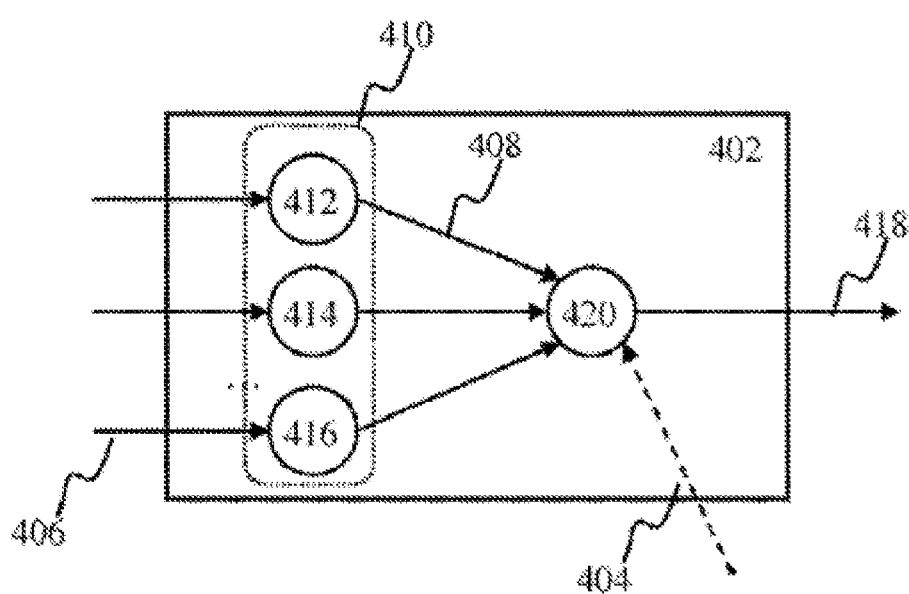
FIG. 4 is a block diagram illustrating structure of the adaptive predictor apparatus of, for example, FIGS. 2A-3B, according to one or more implementations.

FIG. 4 illustrates structure of an adaptive predictor apparatus of, for example, adaptive controller 200 shown and described with respect to FIG. 2A, above, according to one or more implementations. The adaptive predictor 402 of FIG. 4 may comprise a spiking neuron network. Individual neurons (e.g., 412, 414, 416, 420) of the predictor 402 network may be configured in accordance with any applicable methodologies (e.g., stochastic and/or deterministic) described, supra.

The network of the predictor 402 may comprise an input neuron layer 410 comprised, for example, of the neurons 412, 414, 416 in FIG. 4. The neurons of the input layer 410 may be configured to receive sensory input 406. In some implementations, the sensory input 406 may comprise the sensory input 106 and/or 206, described with respect to FIGS. 1A, 2B above. The sensory input 406 may comprise plant feedback (e.g., 2162 in FIG. 2A).

In some object classification applications, individual neurons of the input layer 410 may be configured to respond to presence and/or absence of one or more features (e.g., edges, color, texture, sound frequency, and/or other aspects) that may be present within the sensory input 406. In one or more implementations of object recognition and/or classification may be implemented using an approach comprising conditionally independent subsets as described in U.S. patent application Ser. No. 13/756,372 filed Jan. 31, 2013, and entitled "SPIKING NEURON CLASSIFIER APPARATUS AND METHODS" and/or U.S. patent application Ser. No. 13/756,382 filed Jan. 31, 2013, and entitled "REDUCED LATENCY SPIKING NEURON CLASSIFIER APPARATUS AND METHODS", each of the foregoing being incorporated, supra.

The sensory input 406 may comprise analog and or spiking input signals. In some implementations, analog inputs may be converted into spikes using, for example, kernel expansion techniques described in U.S. patent application Ser. No. 13/623,842 filed Sep. 20, 2012, and entitled "SPIKING NEURON NETWORK ADAPTIVE CONTROL APPARATUS AND METHODS", the foregoing being incorporated, supra. In one or more implementations, analog and/or spiking inputs may be processed by mixed signal spiking neurons, such as U.S. patent application Ser. No. 13/313,826 entitled "APPARATUS AND METHODS FOR IMPLEMENTING LEARNING FOR ANALOG AND SPIKING SIGNALS IN ARTIFICIAL NEURAL NETWORKS", filed Dec. 7, 2011, and/or U.S. patent application Ser. No. 13/761,090 entitled "APPARATUS AND METHODS FOR IMPLEMENTING LEARNING FOR ANALOG AND SPIKING SIGNALS IN ARTIFICIAL NEURAL NETWORKS", filed Feb. 6, 2013, each of the foregoing being incorporated supra.

Output of the input layer 410 neurons may be communicated to aggregation neuron 420 via one or more connections (e.g., 408 in FIG. 4). The aggregation neuron may be configured to generate predicted output (e.g., the output 218, 238 in FIGS. 2A-2B). In some implementations, the operation of the aggregation neuron 420 may be based on training input signal. In some implementations, the training input 404 in FIG. 4 may comprise output 204 of the combiner 234 of FIG. 2B, described above.

In one or more classification and/or regression implementations, the training input 404 in FIG. 4 may comprise reference classification input (e.g., an object label) as described in U.S. patent application Ser. No. 13/756,372 filed Jan. 31, 2013, and entitled "SPIKING NEURON CLASSIFIER APPARATUS AND METHODS" and/or U.S. patent application Ser. No. 13/756,382 filed Jan. 31, 2013, and entitled "REDUCED LATENCY SPIKING NEURON CLASSIFIER APPARATUS AND METHODS", each of the foregoing being incorporated, supra.

Figure 5:
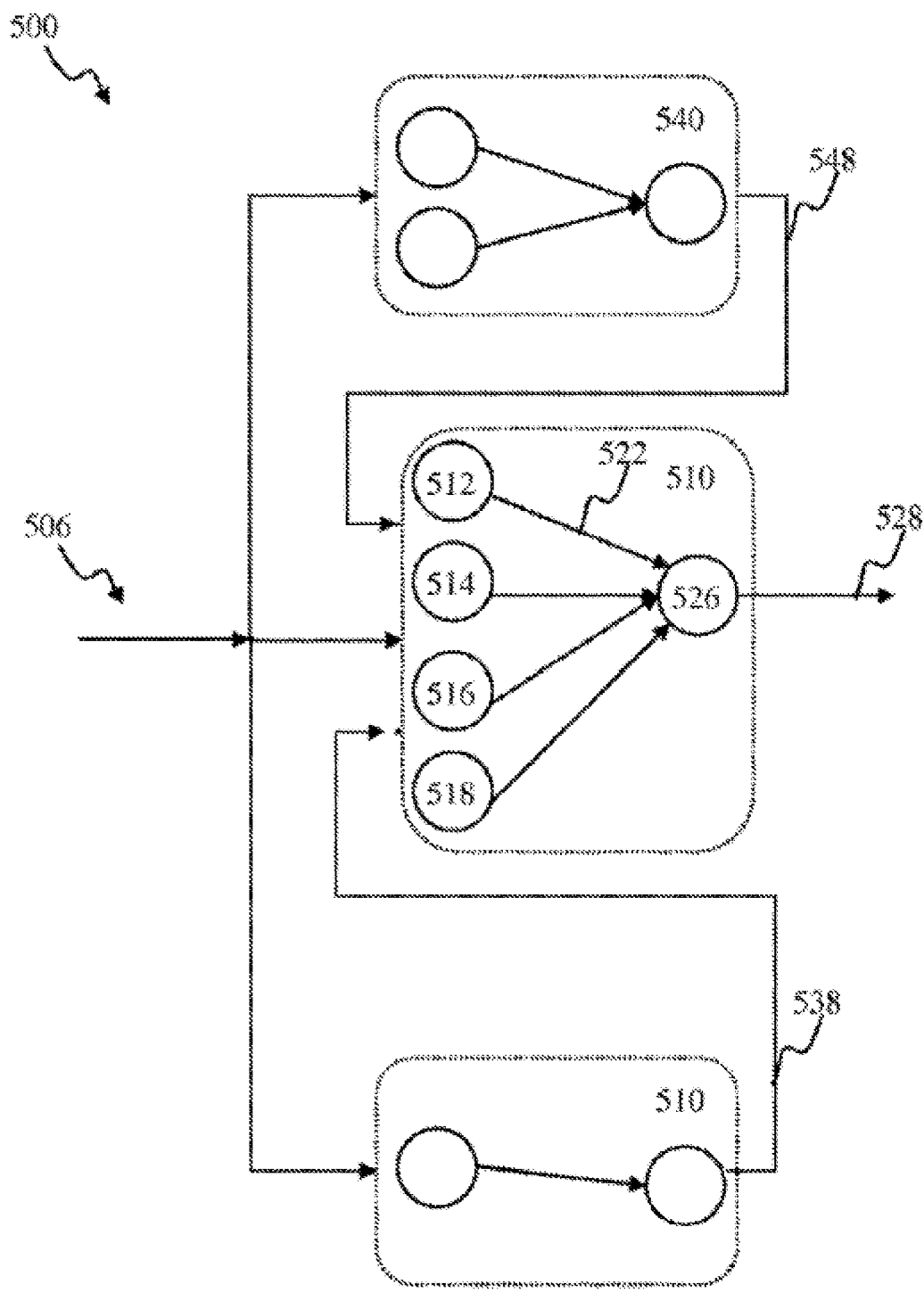
FIG. 5 is a block diagram illustrating structure of artificial neuron network useful for implementing adaptive predictor apparatus of a robotic device configured for obstacle avoidance training of, for example, FIG. 7, according to one or more implementations.
Figure 7:
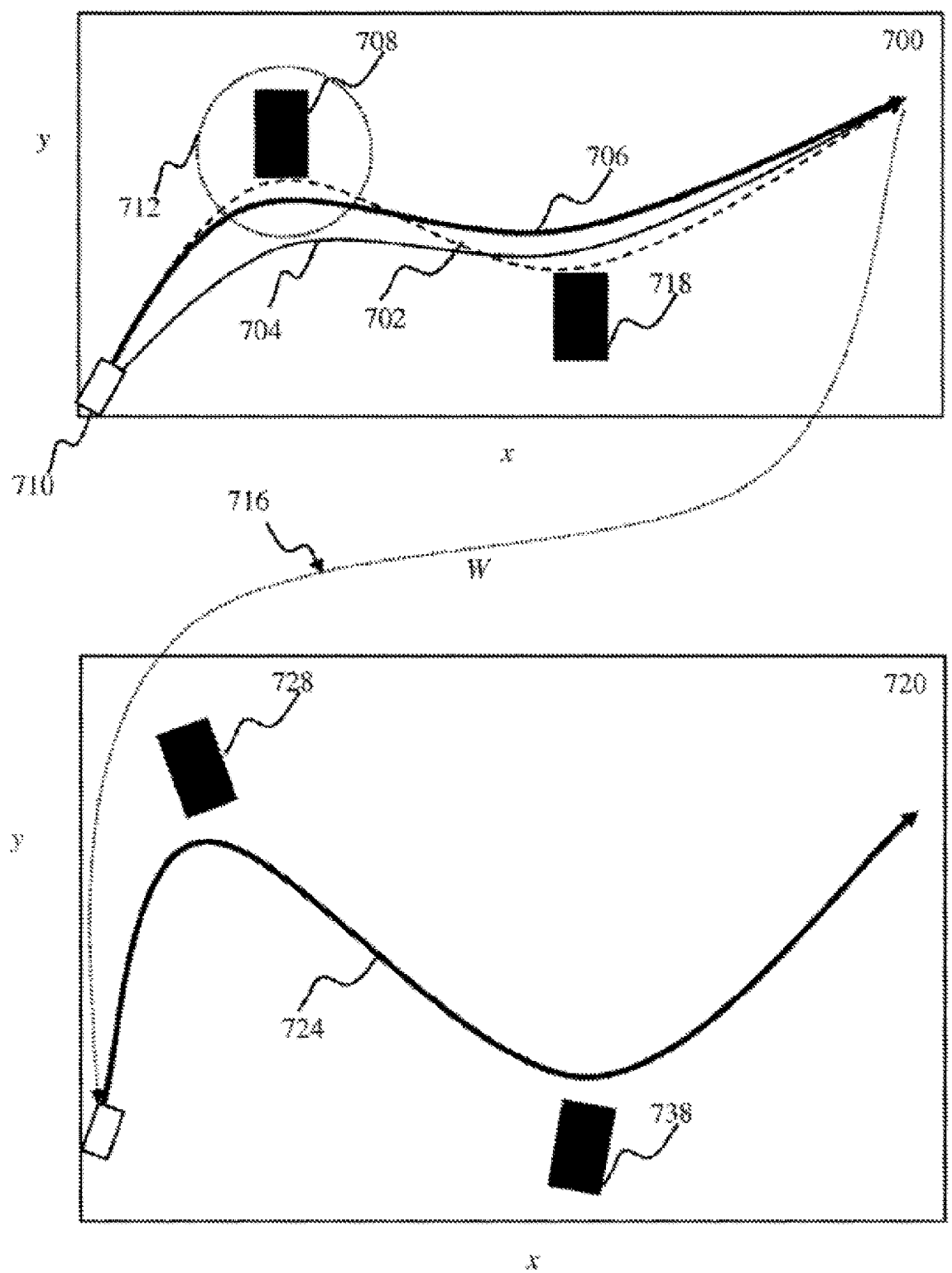
FIG. 7 is a graphical illustration depicting obstacle approach/avoidance training of a robotic device comprising an adaptive predictor apparatus of, for example, FIG. 2B, according to one or more implementations.

FIG. 5 illustrates an exemplary implementation of a neuron network useful for implementing adaptive predictor apparatus of a robotic device of, for example, FIG. 7, configured for obstacle approach and or avoidance training according to one or more implementations.

The adaptive predictor of FIG. 5 may comprise an artificial neuron network 500 comprising network portions 510, 530, 540. In some implementations, the network 500 may comprise a network of spiking neuron network operable in accordance with any applicable methodologies (e.g., stochastic and/or deterministic described with respect to FIG. 1B, supra).

The network 500 may receive sensory input 506. In some implementations, the sensory input 406 may comprise the sensory input 106 and/or 206, described with respect to FIGS. 1A, 2B above. The sensory input 506 may comprise plant feedback (e.g., 2162 in FIG. 2A). The sensory input 506 may comprise analog and or spiking input signals. In some implementations, analog inputs may be converted into spikes using any applicable methodologies, e.g. those described with respect to FIG. 4 supra.

Individual network portions 530, 540 may be configured to implement individual adaptive predictor realizations. In some implementations, the network portions 530, 540 may implement an object approach predictor and an obstacle avoidance predictor, respectively. The network portion 510 may implement a task predictor (e.g., fetch). In some implementations, such as illustrated in FIG. 5, predictors implemented by the network portions 530, 540, 510 may be configured to form a hierarchy of predictors. For example, predictors 530, 540 may form a lower predictor level configured to produce control (e.g., motor) primitives, such as 538, 548 in FIG. 5. The outputs 538, 548 may also be referred to as the pre-action and/or pre-motor to pre-action output. The output 538 may comprise predicted obstacle avoidance instructions. The output 548 may comprise predicted object approach instructions.

The individual network portions 530, 540 may comprise one or more input layer neurons and one or more output layer neurons as described in detail with respect to FIG. 4, supra. In some implementations, the operation of the network portions 530, 540 may be based on training input signal, (not shown).

The network portion 510 of FIG. 5 may comprise an input layer comprised, for example, of the neurons 512, 514, 516, 518. The input layer neurons 512, 514, 516 may be configured to receive sensory input 506 and the predicted obstacle avoidance and/or target approach instructions 538, 548, respectively.

In some implementations of a fetch task (comprising for example target approach and/or obstacle avoidance), the lower level predictors may predict execution of basic actions (so called, motor primitives), e.g., rotate left with v=0.5 rad/s for t=10 s.

Predictors of a higher level within the hierarchy, may be trained to specify what motor primitive to run and with what parameters (e.g., v, t).

At a higher level of hierarchy, the predictor may be configured to plan a trajectory and/or predict an optimal trajectory for the robot movement for the given context.

At yet another higher level of the hierarchy, a controller may be configured to determine a behavior that is to be executed at a given time, e.g. now to execute the target approach and/or to avoid the obstacle.

In some implementations, a hierarchy actions may be expressed as:—top level=behavior selection;
2nd level=select trajectory;
3rd level=activate motor primitives to execute given trajectory; and
4th level=issue motor commands (e.g. PWM signal for motors) to execute the given motor primitives. Outputs of the input layer neurons 512, 514, 516, 518 may be communicated to aggregation neuron 526 via one or more connections (e.g., 522 in FIG. 5). The aggregation neuron may serve several functions, such as, for example, selection of the best predictions (out of those coming to the aggregation neuron through the inputs (e.g., 408 in FIG. 4); combining one or more predictions that the neuron may receive (via, e.g., inputs 408) in accordance with a given function (e.g., a linear summation, non-linear (weighted) summation, and/or using other methods). The aggregation neuron 526 of the predictor block 510 may be configured to generate predicted output 528 (e.g., the output 218, 238 in FIGS. 2A-2B). In some implementations, the operation of the aggregation neuron 526 may be based on training input signal (not shown). In some implementations, such training input may comprise the signal 204 of the combiner 234 of FIG. 2B, described above.

In one or more implementations, the adaptive predictor configuration 500 illustrated in FIG. 5 may be referred to as a hierarchy of predictors comprising lower level predictors 530, 540 providing inputs to a higher level predictor 510. Such configuration may advantageously alleviate the higher level predictor 510 from performing all of the functionality that may be required in order to implement target approach and/or obstacle avoidance functionality.

The hierarchical predictor configuration described herein may be utilized for teaching a robotic device to perform new task (e.g., behavior B3 comprised of reaching a target (behavior B1) while avoiding obstacles (behavior B2). The hierarchical predictor realization (e.g., the predictor 500 of FIG. 5) may enable a teacher (e.g., a human and/or computerized operator) to divide the composite behavior B3 into two or more sub-tasks (B1, B2). In one or more implementations, performance of the sub-tasks may be characterized by lower processing requirements by the processing block associated with the respective predictor (e.g., 530, 540); and/or may require less time in order to arrive at a target level of performance during training, compared to an implementation wherein all of the behaviors (B1, B2, B3) are learned concurrently with one another. Predictors of lower hierarchy (e.g., 530, 540) may be trained to perform sub-tasks B1, B2 in a shorter amount of time using fewer computational and/or memory resources e.g., of an apparatus 1150 illustrated in FIG. 11D, compared to time/resource budget that may be required for training a single predictor (e.g., 400 of FIG. 4) to perform behavior B3.

When training a higher hierarchy predictor (e.g., 510 in FIG. 5) to perform a new task (e.g., B3 acquire a target), the approach described above may enable reuse of the previously learnt task/primitives (B1B2) and configured the predictor 510 to implement learning of additional aspects that may be associated with the new task B3, such as B3a reaching and/or B3b grasping).

If another behavior is to be added to the trained behavior list (e.g., serving a glass of water), previously learned behavior(s) (e.g., reaching, grasping, and/or others, also referred to as the primitives) may be utilized in order to accelerate learning compared to implementations of the prior art.

Reuse of previously learned behaviors/primitives may enable reduction in memory and/or processing capacity (e.g., number of cores, core clock speed, and/or other parameters), compared to implementations wherein all behaviors are learned concurrently. These advantages may be leveraged to increase processing throughput (for a given neuromorphic hardware resources) and/or perform the same processing with a reduced complexity and/or cost hardware platform, compared to the prior art.

Learning of behaviors and/or primitives may comprise determining an input/output transformation (e.g., the function F in Eqn. 10, and/or a matrix F of Eqn. 18) by the predictor. In some implementations, learning a behavior may comprise determining a look-up table and/or an array of weights of a network as described above. Reuse of previously learned behaviors/primitives may comprise restoring/copying stored LUTs and/or weights into predictor realization configured for implementing learned behavior.

FIG. 7 illustrates operation of a robotic device 710 (e.g., the rover 1070 described with respect to FIG. 10B, below) comprising an adaptive predictor of the disclosure in an adaptive control system configured to implement obstacle approach and/or avoidance functionality.

Panel 700 in FIG. 7 depicts exemplary trajectories of the robotic device 710 during learning of approaching objects 708, 718 while avoiding colliding with the objects 708, 718. The control policy of the rover adaptive control system (e.g., the system 200 of FIG. 2A) may be configured to cause pass within an area denoted by broken line circle 712 from individual objects. In some implementations, approaching the targets may be useful for performing remote inspections (visual) and may be associated with positive reinforcement; colliding with the targets may be associated with negative reinforcement.

Operational policy of the robotic apparatus may be configured based on a cost function F(q,t). As used herein, the cost function may be configured as the cost-to-go. The cost-to-go may be described as a cumulative of immediate costs C, along a trajectory (e.g., the trajectory 702, 704 in FIG. 7) of the robotic device and/or when following an action policy, from a start or intermediate point to a finish point, as described in detail in U.S. patent application Ser. No. 13/841,980 filed Mar. 15, 2013, entitled "ROBOTIC TRAINING APPARATUS AND METHODS", the foregoing being incorporated herein by reference in its entirety.

In some implementations, selecting a policy may comprise providing the adaptive apparatus (e.g., a robot) with an exemplary trajectory over which the robot is directed to follow as close as possible and/or points to which the robot is directed to reach during its path to the goal.

The trajectory 702 may correspond to first learning trial, wherein the robotic device 710 may have no prior knowledge/encounters with objects. As shown in FIG. 7, the robot 710 following the trajectory 702 collides with the object 708.

Based on learning experience during traverse of the trajectory 702, the adaptive predictor of the robotic device 710 may encounter sensory input states xi and/or controller actions ui associated with approaching/avoiding objects 708/618.

Subsequently, during traversal of the trajectory 704, the adaptive predictor of the robotic device 710 may utilize the prior sensory experience and improve its prediction performance as illustrating by absence of collisions associated with the trajectory 704.

During traversal of the trajectory 706, the performance of the adaptive predictor may improve further thereby producing target performance at lowest cost.

The knowledge gained by the predictor (e.g., 222 in FIG. 2B) during learning trajectories 702, 704, 706 may be utilized in subsequent operations illustrated in panel 720 in FIG. 7. The data transfer is shown diagrammatically by broken curve 716 in FIG. 7. The term knowledge may describe a set of learned dependencies (and/or associations) between the inputs and the outcomes (actions). In some learn to navigate implementations, the knowledge may refer to a learned mapping between the sensory and contextual information and the appropriate motor commands for navigation. In some implementations, the knowledge may refer to state-to-action transformation performed by the predictor during the traverse of the trajectories 702, 704, 706. The state-to-action transformation may comprise a link between given state and the action performed for that state.

The panel 720 depicts exemplary trajectories of the robotic device 710 during learning of approaching objects 728, 738 while avoiding colliding with the objects. The locations and or orientation of objects 728, 738 may be configured different compared to objects 708, 718 in panel 700.

Based on prior learning experience, the predictor may be capable of predicting control signal (e.g., 238 in FIG. 2B) with accuracy that may be sufficient for achieving target performance during traverse of the trajectory 724 shown in panel 720. The target performance may be based on minimal distance between the robot and the targets, used energy, cumulative or and/or maximum absolute deviation from target trajectory, traverse time, and/or other characteristics.

FIGS. 8A-9, 17-19B illustrate methods of operating adaptive predictor apparatus of the disclosure in accordance with one or more implementations. The operations of methods 800, 820, 840, 900, 1700, 1800, 1900, 1920 presented below are intended to be illustrative. In some implementations, methods 800, 820, 840, 900, 1700, 1800, 1900, 1920 may be accomplished with one or more additional operations not described, and/or without one or more of the operations discussed. Additionally, the order in which the operations of methods 800, 820, 840, 900, 1700, 1800, 1900, 1920 are illustrated in FIGS. 8A-9, 17-19B and described below is not intended to be limiting.

In some implementations, methods 800, 820, 840, 900, 1700, 1800, 1900, 1920 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of methods 800, 820, 840, 900, 1700, 1800, 1900, 1920 in response to instructions stored electronically on an electronic storage medium. The one or more processing devices may include one or more devices configured through hardware, firmware, and/or software to be specifically designed for execution of one or more of the operations of methods 800, 820, 840, 900, 1700, 1800, 1900, 1920.

Figure 8A:
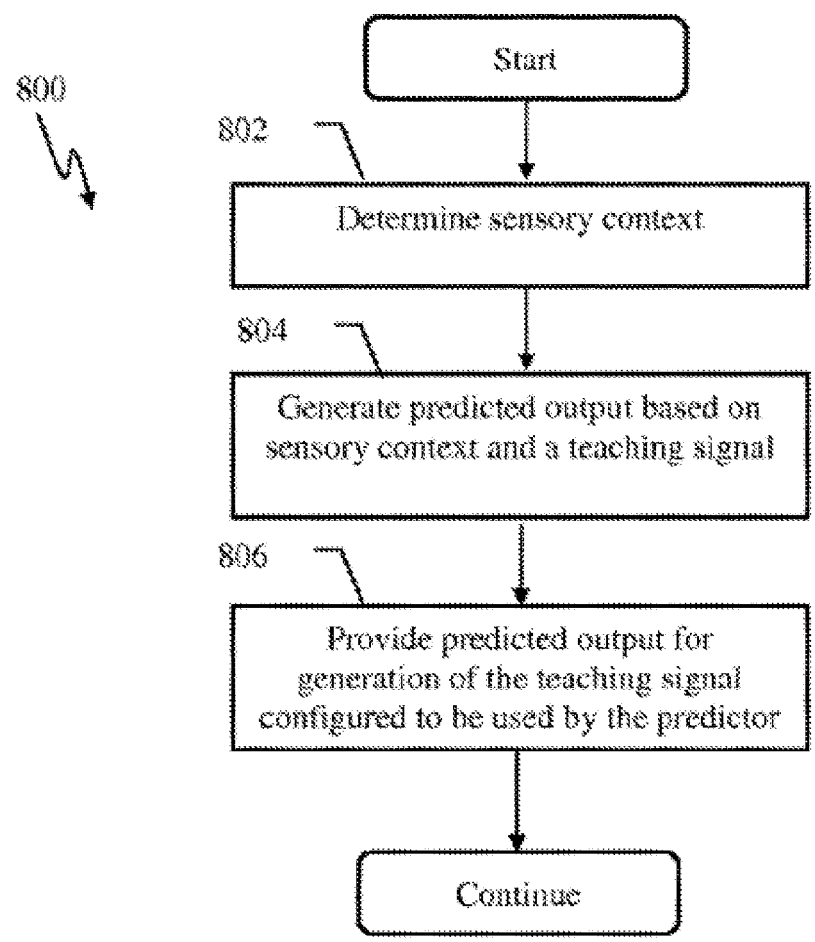
FIG. 8A is a logical flow diagram illustrating a method of operating an adaptive predictor, in accordance with one or more implementations.

At operation 802 of method 800, illustrated in FIG. 8A sensory context may be determined. In some implementations, the context may comprise on or more aspects of sensory input (e.g., 206) and/or plant feedback (216 in FIG. 2A). In one or more implementations, the sensory aspects may include an object being detected in the input, a location of the object, a n object characteristic (color/shape), a sequence of movements (e.g., a turn), a characteristic of an environment (e.g., an apparent motion of a wall and/or other surroundings turning a turn and/or approach) responsive to the movement. In some implementation, the sensory input may be received based on performing one or more training trials (e.g., as the trials described with respect to Table 1-Table 3 above) of a robotic apparatus.

At operation 804, a predicted output may be generated based on the context and a teaching signal. In some implementations, the teaching signal may comprise an output of a combiner apparatus (e.g., 204 in FIG. 2A) that may be configured based on predicted output from a prior trial. The teaching signal may comprise action indications. In one or more implementations, the teaching signal may be provided by a controller (e.g., 212 in FIG. 2B and/or 302 in FIG. 3A) and/or a supervisor (e.g., a human or computerized agent). The output of operation 804 may correspond to predictor output of a training trial (e.g., the trial 1410 of FIG. 14).

At operation 806 the predicted output may be provided for generating the teaching signal configured to be used by the predictor at, for example, a subsequent trial (e.g., the trial 1412 of FIG. 14).

Figure 8B:
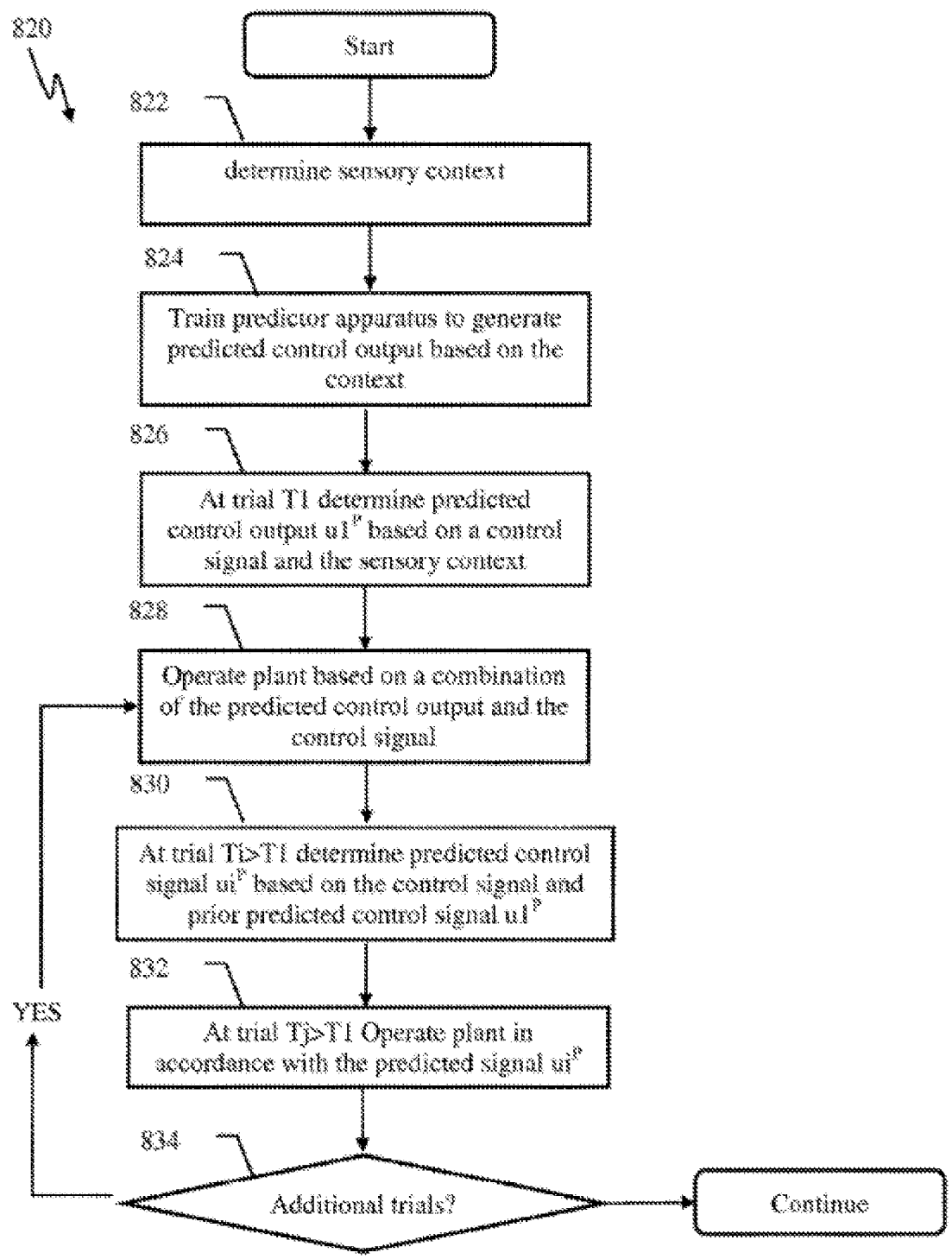
FIG. 8B is a logical flow diagram illustrating a method of training an adaptive predictor, in accordance with one or more implementations.

FIG. 8B illustrates a method of training a robotic device comprising an adaptive predictor, in accordance with one or more implementations. The robotic apparatus may be configured to perform one or more tasks (e.g., approach a target).

At operation 822 of method 820, sensory context may be determined. In some implementations, the context may comprise on or more aspects of sensory input, as described above with respect to operation 802 of FIG. 8A.

At operation 824, training of the predictor apparatus may commence in order to generate predicted control output based, at least in part, on the context.

At operation 826, a predicted control signal u1' may be generated based on the context and a control signal. The control signal may correspond to an output (e.g., 208) of controller. In some implementations, the predictor may determine the control signal based on one or more of sensory input (e.g., 206), plant feedback (216), and/or prior predictor state Q associated with the context that may have occurred previously. The predicted output may comprise a control command (e.g., turn by 9°). In some implementations e.g., as illustrated and described with respect to FIG. 2B, the predicted output may be generated based a teaching signal. The teaching signal (e.g., 204 in FIG. 2B) may comprise a combination of the predicted control output and the control signal (e.g., 240 in FIG. 2B). Operation 826 may be executes as a part of a training trial (e.g., the trial 1410 of FIG. 14).

At operation 828, plant of the robotic apparatus may be operated based on a combination of the predicted control output $u2^P$ and the control signal.

At operation 830, at another trial Ti>T1 predicted control signal $ui^P$ may be determined based on the control signal and prior predicted control output u1.

At operation 832, at the trial Tj>T1 plant of the robotic apparatus may be operated based on a combination of the predicted control output $ui^P$ and the control signal.

At operation 834 a determination may be made as to whether additional trials may be performed. If another trial is to be performed, the method may proceed to step 828.

Figure 8C:
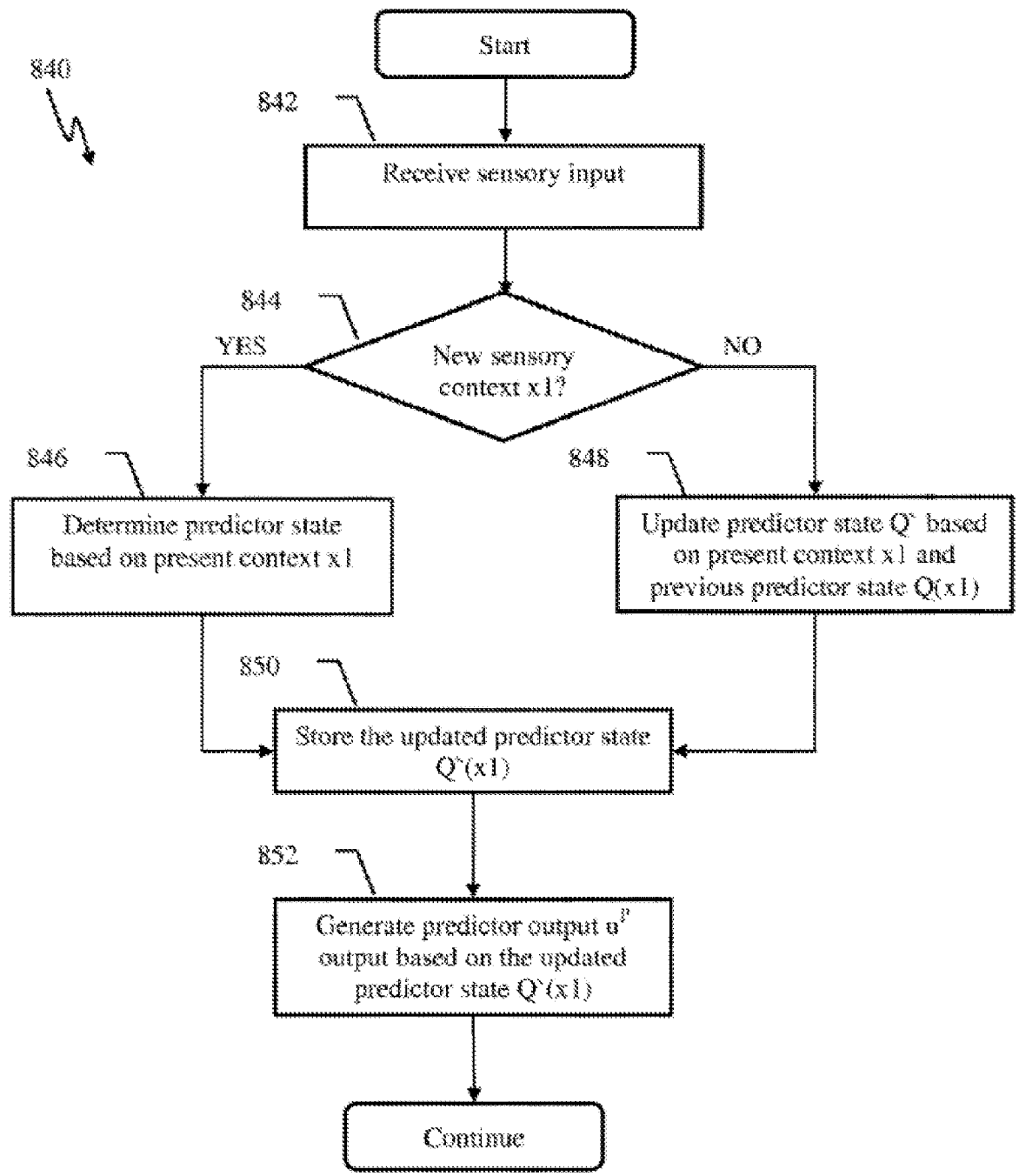
FIG. 8C is a logical flow diagram illustrating a method of operating an adaptive predictor based on input sensory context, in accordance with one or more implementations.

FIG. 8C illustrates a method of operating an adaptive predictor of a robotic device based on sensory context, in accordance with one or more implementations.

At operation 842 of method 840, sensory input may be received. The input received at operation 842 may be characterized by a context associated therewith. In some implementations, the sensory input and/or context may comprise on or more aspects, such as described above with respect to operation 802 of FIG. 8A.

At operation 844, a determination may be made as to whether the context associated with the input received at operation 842 a corresponds to new context or previously observed context. As used herein, the term 'new context' may be used to describe context that was not present in the sensory input, immediately prior to operation 842. In some implementations, such as illustrated and described with respect to FIG. 14, and/or Table 2-Table 3, the context may correspond to a presence of an obstacle or an object in the sensory input. Based on the same object and/or obstacle being present in the sensory input during two or more trials and training information from one (or more) prior trials (e.g., prior object/obstacle type shape, color, position, and/or other characteristic, and/or prior predictor state (e.g., neuron network configuration, neuron states (excitability), connectivity (e.g., efficacy of connections) be available during a subsequent trial, such context may be considered as previously observed (e.g., not new).

Responsive to a determination at operation 844 that the present sensory context has not been previously observed, the method 840 may proceed to operation 846 wherein predictor state Q may be determined based on the inputs into the predictor (e.g., inputs 206, 216 in FIG. 2A). In some implementations, such as shown and described with respect to FIG. 9, below, the predictor state may be based on a training signal (e.g., 204 in FIG. 2B). In one or more implementations, the predictor state determination of operation 846 may correspond to training configuration shown and described with respect to Table 2, supra.

Responsive to a determination at operation 844 that the present sensory context has been previously observed, the method 840 may proceed to operation 848 wherein an updated predictor state Q may be determined based on the inputs into the predictor (e.g., inputs 206, 216 in FIG. 2A), and a previous predictor state Q(x1) associated with the context x1. In some implementations, such as shown and described with respect to FIG. 9, below, the predictor state Q update may be based on a training signal (e.g., 204 in FIG. 2B). In one or more implementations, the predictor state determination of operation 848 may correspond to training configuration shown and described with respect to Table 2, supra.

At operation 850, updated predictor state Q'(x1) may be stored. In some implementations, the predictor state may be stored in locally (e.g., in memory 1134 in FIG. 11B and or micro block L1 1152 of FIG. 11D). In one or more implementations, the predictor state may be stored in a commonly available storage (e.g., 1108 and/or 1106 of FIG. 11A).

At operation 852, predicted control output (e.g., 218, 238 in FIGS. 2A-2B) may be generated based on the updated predictor state. In some implementations, the predicted output of operation 852 may correspond to output $u^P$ shown and described with respect to Table 1-Table 3.

Figure 9:
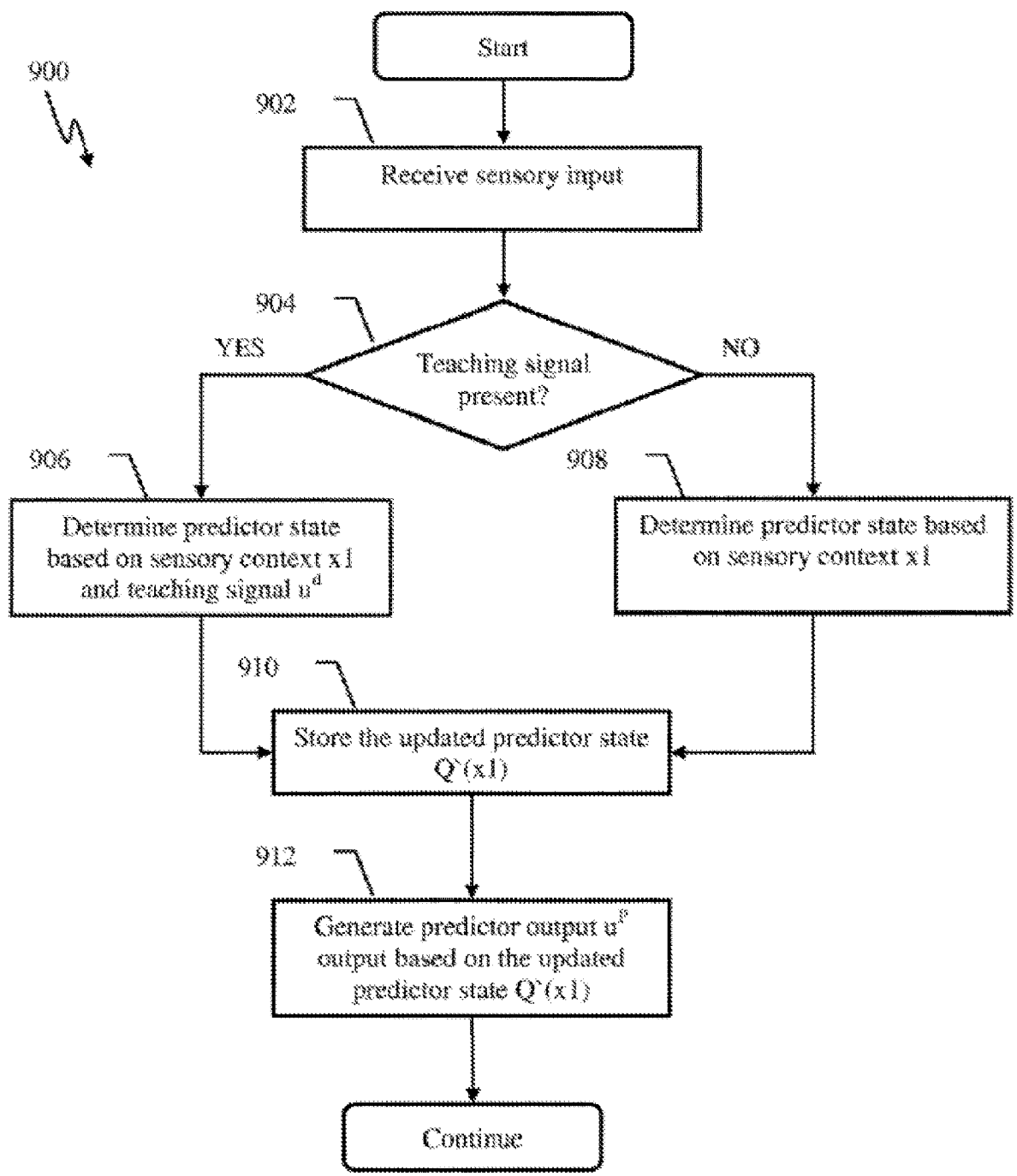
FIG. 9 is a logical flow diagram illustrating a method of operating an adaptive predictor comprising a training input, in accordance with one or more implementations.

FIG. 9 illustrates a method of operating an adaptive predictor comprising a training input, in accordance with one or more implementations.

At operation 902 of method 900, sensory input may be received. The input received at operation 902 may be characterized by a context associated therewith. In some implementations, the sensory input and/or context may comprise on or more aspects, such as described above with respect to operation 802 of FIG. 8A.

At operation 904, a determination may be made as to whether the teaching signal is available to the predictor. In some implementations, such as shown and described with respect to FIGS. 2B-3E, supra, the training signal may comprise target predictor output that may be determined based on a combination of the controller output (e.g., 208 in FIG. 2B) and predictor output from a prior trial (e.g., as described by Eqn. 9).

Responsive to a determination at operation 904 that the teaching signal is available, the method 900 may proceed to operation 906 wherein predictor state Q may be determined based on the inputs into the predictor (e.g., inputs 206, 216 in FIG. 2A), and the teaching signal (e.g., 304 in FIG. 3B). In some implementations, the predictor state may comprise one (or more) of: neuron network configuration (e.g., number and/or type of neurons and/or neuron connectivity), neuron states (excitability), and connectivity (e.g., efficacy of connections). In some implementations, the network configuration may comprise neuron state parameter characterizing neuron intrinsic plasticity. In one or more implementations, the predictor state may comprise one or more LUT (e.g., as illustrated by Table 4-Table 5), a database comprising one or more tables; and/or a hash-table. In some implementations, the predictor state may comprise a bit-file configured to characterize machine code and/or memory content of the predictor processing apparatus (e.g., a processing core, a CPU, a DSP, and/or FPGA).

Responsive to a determination at operation 904 that the teaching signal is not available, the method 900 may proceed to operation 908 wherein predictor state Q may be determined based on the inputs into the predictor (e.g., inputs 206, 216 in FIG. 2A.

At operation 910, updated predictor state Q'(x1) may be stored. In some implementations, the predictor state may be stored in locally (e.g., in memory 1134 in FIG. 11B and or micro block L1 1152 of FIG. 11D). In one or more implementations, the predictor state may be stored in a commonly available storage (e.g., 1108 and/or 1106 of FIG. 11A).

At operation 902, predicted control output (e.g., 218, 238 in FIGS. 2A-2B) may be generated based on the updated predictor state. In some implementations, the predicted output of operation 902 may correspond to output $u^P$ shown and described with respect to Table 1-Table 3.

Figure 17:
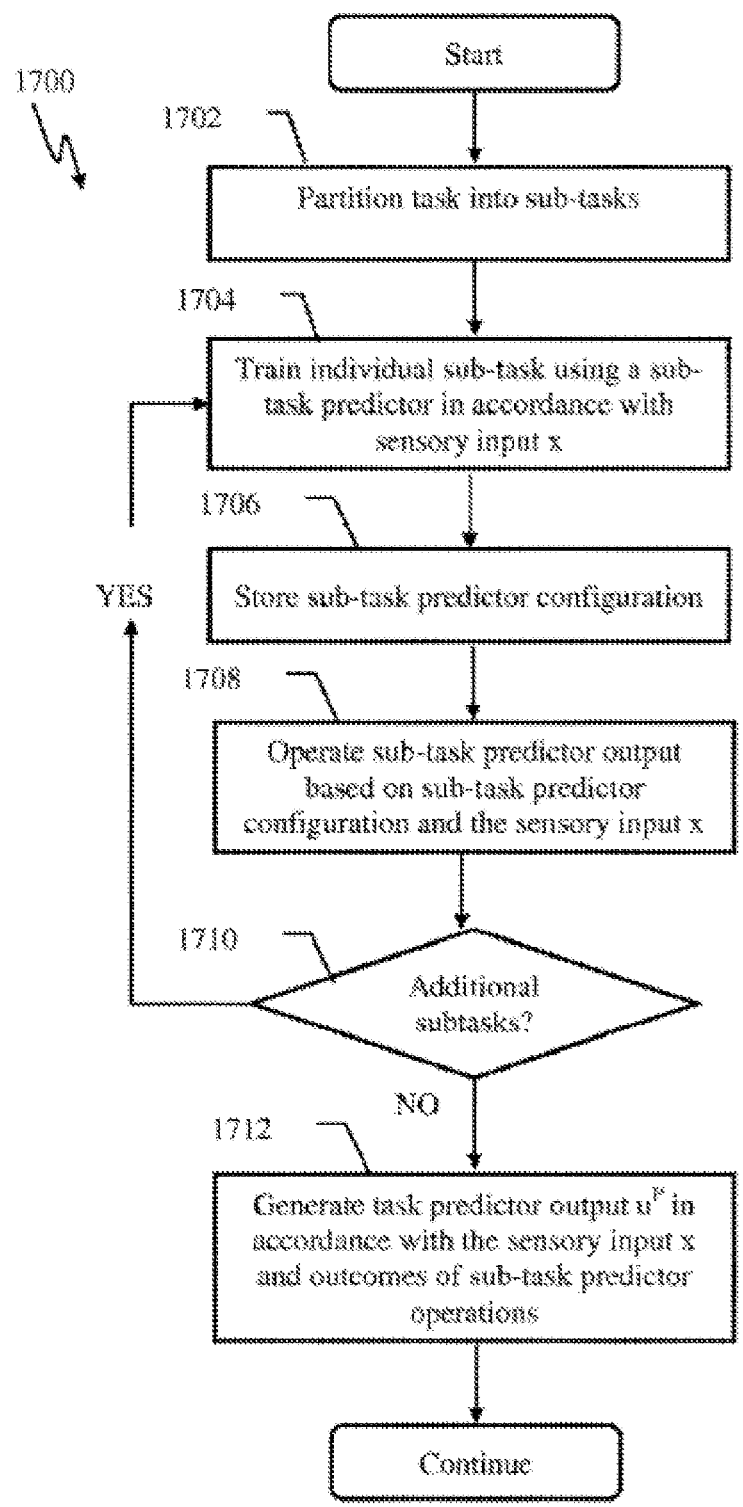
FIG. 17 is a logical flow diagram illustrating a method of developing a hierarchy of control tasks by a controller comprising an adaptive predictor, in accordance with one or more implementations.

FIG. 17 illustrates a method of developing a hierarchy of control tasks by a controller comprising an adaptive predictor, in accordance with one or more implementations.

At operation 1702, a given task may be partitioned into two (or more) sub-tasks. In some implementations, such as a task of training of a robotic manipulator to grasp a particular object (e.g., a cup), the subtasks may correspond to identifying the cup (among other objects); approaching the cup, avoiding other objects (e.g., glasses, bottles), and/or grasping the cup. A subtask predictor may comprise action indication predictor.

At operation 1704, an predictor for an individual sub-task may be trained in accordance with sensory input x. In one or more implementations, individual sub-task predictor may comprise one or more predictor configurations described, for example, with respect to FIGS. 2A-3E, 4, described above.

At operation 1706, trained predictor configuration may be stored. In one or more implementations, the trained predictor configuration may comprise one (or more) of neuron network configuration (e.g., number and/or type of neurons and/or connectivity), neuron states (excitability), connectivity (e.g., efficacy of connections).

At operation 1708, sub-task predictor may be operated in accordance with the sub-task predictor configuration and the sensory input. In some implementations of a predictor corresponding to a composite task (e.g., 2100, 2110, 2112 in FIG. 21), predictor operation may comprise determining which lower level (within the hierarchy) predictors are to be activated, and/or plant control output is to be generated. In some implementations of a predictor corresponding to the lowest level task (e.g., 2120, 2122, in FIG. 21), predictor operation may comprise generation of control output.

At operation 1710, a determination may be made as to whether additional subtask predictor may need to be trained. In some implementations, the predictor may be configured to perform the determination. In one or more implementations, a controller (e.g., 212 in FIG. 2B) and/or a teacher (e.g., an external human and/or computerized agent) may be configured to perform the determination.

Responsive to a determination that no additional subtasks remain, the method may proceed to step 1712 where output $u^P$ for the task predictor may be generated in accordance with the sensory input x and outcomes of the sub-task predictor operation at operation 1708.

Figure 18:
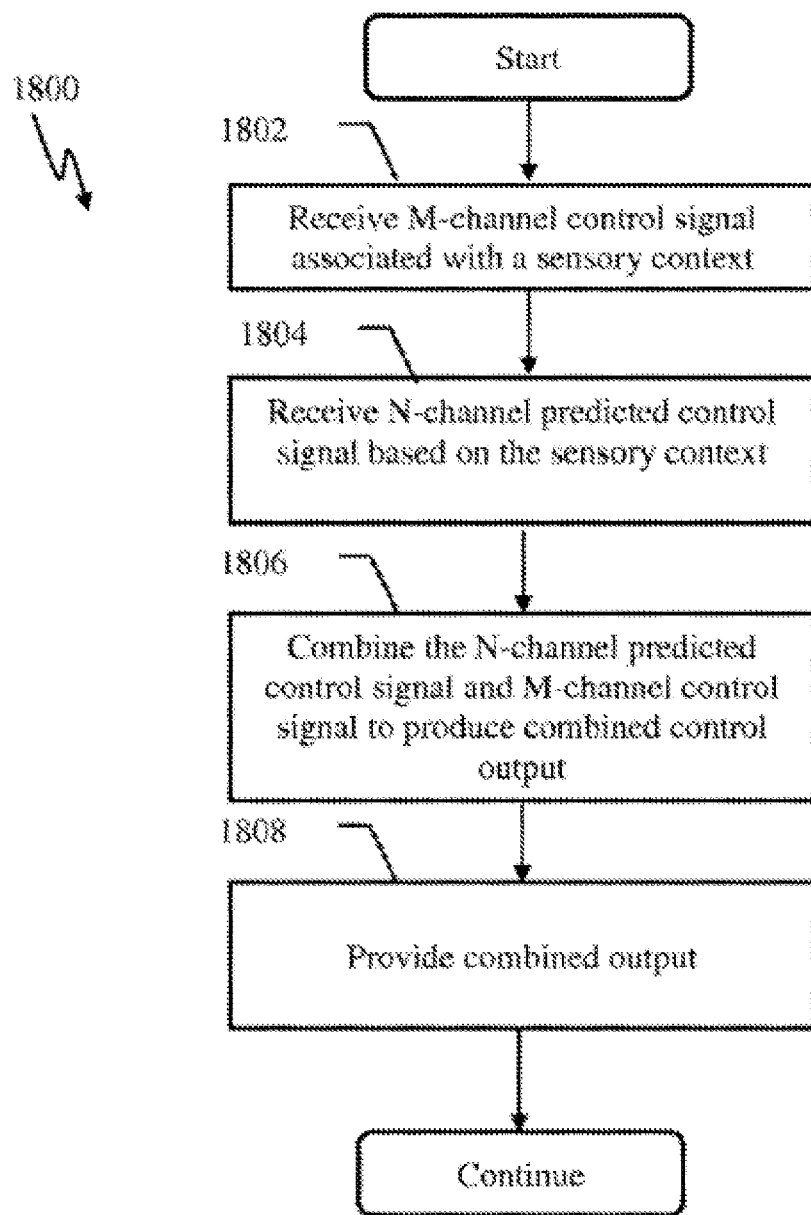
FIG. 18 is a logical flow diagram illustrating a method of operating a signal combiner for use with an adaptive predictor apparatus of FIG. 3A, in accordance with one or more implementations.

FIG. 18 illustrates a method of operating an adaptive control system comprising a signal combiner and an adaptive predictor apparatus of, e.g., FIG. 3A, in accordance with one or more implementations.

At operation 1802 of method 1800, the signal combiner may receive an M-channel control signal associated with a sensory context. In some implementations, the sensory input and/or context may comprise on or more aspects, such as described above with respect to operation 802 of FIG. 8A. In one or more implementations of spiking neuron network control system, the M-channel control signal may correspond to a spike input received by a spiking neuron (e.g., 140 of FIG. 1B) of the combiner via M connections (e.g., 124 in FIG. 1B). The spike input may comprise one to M spike trains (e.g., 1332 in FIG. 13B).

At operation 1804, the combiner may receive N-channel predictor output associated with the sensory context. In one or more implementations of spiking neuron network control system, the N-channel predictor output may correspond to a spike output (e.g., 1346 in FIG. 13B) communicated by the predictor via one to N connections At operation 1806, the N-channel predicted output and the M-channel control signal may be combined to produce combined control output. In one or more implementations of spiking neuron network control system, the combined output may correspond to a spike train e.g., 1356 in FIG. 13B) communicated by spiking neuron of the combiner. In some implementations, the combined output (e.g., shown by the trace 1350 in FIG. 13B) may comprise fewer channels (dimensions) compared to number of channels/dimensions M associated with the controller input (e.g., 1330 in FIG. 13B), and/or number of channels/dimensions N associated with the predictor input (e.g., 1330 in FIG. 13B). A variety of data compression and/or multiple access techniques may be utilized in order to combine the predicted data stream (e.g., spikes 1344 in FIG. 13B) with the controller data stream (e.g., spikes 1334 in FIG. 13B) into output data stream (e.g., spikes 1354 in FIG. 13B). In one or more implementations, multiple access techniques may be employed, such as, time division, frequency division, code division multiple access. In one or more implementations, predictor output (e.g., 1346 in FIG. 13B) and/or combiner output (e.g., 1356 in FIG. 13B) may be encoded using sparse coding wherein individual information packets may be encoded by the strong activation of a relatively small set of neurons. Individual items may be encoded using a different subset of available neurons.

At operation 1808, combined output may be provided. In some implementations, the combined output (e.g., 240 in FIG. 2B) may be employed for controlling a plant (e.g., 210 in FIG. 2B). In one or more implementations, the combined output may be utilized (e.g., vi a teaching signal 204 in FIG. 2B) in generating predicted control signal at a subsequent time.

Figure 19A:
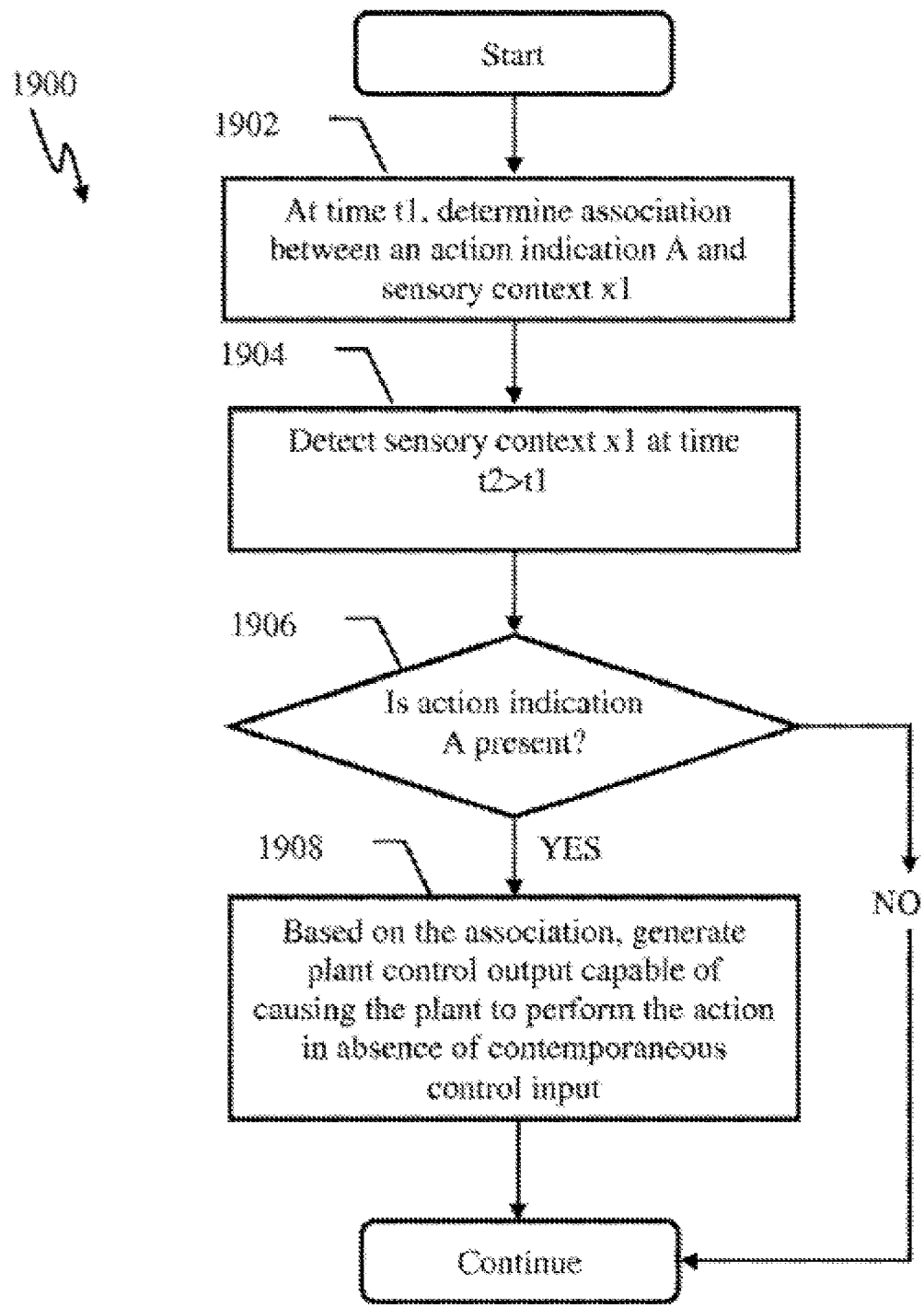
FIG. 19A is a logical flow diagram illustrating a method of developing an association between an action indication and sensory context for use in an adaptive predictor apparatus of, e.g., FIG. 20A, in accordance with one or more implementations.

FIG. 19A illustrates a method of developing an association between an action indication and sensory context for use in an adaptive predictor apparatus of, e.g., FIG. 20A, in accordance with one or more implementations.

At operation 1902 of method 1900, an action indication, configured based on sensory context x1, may be received by the predictor at time t1. In one or more implementations, the sensory context x1 may comprise one or more characteristics of an object (e.g., location of target 1208 in FIG. 12); the action indication A may comprise an action tag, e.g., A='turn'. The adaptive predictor may be operated in accordance with a learning process configured to develop an association between the action tag and the sensory context. The predictor may be configured to generate plant control output (e.g., 2014 in FIG. 20A) based on the developed association and/or receipt of the action indication. The learning process may be aided by a teaching signal (e.g., 2004 in FIG. 20A). In some implementations, the teaching signal may enable learning imitation, e.g., wherein the predictor is configured to mimic the teaching signal (e.g., the correct motor commands for the given context) as described, for example, in U.S. patent application Ser. No. 13/313,826 entitled "APPARATUS AND METHODS FOR IMPLEMENTING LEARNING FOR ANALOG AND SPIKING SIGNALS IN ARTIFICIAL NEURAL NETWORKS", filed Dec. 7, 2011, U.S. patent application Ser. No. 13/722,769 filed Dec. 20, 2012, and entitled "APPARATUS AND METHODS FOR STATE-DEPENDENT LEARNING IN SPIKING NEURON NETWORKS", and/or U.S. patent application Ser. No. 13/761,090 entitled "APPARATUS AND METHODS FOR IMPLEMENTING LEARNING FOR ANALOG AND SPIKING SIGNALS IN ARTIFICIAL NEURAL NETWORKS", filed Feb. 6, 2013, incorporated supra. In some implementations, the predictor may be configured to learn through reinforcement learning, as described, for example, in U.S. patent application Ser. No. 13/489,280 entitled "APPARATUS AND METHODS FOR REINFORCEMENT LEARNING IN ARTIFICIAL NEURAL NETWORKS", filed Jun. 5, 2012, incorporated supra. Upon learning the association between the tag A and the context x1, the predictor may be characterized by predictor state Q(A, x1). In some implementations of a predictor comprising a spiking neuron network, the association information may comprise one or more network connectivity, neuron state, and/or connection efficacy (e.g., weights). The developed association information (e.g., predictor state Q(A, x1) may be stored in, for example, shared memory 1106, 1108 of FIG. 11A, and/or cell memory 1134 of FIG. 11B.

In some implementations, during learning, association development by the predictor may be aided by plant control commands (e.g., 2046 in FIG. 20B) issued by the controller (2042 in FIG. 20B). The control command 2046 may act as a training input via the pathway 2034 in FIG. 20B for the predictor learning process. Subsequent to learning, once the predictor has associated the action indicator with the sensory context, the low-level control output (e.g., 2046) may be withdrawn by the controller.

At operation 1904 at a subsequent time instance t2>t1, the sensory context x1 may be detected by the predictor in sensory input (e.g., 2006 in FIG. 20A). In one or more implementations, the context x1 may correspond to a location of a target (e.g., 1208 in FIG. 12).

At operation 1906 at a subsequent time instance t3>t1, a determination may be made as to whether the control action indication is present. In one or more implementations, the action indication A may comprise the control tag A='turn', (e.g., 1204 in FIG. 12).

Responsive to detecting the presence of the action tag at operation 1906, the method 1900 may proceed to step 1908 wherein the predictor may generate the plant control output capable of causing the plant to perform the action in absence of contemporaneous control input (e.g., 2046 in FIG. 20B) from the controller. In some implementations, the plant control signal generation may be effectuated based on the association information (e.g., predictor state Q(A, x1)) developed at operation 1902 and/or stored in, for example, shared memory 1106, 1108 of FIG. 11A, and/or cell memory 1134 of FIG. 11B.

Figure 19B:
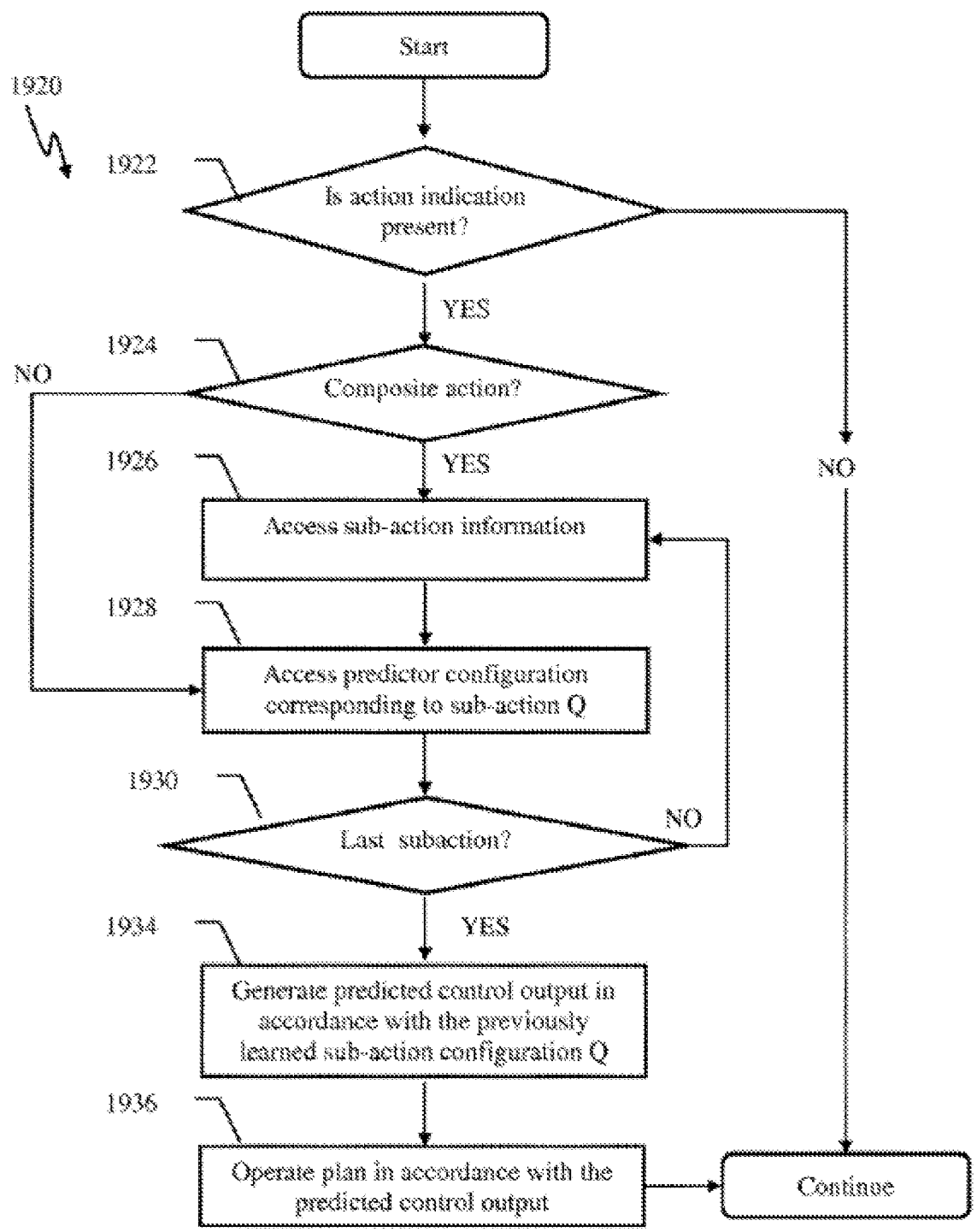
FIG. 19B is a logical flow diagram illustrating a method of operating an adaptive predictor apparatus of, e.g., FIG. 20B using associations between an action indication and sensory context for, in accordance with one or more implementations.

FIG. 19B illustrates a method of operating an adaptive predictor apparatus of, e.g., FIG. 20B, using a hierarchy of previously developed associations between an action indication and sensory context for, in accordance with one or more implementations.

At operation 1922 of method 1920, a determination may be made as to whether an action indication is present. In one or more implementations, the action indication may correspond to one or more tasks 2100, 2110, 2112, 2114, described with respect to FIG. 21 above.

Responsive to detecting the presence of the action tag at operation 1922, the method 1920 may proceed to operation 1924 wherein a determination may be made as to whether the action comprises a composite action and/or a primitive action (e.g., 2120 in FIG. 21).

Responsive to determining operation 1924 that the action comprises a composite action (e.g., the task 2110 in FIG. 21 configured to trigger motor primitives 2120, 2122), the method 1920 may proceed to step 1926 wherein sub-action information may be accessed. Access of the sub-action information may comprise one or more operations such as identifying the sub-action (e.g., activate right motor), providing operational parameters for executing control output associated with the sub-action (e.g., rotate left motor forward at a torque 0.5).

At operation 1928 of method 1920, predictor configuration associated with the sub-action may be accessed. In some implementations, predictor configuration may comprise predictor state (e.g., network weights) determined during the association between the action indication and sensory context at a prior time (e.g., as described with respect to method 1900 of FIG. 19). In one or more implementations, previously stored predictor configuration (e.g., a vector of efficacies) may be loaded into a neuron process (e.g., neuron 120 of FIG. 1B, and/or into a block of neuromorphic computing apparatus (e.g., the block L1 1152, L2 1154, L3 1156 of FIG. 11D described below).

At operation 1930 of method 1920, a determination may be made as to whether an additional sub action indication is present. In some implementations, a given (sub) action of a given level (e.g., 2112 in FIG. 21) may invoke multiple lower level sub-actions (e.g., 2120, 2122). In such implementations, multiple instances of neuron 120 and/or block of neuromorphic computing block may be instantiated with configuration of the respective predictor, e.g., based on a prior association for the action indication "right turn", one block of the neuromorphic apparatus 1150 may be configured with the predictor state configured to generate right motor instructions (sub-action 1); and another block of the neuromorphic apparatus 1150 may be configured with the predictor state configured to generate left motor instructions (sub-action 2). Responsive to determining at operation 1928 that additional sub-actions are to be initiated the method may proceed to operation 1926.

Responsive to determining at operation 1928 that no additional sub-actions are to be initiated, the method may proceed to operation 1930 wherein predicted control output may be generated (by one or more predictor blocks) in accordance with the previously learned sub-action configuration.

At operation 1932, the plant may be operated (e.g., execute a 30° right turn) in accordance with the predicted motor control output configured based on the action indication of operation 1922 (e.g., turn right) and sensory input (e.g., input 2126, object at 30° to the right).

Adaptive predictor methodologies described herein may be utilized in a variety of processing apparatus configured to, for example, implement target approach and/or obstacle avoidance by autonomous robotic devices and/or sensory data processing (e.g., object recognition).

Figure 10A:
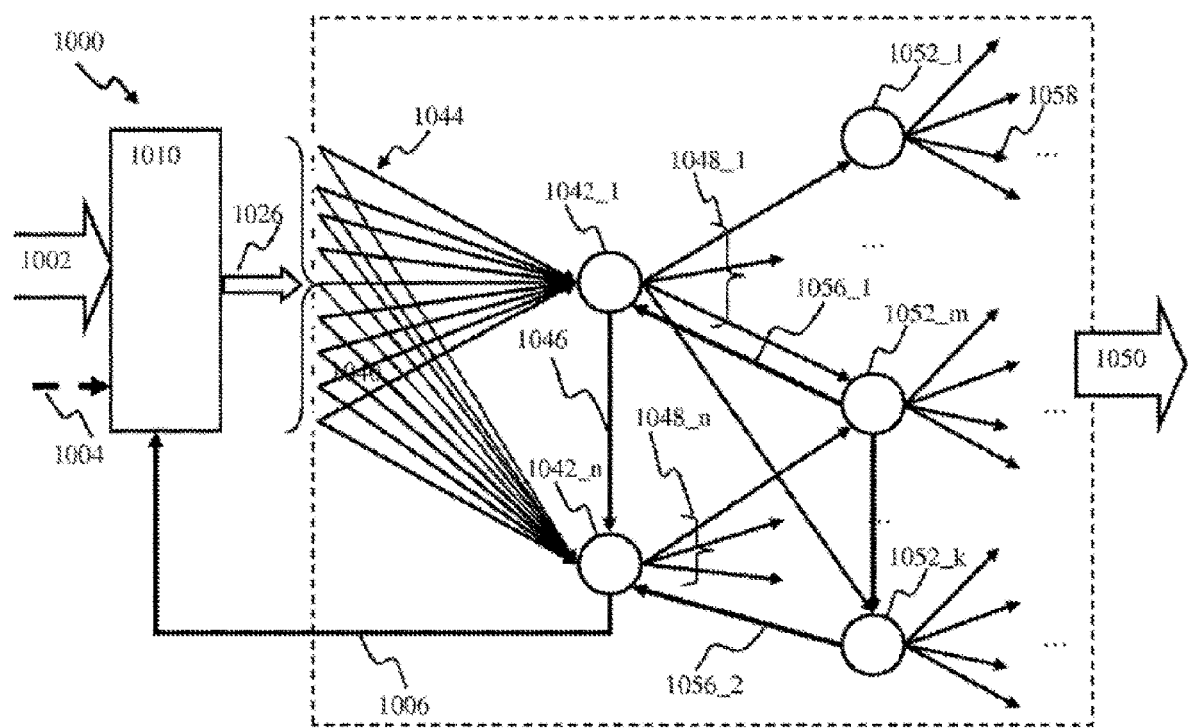
FIG. 10A is a block diagram illustrating a sensory processing apparatus useful with an adaptive controller of a robotic device of FIG. 10B, in accordance with one or more implementations.

One approach to object recognition and/or obstacle avoidance may comprise processing of optical flow using a spiking neural network comprising for example the self-motion cancellation mechanism, such as described, for example, in U.S. patent application Ser. No. 13/689,717, entitled "APPARATUS AND METHODS FOR OBJECT DETECTION VIA OPTICAL FLOW CANCELLATION", filed Nov. 30, 2012, the foregoing being incorporated herein by reference in its entirety, is shown in FIG. 10A. The illustrated processing apparatus 1000 may comprise an input interface configured to receive an input sensory signal 1002. In some implementations, this sensory input may comprise electromagnetic waves (e.g., visible light, IR, UV, and/or other types of electromagnetic waves) entering an imaging sensor array. The imaging sensor array may comprise one or more of RGCs, a charge coupled device (CCD), an active-pixel sensor (APS), and/or other sensors. The input signal may comprise a sequence of images and/or image frames. The sequence of images and/or image frame may be received from a CCD camera via a receiver apparatus and/or downloaded from a file. The image may comprise a two-dimensional matrix of RGB values refreshed at a 25 Hz frame rate. It will be appreciated by those skilled in the arts that the above image parameters are merely exemplary, and many other image representations (e.g., bitmap, CMYK, HSV, grayscale, and/or other representations) and/or frame rates are equally useful with the present invention. The apparatus 1000 may be embodied in, for example, an autonomous robotic device, e.g., the device 1060 of FIG. 10B.

The apparatus 1000 may comprise an encoder 1010 configured to transform (e.g., encode) the input signal 1002 into an encoded signal 1026. In some implementations, the encoded signal may comprise a plurality of pulses (also referred to as a group of pulses) configured to represent to optical flow due to one or more objects in the vicinity of the robotic device.

The encoder 1010 may receive signal 1004 representing motion of the robotic device. In one or more implementations, the input 1004 may comprise an output of an inertial sensor block. The inertial sensor block may comprise one or more acceleration sensors and/or acceleration rate of change (i.e., rate) sensors. In one or more implementations, the inertial sensor block may comprise a 3-axis accelerometer and/or 3-axis gyroscope. It will be appreciated by those skilled in the arts that various other motion sensors may be used to characterized motion of a robotic platform, such as, for example, radial encoders, range sensors, global positioning system (GPS) receivers, RADAR, SONAR, LIDAR, and/or other sensors.

The encoder 1010 may comprise one or more spiking neurons. One or more of the spiking neurons of the block 1010 may be configured to encode motion input 1004. One or more of the spiking neurons of the block 1010 may be configured to encode input 1002 into optical flow, as described in U.S. patent application Ser. No. 13/689,717, entitled "APPARATUS AND METHODS FOR OBJECT DETECTION VIA OPTICAL FLOW CANCELLATION", filed Nov. 30, 2012, incorporated supra.

The encoded signal 1026 may be communicated from the encoder 1010 via multiple connections (also referred to as transmission channels, communication channels, or synaptic connections) 1044 to one or more neuronal nodes (also referred to as the detectors) 1042.

In the implementation of FIG. 10A, individual detectors of the same hierarchical layer may be denoted by a "n" designator, such that e.g., the designator 1042_1 denotes the first detector of the layer 1042. Although only two detectors (1042_1, 1042_n) are shown in the implementation of FIG. 10 for clarity, it will be appreciated that the encoder may be coupled to any number of detector nodes that is compatible with the detection apparatus hardware and software limitations. Furthermore, a single detector node may be coupled to any practical number of encoders.

In one implementation, individual detectors 1042_1, 1042_n may contain logic (which may be implemented as a software code, hardware logic, or a combination of thereof) configured to recognize a predetermined pattern of pulses in the encoded signal 1026 to produce post-synaptic detection signals transmitted over communication channels 1048. Such recognition may include one or more mechanisms described in U.S. patent application Ser. No. 12/869,573, filed Aug. 26, 2010 and entitled "SYSTEMS AND METHODS FOR INVARIANT PULSE LATENCY CODING", U.S. patent application Ser. No. 12/869,583, filed Aug. 26, 2010, entitled "INVARIANT PULSE LATENCY CODING SYSTEMS AND METHODS", U.S. patent application Ser. No. 13/117,048, filed May 26, 2011 and entitled "APPARATUS AND METHODS FOR POLYCHRONOUS ENCODING AND MULTIPLEXING IN NEURONAL PROSTHETIC DEVICES", U.S. patent application Ser. No. 13/152,084, filed Jun. 2, 2011, entitled "APPARATUS AND METHODS FOR PULSE-CODE INVARIANT OBJECT RECOGNITION", each of the foregoing incorporated herein by reference in its entirety. In FIG. 10A, the designators 1048_1, 1048_n denote output of the detectors 10421, 1042n, respectively.

In some implementations, the detection signals may be delivered to a next layer of detectors 1052 (comprising detectors 10521, 1052m, 1052_k) for recognition of complex object features and objects, similar to the exemplary implementation described in commonly owned and U.S. patent application Ser. No. 13/152,084, filed Jun. 2, 2011, entitled "APPARATUS AND METHODS FOR PULSE-CODE INVARIANT OBJECT RECOGNITION", incorporated supra. In such implementations, individual subsequent layers of detectors may be configured to receive signals from the previous detector layer, and to detect more complex features and objects (as compared to the features detected by the preceding detector layer). For example, a bank of edge detectors may be followed by a bank of bar detectors, followed by a bank of corner detectors and so on, thereby enabling recognition of one or more letters of an alphabet by the apparatus.

Individual detectors 1042 may output detection (post-synaptic) signals on communication channels 10481, 1048_n (with an appropriate latency) that may propagate with different conduction delays to the detectors 1052. The detector cascade of the implementation of FIG. 10 may contain any practical number of detector nodes and detector banks determined, inter alia, by the software/hardware resources of the detection apparatus and complexity of the objects being detected.

The sensory processing apparatus 1000 illustrated in FIG. 10A may further comprise one or more lateral connections 1046, configured to provide information about activity of neighboring neurons to one another.

In some implementations, the apparatus 1000 may comprise feedback connections 1006, 1056, configured to communicate context information from detectors within one hierarchy layer to previous layers, as illustrated by the feedback connections 10561, 1056_2 in FIG. 10. In some implementations, the feedback connection 1006 may be configured to provide feedback to the encoder 1010 thereby facilitating sensory input encoding, as described in detail in U.S. patent application Ser. No. 13/152,084, filed Jun. 2, 2011, entitled "APPARATUS AND METHODS FOR PULSE-CODE INVARIANT OBJECT RECOGNITION", incorporated supra.

Figure 10B:
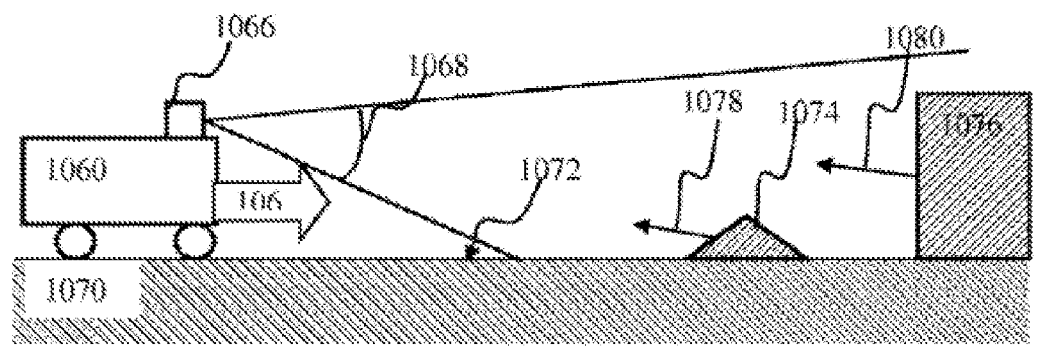
FIG. 10B is a graphical illustration depicting robotic apparatus comprising an adaptive controller apparatus of the disclosure configured for obstacle avoidance, in accordance with one or more implementations.

FIG. 10B a mobile robotic apparatus that may be configured with an adaptive controller implementation illustrated in FIG. 10A, supra. The robotic apparatus 1060 may comprise a camera 1066. The camera 1066 may be characterized by a field of view 1068. The camera 1066 may provide information associated with objects within the field-of-view. In some implementations, the camera 1066 may provide frames of pixels of luminance, refreshed at 25 Hz frame rate.

One or more objects (e.g., a stationary object 1074 and a moving object 1076) may be present in the camera field of view. The motion of the objects may result in a displacement of pixels representing the objects within successive frames, such as described in in U.S. patent application Ser. No. 13/689,717, entitled "APPARATUS AND METHODS FOR OBJECT DETECTION VIA OPTICAL FLOW CANCELLATION", filed Nov. 30, 2012, incorporated, supra.

When the robotic apparatus 1060 is in motion, such as shown by arrow 1064 in FIG. 10B, the optical flow estimated from the image data may comprise the self-motion component and the object motion component. By way of a non-limiting example, the optical flow measured by the rover of FIG. 10B may comprise one or more of (i) self-motion components of the stationary object 1078 and the boundary (e.g., the component 1072 associated with the floor boundary); (ii) component 1080 associated with the moving objects 116 that comprises a superposition of the optical flow components due to the object displacement and displacement of the robotic apparatus, and/or other components.

Various exemplary spiking network apparatuses configured to perform one or more of the methods set forth herein (e.g., adaptive predictor functionality) are now described with respect to FIGS. 11A-11D.

Figure 11A:
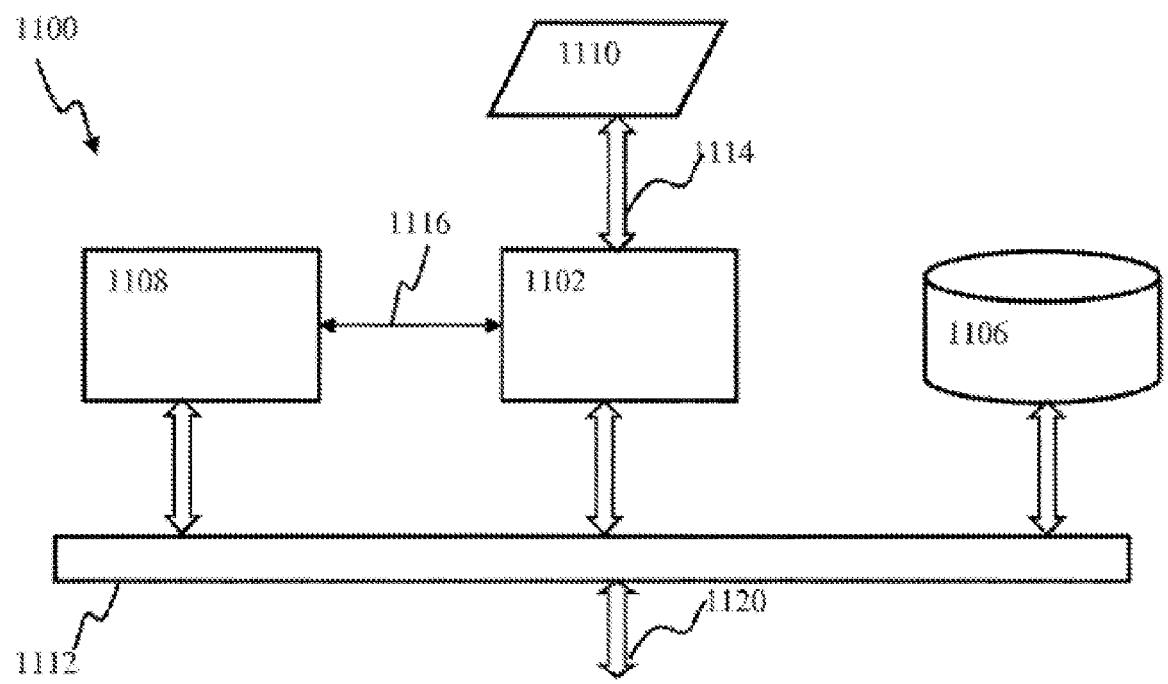
FIG. 11A is a block diagram illustrating a computerized system useful for, inter alia, implementing adaptive predictor apparatus, in accordance with one or more implementations.

One particular implementation of the computerized neuromorphic processing system, for use with an adaptive robotic controller described, supra, is illustrated in FIG. 11A. The computerized system 1100 of FIG. 11A may comprise an input device 1110, such as, for example, an image sensor and/or digital image interface. The input interface 1110 may be coupled to the processing block (e.g., a single or multi-processor block) via the input communication interface 1114. In some implementations, the interface 1114 may comprise a wireless interface (cellular wireless, Wi-Fi, Bluetooth, etc.) that enables data transfer to the processor 1102 from remote I/O interface 1100, e.g. One such implementation may comprise a central processing apparatus coupled to one or more remote camera devices providing sensory input to the adaptive predictor block (e.g., block 202 in FIG. 2A).

The system 1100 further may comprise a random access memory (RAM) 1108, configured to store neuronal states and connection parameters and to facilitate synaptic updates. In some implementations, synaptic updates may be performed according to the description provided in, for example, in U.S. patent application Ser. No. 13/239,255 filed Sep. 21, 2011, entitled "APPARATUS AND METHODS FOR SYNAPTIC UPDATE IN A PULSE-CODED NETWORK", incorporated by reference, supra In some implementations, the memory 1108 may be coupled to the processor 1102 via a direct connection 1116 (e.g., memory bus). The memory 1108 may also be coupled to the processor 1102 via a high-speed processor bus 1112.

The system 1100 may comprise a nonvolatile storage device 1106. The nonvolatile storage device 1106 may comprise, inter alia, computer readable instructions configured to implement various aspects of spiking neuronal network operation. Examples of various aspects of spiking neuronal network operation may include one or more of sensory input encoding, connection plasticity, operation model of neurons, learning rule evaluation, other operations, and/or other aspects. In one or more implementations, the nonvolatile storage 1106 may be used to store state information of the neurons and connections for later use and loading previously stored network configuration. The nonvolatile storage 1106 may be used to store state information of the neurons and connections when, for example, saving and/or loading network state snapshot, implementing context switching, saving current network configuration, and/or performing other operations. The current network configuration may include one or more of connection weights, update rules, neuronal states, learning rules, and/or other parameters.

In some implementations, the computerized apparatus 1100 may be coupled to one or more of an external processing device, a storage device, an input device, and/or other devices via an I/O interface 1120. The I/O interface 1120 may include one or more of a computer I/O bus (PCI-E), wired (e.g., Ethernet) or wireless (e.g., Wi-Fi) network connection, and/or other I/O interfaces.

In some implementations, the input/output (I/O) interface may comprise a speech input (e.g., a microphone) and a speech recognition module configured to receive and recognize user commands.

It will be appreciated by those skilled in the arts that various processing devices may be used with computerized system 1100, including but not limited to, a single core/ multicore CPU, DSP, FPGA, GPU, ASIC, combinations thereof, and/or other processors. Various user input/output interfaces may be similarly applicable to implementations of the invention including, for example, an LCD/LED monitor, touch-screen input and display device, speech input device, stylus, light pen, trackball, and/or other devices.

Figure 11B:
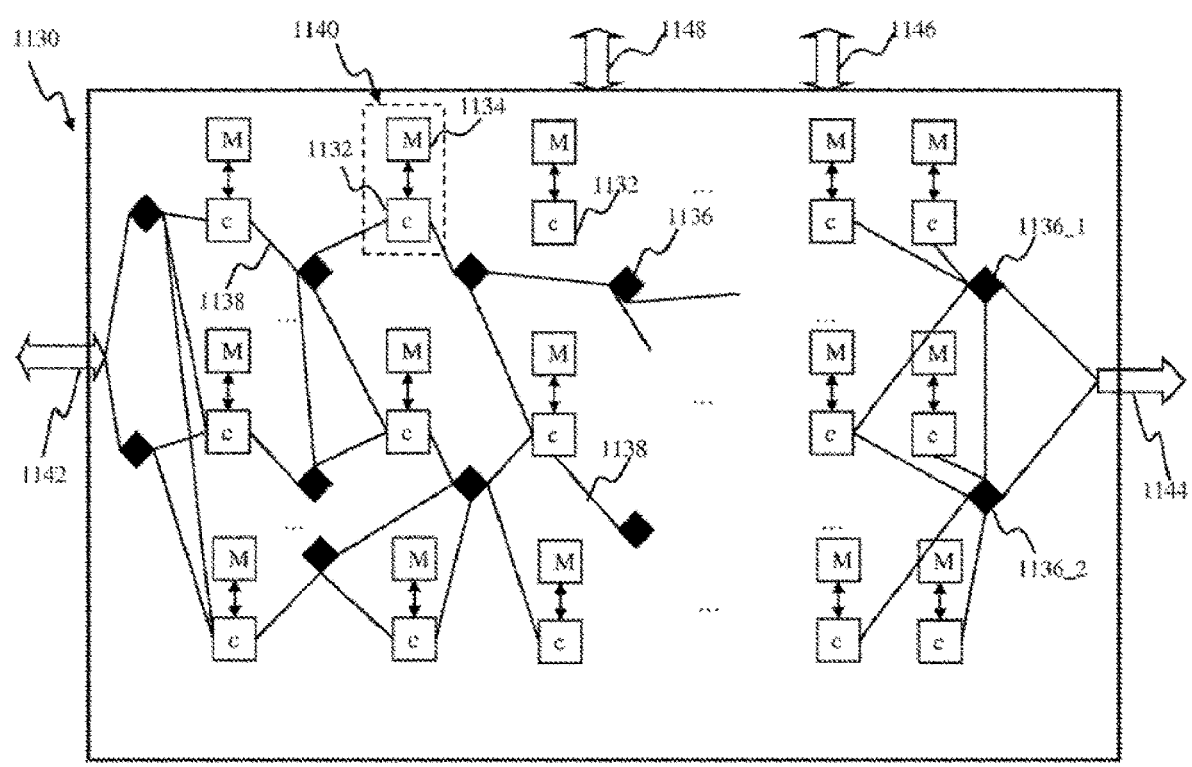
FIG. 11B is a block diagram illustrating a neuromorphic computerized system useful with, inter alia, an adaptive predictor methodology of the disclosure, in accordance with one or more implementations.

Referring now to FIG. 11B, one implementation of neuromorphic computerized system configured to implement classification mechanism using a spiking network is described in detail. The neuromorphic processing system 1130 of FIG. 11B may comprise a plurality of processing blocks (micro-blocks) 1140. Individual micro cores may comprise a computing logic core 1132 and a memory block 1134. The logic core 1132 may be configured to implement various aspects of neuronal node operation, such as the node model, and synaptic update rules and/or other tasks relevant to network operation. The memory block may be configured to store, inter alia, neuronal state variables and connection parameters (e.g., weights, delays, I/O mapping) of connections 1138.

The micro-blocks 1140 may be interconnected with one another using connections 1138 and routers 1136. As it is appreciated by those skilled in the arts, the connection layout in FIG. 11B is exemplary, and many other connection implementations (e.g., one to all, all to all, and/or other maps) are compatible with the disclosure.

The neuromorphic apparatus 1130 may be configured to receive input (e.g., visual input) via the interface 1142. In one or more implementations, applicable for example to interfacing with computerized spiking retina, or image array, the apparatus 1130 may provide feedback information via the interface 1142 to facilitate encoding of the input signal.

The neuromorphic apparatus 1130 may be configured to provide output via the interface 1144. Examples of such output may include one or more of an indication of recognized object or a feature, a motor command (e.g., to zoom/ pan the image array), and/or other outputs.

The apparatus 1130, in one or more implementations, may interface to external fast response memory (e.g., RAM) via high bandwidth memory interface 1148, thereby enabling storage of intermediate network operational parameters. Examples of intermediate network operational parameters may include one or more of spike timing, neuron state, and/or other parameters. The apparatus 1130 may interface to external memory via lower bandwidth memory interface 1146 to facilitate one or more of program loading, operational mode changes, retargeting, and/or other operations. Network node and connection information for a current task may be saved for future use and flushed. Previously stored network configuration may be loaded in place of the network node and connection information for the current task, as described for example in U.S. patent application Ser. No. 13/487,576 entitled "DYNAMICALLY RECONFIGURABLE STOCHASTIC LEARNING APPARATUS AND METHODS", filed Jun. 4, 2012, incorporated herein by reference in its entirety. External memory may include one or more of a Flash drive, a magnetic drive, and/or other external memory.

Figure 11C:
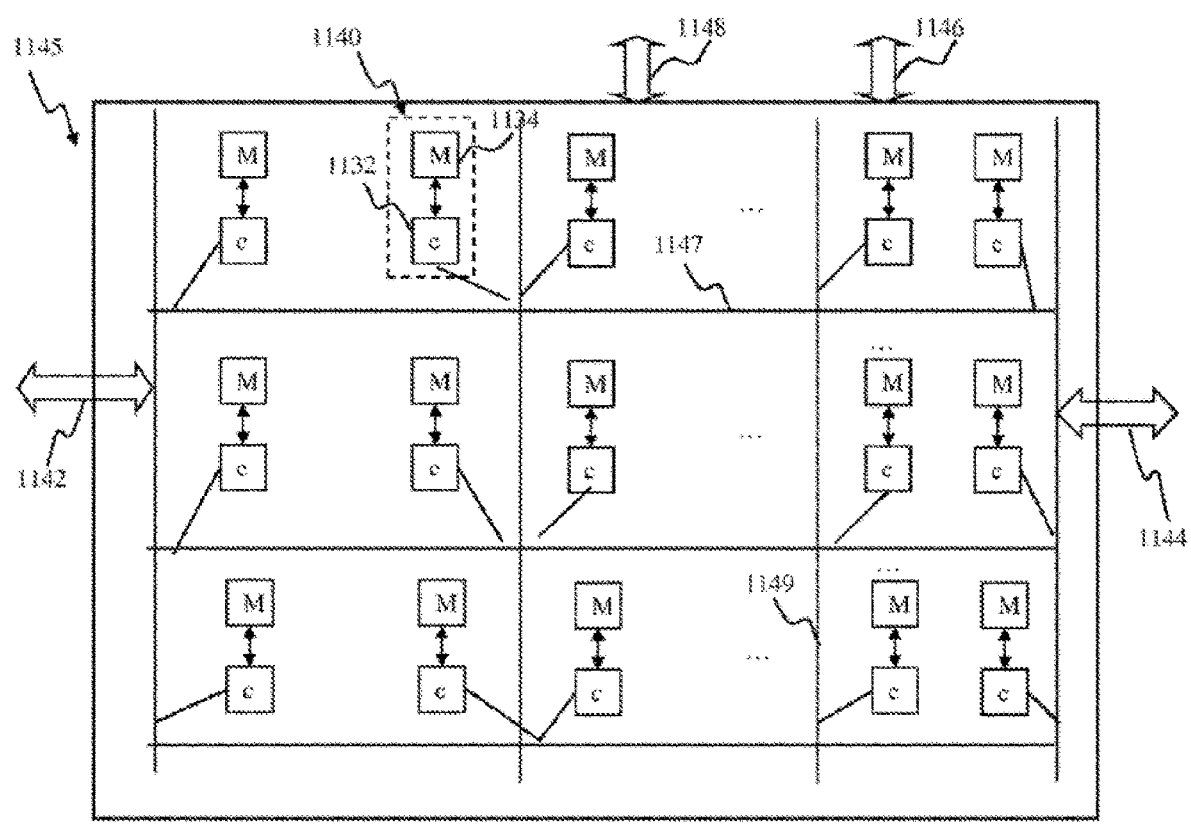
FIG. 11C is a block diagram illustrating a hierarchical neuromorphic computerized system architecture useful with, inter alia, an implementing adaptive predictor apparatus, in accordance with one or more implementations.
Figure 11D:
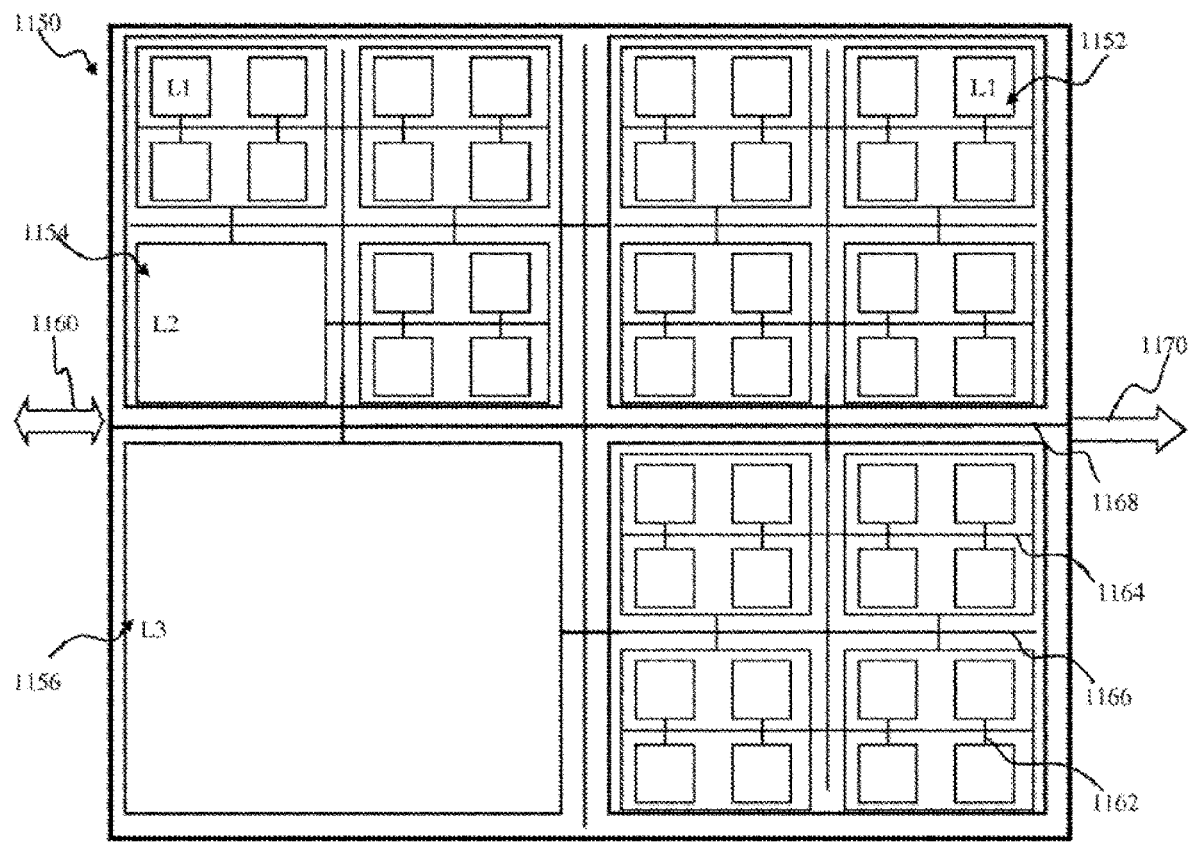
FIG. 11D is a block diagram illustrating cell-type neuromorphic computerized system architecture useful with, inter alia, implementing adaptive predictor apparatus, in accordance with one or more implementations.

FIG. 11C illustrates one or more implementations of shared bus neuromorphic computerized system 1145 comprising micro-blocks 1140, described with respect to FIG. 11B, supra. The system 1145 of FIG. 11C may utilize shared bus 1147, 1149 to interconnect micro-blocks 1140 with one another.

FIG. 11D illustrates one implementation of cell-based neuromorphic computerized system architecture configured to optical flow encoding mechanism in a spiking network is described in detail. The neuromorphic system 1150 may comprise a hierarchy of processing blocks (cells blocks). In some implementations, the lowest level L1 cell 1152 of the apparatus 1150 may comprise logic and memory blocks. The lowest level L1 cell 1152 of the apparatus 1150 may be configured similar to the micro block 1140 of the apparatus shown in FIG. 11B. A number of cell blocks may be arranged in a cluster and may communicate with one another via local interconnects 1162, 1164. Individual clusters may form higher level cell, e.g., cell L2, denoted as 1154 in FIG. 11*d*. Similarly, several L2 clusters may communicate with one another via a second level interconnect 1166 and form a super-cluster L3, denoted as 1156 in FIG. 11D. The super-clusters 1154 may communicate via a third level interconnect 1168 and may form a next level cluster. It will be appreciated by those skilled in the arts that the hierarchical structure of the apparatus 1150, comprising four cells-per-level, is merely one exemplary implementation, and other implementations may comprise more or fewer cells per level, and/or fewer or more levels.

Different cell levels (e.g., L1, L2, L3) of the apparatus 1150 may be configured to perform functionality various levels of complexity. In some implementations, individual L1 cells may process in parallel different portions of the visual input (e.g., encode individual pixel blocks, and/or encode motion signal), with the L2, L3 cells performing progressively higher level functionality (e.g., object detection). Individual ones of L2, L3, cells may perform different aspects of operating a robot with one or more L2/L3 cells processing visual data from a camera, and other L2/L3 cells operating motor control block for implementing lens motion what tracking an object or performing lens stabilization functions.

The neuromorphic apparatus 1150 may receive input (e.g., visual input) via the interface 1160. In one or more implementations, applicable for example to interfacing with computerized spiking retina, or image array, the apparatus 1150 may provide feedback information via the interface 1160 to facilitate encoding of the input signal.

The neuromorphic apparatus 1150 may provide output via the interface 1170. The output may include one or more of an indication of recognized object or a feature, a motor command, a command to zoom/pan the image array, and/or other outputs. In some implementations, the apparatus 1150 may perform all of the I/O functionality using single I/O block (not shown).

The apparatus 1150, in one or more implementations, may interface to external fast response memory (e.g., RAM) via a high bandwidth memory interface (not shown), thereby enabling storage of intermediate network operational parameters (e.g., spike timing, neuron state, and/or other parameters). In one or more implementations, the apparatus 1150 may interface to external memory via a lower bandwidth memory interface (not shown) to facilitate program loading, operational mode changes, retargeting, and/or other operations. Network node and connection information for a current task may be saved for future use and flushed. Previously stored network configuration may be loaded in place of the network node and connection information for the current task, as described for example in U.S. patent application Ser. No. 13/487,576, entitled "DYNAMICALLY RECONFIGURABLE STOCHASTIC LEARNING APPARATUS AND METHODS", incorporated, supra.

In one or more implementations, one or more portions of the apparatus 1150 may be configured to operate one or more learning rules, as described for example in owned U.S. patent application Ser. No. 13/487,576 entitled "DYNAMICALLY RECONFIGURABLE STOCHASTIC LEARNING APPARATUS AND METHODS", filed Jun. 4, 2012, incorporated herein by reference in its entirety. In one such implementation, one block (e.g., the L3 block 1156) may be used to process input received via the interface 1160 and to provide a reinforcement signal to another block (e.g., the L2 block 1156) via interval interconnects 1166, 1168.

In one or more implementations, networks of the apparatus 1130, 1145, 1150 may be implemented using Elementary Network Description (END) language, described for example in U.S. patent application Ser. No. 13/239,123, entitled "ELEMENTARY NETWORK DESCRIPTION FOR NEUROMORPHIC SYSTEMS", filed Sep. 21, 2011, and/or High Level Neuromorphic Description (HLND) framework, described for example in U.S. patent application Ser. No. 13/385,938, entitled "TAG-BASED APPARATUS AND METHODS FOR NEURAL NETWORKS", filed Mar. 15, 2012, each of the foregoing incorporated, supra. In one or more implementations, the HLND framework may be augmented to handle event based update methodology described, for example U.S. patent application Ser. No. 13/588,774, entitled "APPARATUS AND METHODS FOR IMPLEMENTING EVENT-BASED UPDATES IN SPIKING NEURON NETWORK", filed Aug. 17, 2012, the foregoing being incorporated herein by reference in its entirety. In some implementations, the networks may be updated using an efficient network update methodology, described, for example, U.S. patent application Ser. No. 13/239,259, entitled "APPARATUS AND METHOD FOR PARTIAL EVALUATION OF SYNAPTIC UPDATES BASED ON SYSTEM EVENTS", filed Sep. 21, 2011 and/or U.S. patent application Ser. No. 13/385,938, entitled "APPARATUS AND METHODS FOR EFFICIENT UPDATES SPIKING NEURON NETWORKS", filed Jul. 27, 2012, each of the foregoing being incorporated herein by reference in its entirety.

In some implementations, the HLND framework may be utilized to define network, unit type and location, and/or synaptic connectivity. HLND tags and/or coordinate parameters may be utilized in order to, for example, define an area of the localized inhibition of the disclosure described above In some implementations, the END may be used to describe and/or simulate large-scale neuronal model using software and/or hardware engines. The END allows optimal architecture realizations comprising a high-performance parallel processing of spiking networks with spike-timing dependent plasticity. Neuronal network configured in accordance with the END may comprise units and doublets, the doublets being connected to a pair of units.

Adaptive predictor and control methodology described herein may advantageously enable training of robotic controllers. Previously learned actions (primitives) may be reused in subsequent actions that may comprise the same and/or similar control operations. A hierarchy of control actions (primitives) may be developed so as to enable a single higher-level action indication (by an operator) to invoke execution two (or more) lower level by the predictor actions without necessitating generation of the explicit control instructions by the operator. By way of an illustration, a task of teaching a robot to reach for an object may be partitioned into two or more (simpler) sub-tasks: e.g., approach target and/or avoid obstacles. In turn, individual tasks approach target and/or avoid obstacles may be partitioned into a sequence of robot movements (e.g., turn left/right, go forward/backwards). One or more predictors of the robot controller may be trained to perform lower level. Another predictor may be trained to associate a n action indicator (e.g., approach) with one or more movement tasks. A hierarchy of action primitives may enable an operator to operate the robot to perform composite tasks based on previously learned sub-tasks.

When teaching the controller a new task (behavior of serving a glass of water), using the previously learned behaviors and/or primitives (reaching, grasping an object, etc.) may be utilized thereby accelerating learning compared to methods of the prior art.

One or more predictors may be configured to learn to execute learned tasks may be When teaching the controller a new task (behavior of serving a glass of water), using the previously learned behaviors and/or primitives (reaching, grasping an object, etc.) may be utilized thereby accelerating learning compared to methods of the prior art.

The learning process of the adaptive predictor may comprise supervised learning process, operated in accordance with a teaching input from a supervisor agent. Supervised learning may utilize fewer memory and/or computational resources (due to, e.g., a smaller exploration state space). The computational efficiency may be leveraged to implement more complex controller (for given hardware resources) and/or to reduce hardware complexity (for a given controller task load).

In one or more obstacle avoidance applications, an adaptive predictor apparatus may be configured to learn to anticipate the obstacles, allowing for faster and smoother anticipatory avoidance behavior.

In one or more object recognition applications, an adaptive predictor apparatus may speed-up and/or improve reliability of object detection in the presence of noisy and/or otherwise poor sensory information ("pattern completion".)

Adaptive prediction methodology may provide a means for evaluating discrepancy between the predicted state and the actual state (configured based on, e.g., input from the environment) thereby allowing the control system to be sensitive to novel or unexpected stimuli within the robot environment.

In some implementations, such discrepancy evaluation may be utilized for novelty detection. By monitoring the discrepancy, one or more behaviors that result in unpredicted, and/or novel results may be identified. Learning of these behaviors may be repeat until these behaviors are learned (become predictable). In some implementations, the behavior predictability may be determined based one the discrepancy being below a given threshold.

In one or more implementations, training methodology described herein may be applied to robots learning their own kinematics and/or dynamics (e.g., by the robot learning how to move its platform). Adaptive controller of the robot may be configured to monitor the discrepancy and once one or more movements in a given region of the working space are learned, the controller may attempt to learn other movements. In some implementations, the controller may be configured to learn consequences robot actions on the world: e.g. the robot pushes an object and the controller learns to predict the consequences (e.g., if the push too weak nothing may happen (due to friction); if the push is stronger, the object may start moving with an acceleration being a function of the push force)

In some sensory-driven implementations, the controller may be configured to learn associations between observed two or more sensory inputs.

In one or more safety applications, the controller may be configured to observe action of other robots that may result in states that may be deemed dangerous (e.g., result in the robot being toppled over) and/or safe. Such approaches may be utilized in robots learning to move their body and/or learning to move or manipulate other objects.

It will be recognized that while certain aspects of the disclosure are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the invention. This description is in no way meant to be limiting, but rather should be taken as illustrative of the general principles of the invention. The scope of the disclosure should be determined with reference to the claims.

What is claimed is:
1. A robotic system, comprising:
a memory comprising computer readable instructions stored thereon; and
at least one processor configured to execute the computer readable instructions to,
operate the robotic system in two modes comprising a learning mode and an operation mode, the operation mode being different from the learning phase, and
generate an output signal during the operation mode, the output signal comprises a combination of first and second signals, the first signal based at least in part on movement of the robotic system during the learning mode, and the second signal based at least in part on actions of the robotic system initiated by an operator at specific locations during the learning mode.

2. The robotic system of claim 1, wherein the at least one processor is further configured to execute the computer instructions to,
- switch between the operation mode and the learning mode based on receipt of an input signal from a user interface of the robotic system.

3. The robotic system of claim 1, wherein the at least one processor is further configured to execute the computer readable instructions to,
- associate, in the learning mode, movement of the robotic system towards a target location based on an association developed between an action tag and a sensory context, the action tag corresponding to an input signal received by the robot, the sensory context corresponding to data collected by at least one sensor coupled to the robot, and
- wherein, the output signal is configured to cause the robotic system to perform a desired action in absence of a contemporaneous input signal, the output signal being based on the movement of the robotic system during the learning mode.

4. The robotic system of claim 3, wherein,
the output signal is configured to cause the robotic system to perform a desired action in absence of a contemporaneous input signal, the output signal being based on the movement of the robotic system during the learning mode.

5. The robotic system of claim 4, wherein,
- the output signal generated during the operation mode comprises a selection between the first signal and a third signal, the first signal being based at least in part on movement of the robotic system during the learning phase, the third signal being based in part on the sensory context received and the contemporaneous input signal being received;
- the at least one processor is further configured to execute the computer readable instructions to,
  - select the first signal if the contemporaneous input signal is absent, and
  - select the third signal upon receipt of the contemporaneous input signal.

6. The robotic system of claim 3, wherein,
- the action tag corresponds to motion of the robot, including left turns, right turns, forward motion, reverse motion, or a combination thereof; and
- the sensory context comprises a user input configured to cause the robotic system to execute at least one of the motions, including left turn, right turn, forward motion, reverse motion, or a combination thereof.

7. The robotic system of claim 3, wherein,
the action tag is based on actions of the robotic system effectuated by a user of the robotic system causing the robotic system to execute the movement.

8. A non-transitory computer readable storage medium comprising a plurality of computer readable instructions embodied thereon, which when executed by at least one processor configure the at least one processor to,
- operate the robotic system in two modes comprising a learning mode and an operation mode, the operation mode being different from the learning phase; and
- generate an output signal during the operation mode, the output signal comprises a combination of first and second signals, the first signal based at least in part on movement of the robotic system during the learning mode, and the second signal based at least in part on actions of the robotic system initiated by an operator at specific locations during the learning mode.

9. The non-transitory computer readable storage medium of claim 8, wherein the at least one processor is further configured to execute the computer instructions to,
- switch between the operation mode and the learning mode based on receipt of an input signal from a user interface of the robotic system.

10. The non-transitory computer readable storage medium of claim 8, wherein,
- associate, in the learning mode, movement of the robotic system towards a target location based on an association developed between an action tag and a sensory context, the action tag corresponding to an input signal received by the robotic system, the sensory context corresponding to data collected by at least one sensor coupled to the robotic system, and
- wherein, the output signal is configured to cause the robotic system to perform a desired action in absence of a contemporaneous input signal, the output signal being based on the movement of the robotic system during the learning mode.

11. The non-transitory computer readable storage medium of claim 8, wherein,
the output signal is configured to cause the robotic system to perform a desired action in absence of a contemporaneous input signal, the output signal being based on the movement of the robotic system during the learning mode.

12. The non-transitory computer readable storage medium of claim 11, wherein,
- the output signal generated during the operation mode comprises a selection between the first signal and a third signal, the first signal being based at least in part on movement of the robotic system during the learning phase, the third signal being based in part on the sensory context received and the contemporaneous input signal being received;
- the at least one processor is further configured to execute the computer readable instructions to,
  - select the first signal if the contemporaneous input signal is absent, and
  - select the third signal upon receipt of the contemporaneous input signal.

13. The non-transitory computer readable storage medium of claim 10, wherein,
- the action tag corresponds to motions of the robotic system, including left turns, right turns, forward motion, reverse motion, or a combination thereof; and
- the sensory context comprises a user input configured to cause the robotic system to execute at least one of the motions, including left turns, right turns, forward motion, reverse motion, or a combination thereof.

14. The non-transitory computer readable storage medium of claim 10, wherein,
the action tag is based on actions of the robotic system effectuated by an operator of the robotic system causing the robotic system to execute the movement.

15. A method for maneuvering a robotic system, comprising:
- operating the robotic system in two modes comprising a learning mode and an operation mode, the operation mode being different from the learning phase; and
- generating an output signal during the operation mode, the output signal comprises a combination of first and second signals, the first signal based at least in part on movement of the robotic system during the learning mode, and the second signal based at least in part on actions of the robotic system initiated by an operator at specific locations during the learning mode.

16. The method of claim 15, further comprising:
switching between the operation mode and the learning mode based on receipt of an input signal from a user interface of the robotic system.

17. The method of claim 15, further comprising:
associating, in the learning mode, movement of the robotic system towards a target location based on an association developed between an action tag and a sensory context, the action tag corresponding to an input signal received by the robotic system, the sensory context corresponding to data collected by at least one sensor coupled to the robotic system, and
wherein, the output signal is configured to cause the robot to perform a desired action in absence of a contemporaneous input signal, the output signal being based on the movement of the robot during the learning mode.

18. The method of claim 15, wherein the output signal is configured to cause the robotic system to perform a desired action in absence of a contemporaneous input signal, the output signal being based on the movement of the robot during the learning mode.

19. The method of claim 18, wherein the output signal is generated during the operation mode comprises a selection between the first signal and a third signal, the first signal being based at least in part on movement of the robotic system during the learning phase, the third signal being based in part on the sensory context received and the contemporaneous input signal being received.

20. The method of claim 19, further comprising:
selecting the first signal if the contemporaneous input signal is absent, and
selecting the third signal upon receipt of the contemporaneous input signal.

21. The method of claim 17, wherein,
the action tag corresponds to motion of the robot, including left turns, right turns, forward motion, reverse motion, or a combination thereof; and
the sensory context comprises a user input configured to cause the robotic system to execute at least one of the motions, including left turn, right turn, forward motion, reverse motion, or a combination thereof.

22. The method of claim 17, wherein the action tag is based on actions of the robotic system effectuated by a user of the robotic system causing the robotic system to execute the movement.

23. A robotic system, comprising:
a memory comprising computer readable instructions stored thereon; and
at least one processor configured to execute the computer readable instructions to,
operate the robotic system in two modes comprising a learning mode and an operation mode, the operation mode being different from the learning phase,
generate an output signal during the operation mode, the output signal comprises a combination of first and second signals, the first signal based at least in part on movement of the robotic system during the learning mode, and the second signal based at least in part on actions of the robotic system initiated by an operator at specific locations during the learning mode,
switch between the operation mode and the learning mode based on receipt of an input signal from a user interface of the robotic system,
associate, in the learning mode, movement of the robotic system towards a target location based on an association developed between an action tag and a sensory context, the action tag corresponding to an input signal received by the robot, the sensory context corresponding to data collected by at least one sensor coupled to the robot, and
wherein, the output signal is configured to cause the robotic system to perform a desired action in absence of a contemporaneous input signal, the output signal being based on the movement of the robotic system during the learning mode.

* * * * *